United States Patent
Moore et al.

(10) Patent No.: US 11,012,414 B2
(45) Date of Patent: *May 18, 2021

(54) METHODS AND SYSTEMS FOR PREVENTION OF ATTACKS ASSOCIATED WITH THE DOMAIN NAME SYSTEM

(71) Applicant: Centripetal Networks, Inc., Portsmouth, NH (US)

(72) Inventors: Sean Moore, Hollis, NH (US); Jonathan R. Rogers, Hampton Falls, NH (US); Steven Rogers, Leesburg, VA (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,365

(22) Filed: Nov. 22, 2019

(65) Prior Publication Data
US 2020/0351244 A1 Nov. 5, 2020

Related U.S. Application Data

(63) Continuation-in-part of application No. 16/399,700, filed on Apr. 30, 2019.

(51) Int. Cl.
*H04L 29/06* (2006.01)
*H04L 29/12* (2006.01)

(52) U.S. Cl.
CPC ...... *H04L 63/0245* (2013.01); *H04L 61/1511* (2013.01); *H04L 63/1458* (2013.01); *H04L 63/20* (2013.01); *H04L 2463/142* (2013.01)

(58) Field of Classification Search
CPC . H04L 63/0263; H04L 63/1458; H04L 63/20; H04L 61/1511
(Continued)

(56) References Cited

U.S. PATENT DOCUMENTS 7,444,515 B2 10/2008 Dharmapurikar et al.
8,510,821 B1 8/2013 Brandwine et al.
(Continued)

FOREIGN PATENT DOCUMENTS

CN 104601557 A 5/2015

OTHER PUBLICATIONS

Wu et al. "DNS Usage Mining and Its Two Applications", 978-1-4577-1539-6/11,2011 IEEE, pp. 54-60 (Year: 2011).*
(Continued)

*Primary Examiner* — Khalil Naghdali
(74) *Attorney, Agent, or Firm* — Banner & Witcoff, Ltd.

(57) ABSTRACT

The attack vectors for some denial-of-service cyber attacks on the Internet's Domain Name System (DNS) are bad, bogus, or unregistered domain name DNS requests to resolve domain names that are not registered in the DNS. Some other cyber attacks steal sensitive data by encoding the data in bogus domain names, or domain names otherwise not registered in the DNS, that are transferred across networks in bogus DNS requests. A DNS gatekeeper may filter in-transit packets containing DNS requests and may efficiently determine if a request's domain name is registered in the DNS. When the domain name is not registered in the DNS, the DNS gatekeeper may take one of a plurality of protective actions. The DNS gatekeeper drops requests determined not to be legitimate, which may prevent an attack.

20 Claims, 22 Drawing Sheets

(58) Field of Classification Search
USPC .......................................................... 726/13
See application file for complete search history.

(56) References Cited

U.S. PATENT DOCUMENTS

| | | | |
|---|---|---|---|
| 8,578,497 | B2 | 11/2013 | Antonakakis et al. |
| 9,171,153 | B2 | 10/2015 | Jorgensen |
| 10,051,001 | B1 | 8/2018 | Ashley et al. |
| 2008/0163333 | A1 | 7/2008 | Kasralikar |
| 2008/0201772 | A1 | 8/2008 | Mondaeev et al. |
| 2009/0172138 | A1* | 7/2009 | Wang ................ H04L 29/12066 709/223 |
| 2012/0054860 | A1 | 3/2012 | Wyschogrod et al. |
| 2014/0157405 | A1 | 6/2014 | Joll et al. |
| 2018/0004942 | A1 | 1/2018 | Martin et al. |
| 2018/0063084 | A1 | 3/2018 | Wakumoto et al. |
| 2019/0052658 | A1* | 2/2019 | Clarke ................ H04L 61/1511 |

OTHER PUBLICATIONS

Xu et al., "DNS for Massive-Scale Command and Control", IEEE Transactions on Dependable and Secure Computing, vol. 10, No. 3, May/Jun. 2013, pp. 143-153 (Year: 2013).*

Schales et al., "Scalable analytics to detect DNS misuse for establishing stealthy communication channels", IBM J. Res. & Dev. vol. 60 No. 4 Paper 3 Jul./Aug. 2016, 0018-8646/16 B 2016 IEEE, p. 3:1-3:14 (Year: 2016).*

Fu et al., "A covert data transport protocol", IEEE 2016 11th International Conference on Malicious and Unwanted Software: "Know Your Enemy" (MALWARE), pp. 93-100 (Year: 2016).*

Jul. 12, 2019 U.S. Non-Final Office Action—U.S. Appl. No. 16/399,700.

Geravand, et al., "Bloom Filter Applications in Network Security: A State-of-the-Art Syrvey," Computer Networks, vol. 57, No. 18, Sep. 14, 2013, pp. 4047-4064.

Van Rijswijk-Deij, et al., "Privacy-Conscious Threat Intelligence Using DNSBloom," 2019 IFIP/IEEE Symposium on Integrated Network and Service Management (IM), IFIP, Apr. 8, 2019, pp. 98-106.

Jun. 23, 2020—International Search Report—PCT/US2020/030044.

Feb. 19, 2021—(WO) International Search Report and Written Opinion—App PCT/US2020/061805.

Hamed, et al., "On Dynamic Optimization of Packet Matching in High-Speed Firewalls," 2006 IEEE, Apr. 1, 206.

Apr. 2, 2021 (US)-Notice of Allowance—U.S. Appl. No. 16/399,700.

Pecori, et al., "A Statistical Blind Technique for Recognition of Internet Traffic with dependence Enforcement", 2014 IEEE, pp. 328-333 (Year:2014).

* cited by examiner

METHODS AND SYSTEMS FOR PREVENTION OF ATTACKS ASSOCIATED WITH THE DOMAIN NAME SYSTEM

CROSS-REFERENCE TO RELATED APPLICATION

This application is a continuation-in-part of and claims priority to U.S. patent application Ser. No. 16/399,700, filed Apr. 30, 2019, and entitled "Methods and Systems for Efficient Packet Filtering." The entire contents of the aforementioned application is hereby incorporated by reference herein.

TECHNICAL FIELD

Aspects described herein generally relate to computer hardware and software and network security. In particular, one or more aspects of the disclosure generally relate to computer hardware and software for efficient filtering of in-transit packets against packet filtering rules.

BACKGROUND

Network security is becoming increasingly important as the information age continues to unfold. Network threats/attacks may take a variety of forms (e.g., unauthorized requests or data transfers, viruses, malware, large volumes of traffic designed to overwhelm resources, and the like).

To counter these kinds of threats and attacks, various cyber defense methodologies and systems have been developed and deployed. One variety of cyber defense system uses packet gateways, such as a threat intelligence gateway (TIG), to protect networks. A packet gateway may include an (inline) network packet filtering device with a capability to apply sets of packet filtering rules to in-transit TCP/IP (Transmission Control Protocol/Internet Protocol) packets. The TIG may act as a gateway, or interface, between a network (e.g., a private network) that has been protected, or secured, by cyber threat intelligence (CTI) and a network that is not similarly secured/protected (for example, the Internet).

The packet filtering rules may be based on databases of threat indicators supplied by sources of CTI, including CTI provider organizations. The set of packet filtering rules may represent a TIG-enforced security policy for securing/protecting a network. Threat indicators may be used as packet matching criteria for identifying risky packets. References herein to criteria may refer to an individual criterion and/or multiple criteria. CTI indicators, or threat indicators, may include Internet network addresses (e.g., IP addresses, IP address ranges, L3/L4 ports and protocols, domain names, Uniform Resource Identifiers (URIs), and the like) of resources that may be controlled or operated by threat actors, or that may have otherwise been associated with malicious activity. CTI indicators/threat indicators may also include identifiers for certificates and associated certificate authorities that are used to secure some TCP/IP communications (e.g., X.509 certificates used by the Transport Layer Security (TLS) protocol to secure Hypertext Transfer Protocol (HTTP)-mediated sessions). CTI providers include threat metadata associated with each threat indicator including, for example, the threat/attack type, the threat name, the threat risk score, the threat actor (attribution), and the like. A TIG and associated applications may use the threat metadata to further increase protections from threats and further improve network security posture.

A network security policy manager may create a network security policy as a set of CTI-derived packet filtering rules by receiving threat indicators and associated threat metadata from one or more CTI providers and generating packet filtering rules based on the indicators and metadata. Each packet filtering rule includes at least (a) criteria for matching packet data, (b) an action or combination of actions to be applied to the packet if there is a match with the criteria, and (c) threat metadata. The matching criteria may include one or more pairs composed of a packet field name (e.g., the L3 source IP address field) and the field value. The field value may be a threat indicator in the form of a network address (e.g., an IP address, domain name, URI, and the like) or an identifier for a certificate or a certificate authority. The action or combination of actions may include some combination of blocking or dropping the packet, allowing or forwarding the packet, logging the packet, capturing the packet, re-directing or re-routing the packet, and modifying the packet to protect the network. In the context of TIGs and CTI-derived policies, the rule action may be called a packet transformation function (PTF), which may transform a packet in such a way as to protect the network. For example, a PTF may transform a TCP SYN packet that is initiating a connection setup with a threat endpoint into a corresponding TCP RST packet that halts the connection setup process. The threat metadata may be used to compute a threat risk score, to select a threat analysis methodology to be applied to the packet and the communications associated with the packet, or select or compute the action(s) to be applied to the packet in accordance with the threat risk.

One or more TIGs may be inserted inline with, for example, one or more of the network's Internet access links. A policy manager of one or more TIGs may be configured to (a) receive CTI (threat indicators and associated metadata) from one or more CTI providers; (b) generate one or more policies composed of packet filtering rules derived from the threat indicators and metadata; and (c) download the one or more policies or transfer the one or more policies into one or more (subscribing) TIGs, which may be associated with the policy manager by a policy subscription. The TIGs may enforce the policies by applying the packet filtering rules to each in-transit packet as the packet traverses an Internet access link (in either direction).

The effectiveness of protecting networks using TIGs and associated CTI is often a function of the scope and quality of the CTI indicators and metadata being applied by the TIG, and of the performance of the TIG. At the present time of disclosure, in aggregate there are many millions of threat indicators (and associated threat metadata) available from multiple sources of CTI, with the indicators being in the form of IP addresses, 5-tuples, domain names, URIs, and the like, as well as certificate identifiers, certificate authority identifiers, and the like. These large databases of CTI may be translated into a similar number of packet filtering rules. Because the threat indicators that may actually be observed in a given network's communications traffic are not necessarily known, all available CTI or associated packet filtering rules may be applied by a TIG at any time to ensure effective protections. TIG policies may be composed of 1's, 10's, or 100's of millions of rules. As such, the TIG must be capable of applying the millions of packet filtering rules to each in-transit packet without adversely impacting network performance. 10 G and 40/100 G network links may be used at TIG insertion points, which means that packet transmission rates may be millions or tens of millions of packets per second. The TIG must filter each in-transit packet through the millions of rules in order to enforce the policy, without adversely affecting network performance. With such large policies and high packet rates, even when the policies are stored in main memory, and even when fast (e.g., sublinear) policy search algorithms are used, TIG performance may be insufficient and may result in unacceptable performance degradations. For example, high latencies may result in packet drops due to buffer overflows. The latency incurred during packet filtering should be low and packets should not be dropped (e.g., due to buffer overflows).

A TIG may be designed to achieve the necessary performance by some combination of (a) high-performance CPUs, which may be architected or configured for network packet processing; (b) fast/efficient algorithms and associated data structures for searching the rules for matches between the rules' indicators and the current in-transit packet's associated field values; and (c) storing the policy (which may include the millions of packet filtering rules) in high-speed local memory (for example, on-board SDRAM, which is often called main memory) so that the CPU(s) may access the main memory quickly via a high-speed, high-bandwidth data bus.

However, recent trends in networking are making it difficult or impractical for TIGs to perform at the levels necessary to maintain effective network protections. The growth rate of the quantity of CTI (measured by the number of threat indicators and associated metadata), and therefore the rate of growth of associated policies (measured in bytes, which is a function of the number of packet filtering rules and the size in bytes of those rules), is higher than the rates of improvements in processor speeds, processor costs, processor power requirements, memory speeds, memory densities, memory costs, etc. The result is that it is no longer practical for TIGs to handle increases in policy sizes by increasing the size of the memory. This problem is further compounded by ever-increasing network link speeds and ever-increasing network traffic volumes. Thus, there is a need for improvements in efficiencies of TIG technology such that large increases in the size of CTI-derived policies only require relatively small increases in computational resources that are necessary to maintain TIG performance at acceptable levels (e.g., relatively low latency and minimal to no packet drops) while providing effective network protections.

Many attacks may be associated with the Internet's Domain Name System (DNS). The DNS is sometimes called the Internet's "phone book," and the DNS is a database distributed across the Internet that maps human-readable domain names to machine-readable IP addresses. Many popular Internet applications, including the World Wide Web (www) and e-commerce applications, critically depend on DNS to enable routing of traffic such as web browser requests and web server responses across the Internet's infrastructure of routers and interconnecting links. Thus, a successful attack on the DNS that causes the DNS to underperform may cause these Internet applications and the Internet itself to stop functioning effectively or otherwise severely impair their operation. Conversely, DNS requests may be used as an attack vector for some other types of attacks, including a Distributed Denial-of-Service (DDoS) attack on the DNS, which may cause damage and loss to networked assets. Accordingly, there is a need for efficient DNS protections that (a) prevent attacks on the DNS, and (b) prevent the DNS from being used as an attack vector.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to efficient packet filtering for cyber threat intelligence (CTI) applications. The packet filtering method may be time and space efficient. In practice, only a small fraction of packets filtered by any packet gateway will match any CTI-derived packet-filtering rule in the gateway-enforced security policy. Thus, a time-efficient method for determining if a packet will match any rule (or not) before searching the rules of the security policy may eliminate a large number of the policy searches. If the method is faster than a search through the policy, an expected search time may be significantly reduced when averaged over a sufficient amount of representative packet traffic. In addition, a security policy may include multiple rules that are identical except for the associated threat indicator values. The rules have the same action(s) and threat metadata. As such, space (e.g., memory resources) efficiencies may be achieved by associating the multiple different indicators with a single rule (e.g., the same action(s) and threat metadata).

Aspects of this disclosure also relate to efficient prevention of some attacks associated with the DNS. The attack vector is DNS query request messages containing domain names that may not be registered in the DNS. Hereinafter, the phrase "DNS query request message" may be abbreviated to "DNS request" or the like. The terms "DNS query request message" and "DNS request" may refer to either the message, the TCP/IP packets containing the message, or both. Also, "DNS query response message" may similarly be abbreviated or referenced as "DNS response" or the like.

Aspects of the present invention provide methods of processing packets including a Domain Name System (DNS) query request. The methods may include receiving a plurality of packets in a computing device such as a host or proxy (e.g., an endpoint or an intermediate proxy or a network device); determining, based on packet header information, whether each of the plurality of packets comprises a DNS query request; and testing a probabilistic data structure to determine if a domain name of the DNS query request is represented in the probabilistic data structure. The probabilistic data structure, which may be a Bloom filter, may be configured with a data set representing all of the domain names known to be registered in the DNS. The method may determine whether a DNS query request indicates a legitimate DNS query request based on a determination that the domain name of the DNS query request is not represented in the probabilistic data structure, and may drop the DNS query request based on a determination that the packet of the plurality of packets does not indicate a legitimate DNS query request.

When a packet is determined to include a DNS query request, and if it is determined that the domain name of the DNS query request is not represented in the probabilistic data structure, the methods may determine whether the DNS query request indicates a legitimate DNS query request. A DNS query request may include legitimate DNS requests and may include some illegitimate requests. The illegitimate requests may include bad requests, such as requests that are legitimate attempts to resolve a domain name request, as well as bogus requests, such as requests that were submitted in an attempt to deny service to others and/or to exfiltrate information from a compromised system. Data regarding a DNS query request determined not to be legitimate may be transmitted to a management server. A packet determined to include a legitimate request may be transmitted towards its intended destination.

A computing device may monitor network traffic for a response to a transmitted DNS query request. Based on a determination that the response to the DNS query request indicates that the DNS query request was completed successfully, the computing device may insert the domain name of the monitored DNS query request into the probabilistic data structure. The computing device may transmit the domain name of the successfully completed DNS query request to a management server.

In some embodiments, to determine whether a DNS query request indicates a legitimate DNS query request, the computing device may determine a rate of received invalid DNS query requests. The computing device may also determine a rate of change in the number of received invalid DNS query requests. If such rates satisfy a threshold, the computing device may determine that a packet being processed does not indicate a legitimate DNS query request. The computing device may also determine whether a DNS query request indicates a legitimate DNS query request based on a country code that is associated with a DNS query request or a timing of updates received for a probabilistic data structure. The computing device may also determine whether a DNS query request indicates a legitimate DNS query request based on syntactical characteristics of the domain name in the request. The computing device may determine that a packet associated with an unregistered domain may be associated with a related domain name registration lag. The computing device may determine that a packet associated with an unregistered domain may be associated with a legitimate data exchange service. The computing device may also determine whether a DNS query request indicates a legitimate DNS query request based on a determination of a probability that a request is legitimate, which may be based on one or more of the foregoing factors.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 11 further depicts an exemplary event sequence occurring in the environment depicted in FIG. 1 in which the TIGs are configured to efficiently protect networks from attacks on the Internet DNS;

DETAILED DESCRIPTION

Figure 1:
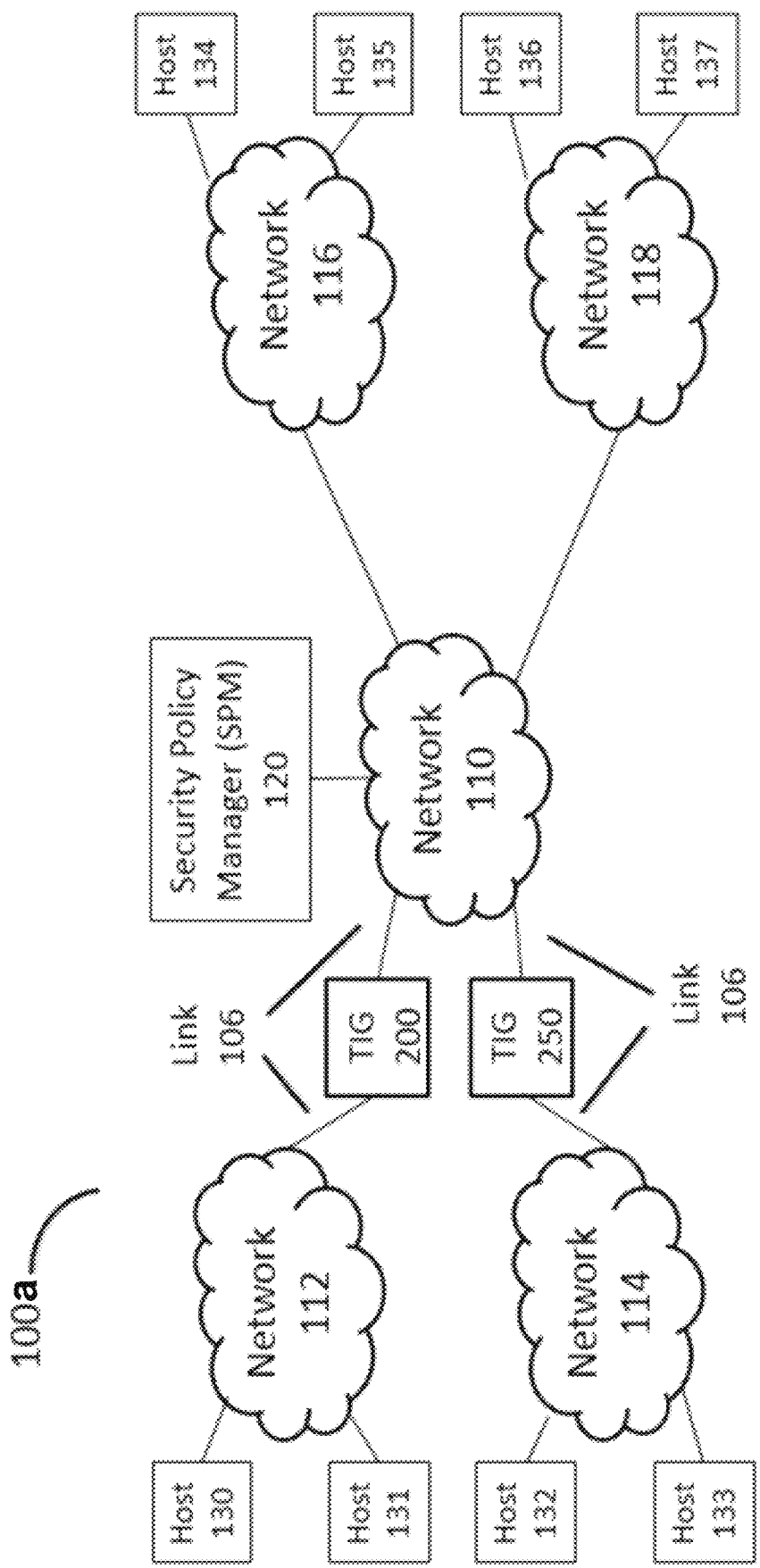
FIG. 1 depicts an illustrative environment for efficient threat intelligence gateways (TIGs) and associated policy servers that are protecting at least one of a plurality of different networks.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical, virtual, or software-defined. Similarly, the elements, including hosts and appliances, may be physical or virtual. In this respect, the specification is not intended to be limiting.

A Bloom filter may be a time-efficient and space-efficient probabilistic data structure for determining the membership of elements in a set. A Bloom filter is parameterized by (1) the number of elements N in the set; (2) the storage size or number of storage/memory bits M needed to store the N elements; and (3) the false positive rate P. The false positive rate P is the probability that a membership test for an element X in the set falsely returns a match value True (e.g., the membership test determines that X is a member of the set when in fact X is not a member of the set). The value of M is dependent on N and false positive rate P. For a fixed value of N (the number of elements in the set), storage size M varies inversely with the false positive rate. That is, as the false positive rate P decreases, the storage size M increases. The false positive rates may be selected for Bloom filters in the context of CTI applications and associated CTI-derived policies.

For example, for a Bloom filter that contains a set of 500 million domain names and a false positive rate P of 0.01, or $10^{-2}$, the storage size M may be approximately 600 MB. For comparison, the average size of domain names registered in the Internet DNS is approximately 20 bytes. Therefore, a simple uncompressed list of 500 million domain names needs approximately 10 GB of storage, which is about (10 G/600M)=16.66 times larger than the storage size M. If the false positive rate P is decreased by a factor of 1000, to 0.00001 or $10^{-5}$, the storage size M increases to approximately 1.5 GB, a factor of only 2.5 (=1.5 G/600M). This is space efficient. In general, the storage size M varies as the magnitude of the logarithm of the false positive rate P. The set membership test algorithm is similarly time efficient, with the theoretical time complexity function also being on the order of the magnitude of the logarithm of the false positive rate P. In practice, implementations of the set membership algorithm may be extremely fast and nearly constant time, even when the false positive rate P varies by several orders of magnitude.

To realize space efficiencies and time efficiencies, a probabilistic data structure such as a Bloom filter may be used to avoid unnecessary searches of packet filtering rules or to avoid repeated storage, for example, of a common rule action. For example, 500 million domain names may be stored in a Bloom filter of size approximately 600 MB (when the false positive rate P=0.01). In practice, a policy composed of 500 million packet filtering rules (with domain-name indicators) may require, for example, 50 GB to 500 GB of storage/memory if each rule averages 100-1000 bytes (for example, 20 bytes for the domain name indicator, 30 bytes to specify actions and associated options, and 50-950 bytes for metadata). That is, the Bloom filter may require less storage/memory, by 2-3 orders of magnitude, than a packet filtering rule based policy without a Bloom filter. By grouping a plurality of threat indicators that are associated with the same operator or action(s) (e.g., a Block operation) and the same metadata, the use of a Bloom filter may eliminate redundant storage associated with storing the action(s) and metadata separately for each rule and instead store the action(s) and metadata once for the Bloom filter containing the plurality of threat indicators. That is, rather than storing each rule and an associated rule action, a rule action may be associated with a particular Bloom filter and stored a single time as the rule action to be performed based on a test of the Bloom filter indicating a match. Thus, the memory/space requirements for a policy that integrates Bloom filter technology may be relatively much smaller, potentially by orders-of-magnitude, compared to the memory/space requirements for the packet filtering rule policies that do not integrate Bloom filter technology.

For CTI applications, the false negative rate for a Bloom filter is always zero (regardless of the non-zero false positive rate P), which maintains the same level of, or preserves, security as a policy enforced without a Bloom filter. That is, if a test to determine if an element X is a member of a set I returns a negative, or False, then X is definitely not a member of the set I. Thus, while a TIG using Bloom filter technology for time efficiency may, with the probability of the false positive rate P, unnecessarily search the policy/filter a packet, the TIG will never skip a policy search or not filter a packet when there is a matching rule in the policy.

While the term Bloom filter may be used throughout this specification, the choice of filter or data structure is exemplary and not meant to be limiting or restrictive in any way. Any data structure with sufficient time and space efficiencies for testing set membership, and which preserves security, may be used. For example, a Cuckoo filter is a probabilistic data structure that has similar time and space efficiencies as a Bloom filter. The Cuckoo filter also has the capability to efficiently delete or remove elements from a set, whereas a standard Bloom filter does not have the capability to remove elements from the set (although Bloom filter variants have been developed that support a delete capability). The capability to efficiently insert, update or delete elements from a set may prove useful in some applications, implementations, and/or embodiments. A security policy update may include an update to add or remove a rule, or to change a rule action associated with a particular threat indicator. For example, an update may change a rule action from a monitor action to a drop action. The data structures may support a plurality of functions, such as an Insert( ) function for adding an element to the set, a Boolean-valued Member( ) function for testing set membership of an element, and a Delete( ) function for removing an element from a set. The following description also assumes that the data structure is probabilistic and is therefore associated with a (non-zero) false positive rate P, but again this choice is exemplary and not meant to be restrictive.

There are multiple ways that Bloom filter technology may improve efficiencies for CTI applications/TIG features. Below, eight exemplary methods are described (in addition to those already provided above). For purposes of simplification, the first six exemplary methods involve indicators in the form of network addresses (e.g., IPs, domain names, URLs, etc.), a seventh involves indicators in the form of certificate identifiers, and an eighth is generic with respect to indicator types.

In a first example, Bloom filter technology may be used to improve performance. For each rule in the set of filtering rules to be searched, an associated indicator may be extracted and the indicator may be inserted into a policy Bloom filter. The resultant policy Bloom filter may be stored in a main memory of packet filtering device. Prior to a search of a set of packet filtering rules for a match with the current in-transit packet's network address(es), a packet filtering device may determine if the network address is a member of the policy Bloom filter. If a result of the determination is TRUE or indicates a match, then the packet filtering device may search a corresponding set of rules for a matching rule and may apply the rule action(s) to the packet. If the packet filtering device determines a result of FALSE or does not indicate a match, then the device may skip an unnecessary search of the packet filtering rules (e.g., because no matching rule will be found). By skipping unnecessary searches, the average policy search time per packet may be reduced and TIG performance or throughput may be improved. Such a probabilistic data structure or Bloom filter may be referred to as a time-efficiency probabilistic data structure or Bloom filter, or policy probabilistic data structure or Bloom filter.

In a second example, a policy may include subsets of packet filtering rules that are identical except for their matching criterion or criteria associated with threat indicators. Rules may have the same action(s), the same threat metadata, and the same matching criterion or criteria (which may, e.g., be associated with one or more threat indicators). Space (e.g., memory usage) efficiencies for policy storage may be achieved by associating multiple different indicators with a single rule (e.g., the same action(s) and/or threat metadata). The TIG, or a policy management server, may, for example, sort or partition the plurality of rules of the security policy (or a portion of the security policy) into subsets based on the type of threat indicator(s) associated with the rules, and/or based on the actions and threat metadata associated with the rules. A subset associated with a single type of packet matching criterion or threat indicator may avoid unnecessary searches of rules associated with that subset. A search of the subset probabilistic data structure or Bloom filter may be skipped if the packet does not include the type of packet matching criterion associated with that subset. A subset associated with a single rule action may avoid unnecessary repeated storage of the rule action and unnecessary storage of individual rules, which may save memory space. For each such subset, an associated subset Bloom filter may be configured to contain all of the indicators of the associated rules, and the subset Bloom filter may be further associated with the common rule action(s) and threat metadata of the associated rules. The common rule action(s) and threat metadata of the subset may be stored a single time for the probabilistic data structure, rather than being stored for and associated with each rule of the subset. Then, for each such subset, the associated subset Bloom filter may replace the subset of rules in the policy, resulting in a reduction in space requirements for storing the policy. Thus, the policy may be represented as a collection of these probabilistic data structures or Bloom filters. During policy search, the packet filtering device tests if a packet's network addresses are members of any subset probabilistic data structure or Bloom filter. If the packet filtering device determines a match from a subset Bloom filter test, the action(s) and threat metadata associated with the subset Bloom filter may be applied to the packet. Time efficiencies may also be gained if the time to test an element, such as a network address, for membership in the subset Bloom filter is less than the time it would take to otherwise search through the subset of rules. In some applications, it may be useful to include a packet filtering rule that is applied when a Bloom filter membership test returns a FALSE or determines that there is not a match of the packet with the set. That is, the subset Bloom filter may have two associated packet filtering rules, including a first rule that is applied when a membership test returns TRUE for an indication of a match and a second rule that is applied when a membership test returns FALSE for an indication of no match. Such a subset Bloom filter may be referred to as a space-efficiency Bloom filter.

In a third example, as TIG policies may become too large to be stored in available main memory, it may become impractical to increase main memory capacity sufficiently due to factors such as cost-of-goods, layout and density constraints, and power or heat limits. While secondary memory, which may be slower (e.g., as measured in read-access time) but correspondingly larger in storage capacity, denser, and cheaper (e.g., per byte) than primary main memory, may be added to the TIG. Such secondary memory may require some other RAM-like properties, such as byte-addressability, to support fast search algorithms. The capacity of the secondary memory may be sized to store policies that are too large to fit in the primary main memory. In order to ensure that TIG performance is sufficient, the ratio of secondary memory speed to primary main memory speed may be equal to or larger than the (expected) fraction of packets that will match the CTI-derived packet filtering rules. A time-efficiency Bloom filter that stores all of the indicators for the rules in the policy stored in secondary memory may be stored in the primary main memory. Before searching the policy stored in secondary memory, the packet filtering device may perform a fast initial search of the Bloom filter. If the initial search of the Bloom filter indicates a match, then the packet filtering device may perform a policy search and packet filtering via the secondary memory. If the initial search of the Bloom filter does not indicate a match, then the (relatively slow) search of the packet filtering rules in the secondary memory may be skipped.

In a fourth example, it may be advantageous to store Bloom filters and some portion of a packet filtering policy in a higher-speed memory (e.g., primary main memory) and other portions/the remainder of the policy in slower-speed memory (e.g., secondary memory). For example, it may be advantageous to store a first set of packet filtering rules with domain name and URI indicators in secondary memory, and store a second set of packet filtering rules with IP address and IP address range indicators in primary main memory, with time-efficiency Bloom filters corresponding to both rule sets stored in primary main memory. Depending on the kind of traffic associated with a particular protected network, it may be advantageous to prioritize (e.g., utilize higher speed memory) for certain types of rules. For example, it may be beneficial to use main memory for storing packet filtering rules with indicator types, such as IP addresses and IP address ranges, that are expected to be searched more frequently than rules with indicators types, such as domain names and URLs, that are expected to be searched less frequently. In a TCP/IP network, every packet contains IP addresses in the L3/IP header, whereas a smaller portion of packets contains domain names, and an even smaller portion contains URLs. Thus, if there is insufficient main memory to store all the filtering rules in a policy, then it may be beneficial, for example, to store rules with IP address indicators in main memory, and store rules with domain name and URL indicators in a secondary memory. For example, it may be beneficial to use main memory for storing rules associated with a popular protocol, such as HTTP/HTTPS (web) on port 80/443, as well higher frequency matching CTI rule properties (e.g., rules associated with lower fidelity threat indicators and rules associated with larger quantities of indicators by type) such as filtering rules for IP address and IP address range indicators that may be searched more frequently than filtering rules for domain name and URI indicators.

In a fifth example, it may be advantageous to integrate the methods described above in any combination, and with variations on the methods, in order to achieve further efficiencies. For example, a time-efficiency Bloom filter may be associated with a subset of CTI-derived packet filtering rules, and the subset may have some portion(s) of the rules represented by a space-efficiency Bloom filter(s). In practice, the combinations and variations that achieve the increased efficiency may depend on many factors, including factors such as CTI characteristics, performance requirements, costs, and operating environment.

In a sixth example, a Bloom filter or combination of filters as described above may be used to protect the Domain Name System (DNS) from some cyber attacks. The DNS is a service that translates human-readable domain names into machine-readable IP addresses. The DNS may be viewed as a large, globally distributed memory/store of {domain name, IP address} pairs and an associated processing system for translating human-readable domain names into machine-readable IP addresses. Many popular applications, for example the World Wide Web (WWW), depend on the DNS for efficient operation. Some cyber attacks on the DNS use bogus DNS query requests as the attack vector. A bogus DNS query request is a request to resolve a domain name that is not registered in the DNS.

There are at least two types of attacks on the DNS that may use bogus DNS query requests and that may be mitigated by processing methods described herein. First, a distributed denial-of-service (DDoS) attack on the DNS works by having many malware-infected devices issue bogus DNS query requests for domain names that are not registered in DNS. Such domain names may be generated in part by domain generation algorithms (DGAs), which may generate random alpha-numeric strings that are unlikely to match domain names that are registered in the DNS. The DNS may search futilely through a globally distributed database for a match that will never be found, which may require significantly more work/computational resources than searches for domain names that are registered in the DNS. If a sufficiently large number of these bogus requests are issued at the same time, then the DNS may expend a large amount of computational resources attempting to service the bogus requests, resulting in insufficient computational resources to service the legitimate DNS requests and may result in a denial of service. Many networked applications, such as the web, may use the DNS, so an effective DDoS attack on the DNS may act as an indirect attack on legitimate Internet applications that utilize the DNS. If the applications (for example, web browsers) are denied DNS service, then those applications do not know how to address packets such that the packets may be routed through the Internet to the target domains (for example, web servers).

Bloom filter technology and related efficiency methods may be used to mitigate such attacks. There are approximately 500 million domain names registered in the DNS. A (space efficiency) Bloom filter with the storage size M of approximately 600 MB and with a false positive rate P=0.01 may be configured with the N=500 million registered domain names. Copies of this Bloom filter may be distributed to, for example, (inline) packet filtering devices such as TIGs, that are configured to check if the domain name in any DNS query request is registered in DNS. If the Bloom filter test indicates that the DNS filter indicates a match (e.g., True), then the packet filtering device may forward the associated packet towards the packet's destination (for example, a DNS server). If the Bloom filter test indicates that the DNS filter indicates no match (e.g., False), the packet filtering device may drop the packet (and may, for example, generate and forward a corresponding packet containing the DNS query response with an appropriate return code). By dropping the packet, the search through the DNS is skipped. By locating these packet filtering devices configured with the Bloom filters at strategic points, for example, at Internet access links, and particularly Internet access links for networks operated by DNS infrastructure providers, then many of the bogus DNS query requests may be dropped/never serviced. Thus, many of the searches through the DNS are skipped, which may sufficiently mitigate the DDoS attack such that legitimate DNS query requests are serviced at acceptable rates;

A second type of DNS attack is an exfiltration attack that may exploit the DNS by encoding stolen sensitive information as the (bogus) domain name in DNS query requests. These bogus requests are sent to collection servers, which may be posing as DNS servers or may be legitimate DNS servers over which malicious actors have control, that may extract and record the domain names in the requests. By extracting and recording the stolen information presented in the DNS query requests, the sensitive information is exfiltrated or stolen. This type of cyber attack may be called a DNS tunneling attack.

To prevent such an attack, observe that it is unlikely that the domain names in such tunneling attack requests map to domain names that are registered in the DNS. Thus, to prevent such an attack, packet filtering devices configured with a (space-efficiency) Bloom filter, called the "DNS Bloom filter", containing all the domain names registered in the DNS may be deployed at, for example, Internet access links for a protected enterprise network. Each DNS query request may be filtered by a packet filtering device configured with the DNS Bloom filter. The packet filtering device may determine, based on a test of the DNS Bloom filter, if the domain name in any DNS query request is registered in DNS. If the packet filtering device determines that the DNS Bloom filter indicates a match (e.g., a membership test returns a True result), then the packet filtering device may forward the associated packet towards its destination (for example, a DNS server). If the packet filtering device determines that the DNS Bloom filter indicates no match (e.g., a False result), the packet filtering device may drop the associated packet, which may prevent a DNS tunneling attack.

For the foregoing DNS attack mitigation applications, it may be unnecessary to use CTI supplied by a CTI provider. Instead, those DNS attack mitigation applications may become a source of CTI data. When a membership test indicates no match e.g., a false result), then the domain name being tested is determined to be not registered in the DNS. As such, the domain name may be identified as a threat indicator. The DNS attack mitigation applications therefore may be considered as sources of CTI, rather than consumers of CTI.

In a seventh example, Bloom filter technology may be used to improve performance and security by applying threat intelligence that is derived from certificates used to secure some network communications. For example, the Hypertext Transfer Protocol Secure (HTTPS) protocol for secure web/HTTP communications may use the TLS protocol to securely tunnel HTTP. During TLS tunnel setup handshakes, X.509 certificates may be exchanged between two network endpoints. These certificates may have been issued by certificate authority (CA) organizations. However, certificates and CAs may be associated with attacks or otherwise may be associated with threat risk.

Accordingly, CTI may be provided and determined for certificate and CA data. For example, CTI may be associated with revoked certificates. A CA may decide to revoke certificates that the CA has issued because the CA may believe that the certificate has been compromised in some way. For example, the private keys used during certificate generation may be determined to be stolen. CAs may publish certificate revocation lists (CRLs) that contain the serial numbers of revoked certificates. A related threat indicator may include a source and certificate data pair (e.g., {CA-Identifier, Serial Number}, where "CA-Identifier" corresponds to the "Issuer Name" value of X.509 certificates issued by the CA) that uniquely identifies the certificate. A CA may provide a server for downloading a CRL upon request or that may be queried regarding a certificate's revocation status. CRLs and CRL servers may be used, for example, by TLS endpoint applications (e.g., web browsers) and intermediaries (e.g., SSL/TLS proxies) during communication session tunnel setup to determine if a certificate associated with the communication session has been revoked. When a certificate associated with the communication session has been determined to be revoked, the communication session tunnel setup may be terminated, alerted, monitored, or otherwise handled, in order to mitigate the risk associated with using a certificate that may be compromised.

In cases in which endpoints often do not check a certificate's revocation status, a resultant TLS tunnel may be readily decrypted by malicious actors. To mitigate such a threat, a CTI provider may collect CRL data published by a plurality of public certificate authorities, may convert the CRLs into threat indicators (e.g., {CA-Identifier, Serial Number} pairs), and may provide resultant CTI available to subscribers. These subscribers may include TIGs and/or security policy managers that service TIGs. As certificate-based CTI may include millions of indicators (there are approximately 20 million revoked certificates), a TIG may use time-efficiency and space-efficiency Bloom filters for this CTI and associated packet filtering rules when configuring a packet-filtering policy for securing a network. When a packet containing a certificate transits through the TIG, the TIG may extract the Issuer Name data from the certificate (which may correspond to the CA-Identifier), and a Serial Number from the certificate. The TIG may filter the packets based on the {CA-Identifier, Serial Number} pair through the appropriate Bloom filter(s) to determine the certificate's revocation status. If the certificate has been revoked, the TIG may apply an associated packet filtering rule to the associated packet determined to include the revoked certificate.

In an eighth example, a need to insert a rule or rules into an actively enforced policy may arise, for example, during a cyber attack event. A packet filtering rule may be inserted into a policy that is currently being enforced (inline) on network packet traffic by a packet filtering device, for example, a TIG, a network firewall, a router Access Control List (ACL), and the like. For performance and integrity reasons, the packet filtering rules of a policy may be ordered, sorted, indexed, and/or otherwise optimized in such a way that inserting a new packet filtering rule while maintaining optimality, performance, and integrity may be an expensive operation with respect to time and computational complexity and may cause allocation of additional memory and/or in-memory spatial reorganization of the data (rules) stored in memory. For example, a set of packet filtering rules may be sorted and indexed in such a way as to support a (sub-linear) binary search. Inserting a new packet filtering rule into the set may cause a memory allocation for storing the new rule and a re-indexing of the set to support the binary search. Thus, it may be impractical to insert a new rule into an active policy without causing a (temporary) halt in packet filtering service, which may cause a loss of packet transmission services, and/or may cause packet losses due to buffer overflows, and/or losses of the application or function derived from the packet filtering service (for example, network security).

Data structure filtering technology may be used to address the dynamic rule insertion problems of new memory allocation and reorganization that may cause disruptions in packet transmission service and/or loss of security. At least one empty space-efficiency Bloom filter may be provisioned, during policy creation or based on a change in a security policy, for use for rule insertion during active policy enforcement by a packet filtering device. Such dynamically fillable Bloom filters may be sized (M) to include up to some number (N) of elements (e.g., threat indicators) while keeping the false positive rate (P) below a specified value. For example, a dynamically fillable, initially empty Bloom filter may be provisioned that is associated with a "Block" action, and may allow the insertion of up to 100,000 indicators (of any type), at which point the false positive rate is $10^{-12}$. When new indicators are (efficiently) inserted into the Bloom filter, there may be no need to allocate additional memory for storing the new indicator, nor may there be a need to reorganize the indicators in the set. Thus, adding new rules to the policy may not cause any new memory allocations nor any spatial reorganization of data in memory, and thus there is no loss of service or security. The side effect of indicator insertion is an increase in the Bloom filter's false positive rate. But, when less than 100,000 indicators have been inserted into this dynamically fillable Bloom filter, then the false positive rate will be less than the required maximum of $10^{-12}$. When more than 100,000 indicators have been inserted, then the false positive rate may exceed the maximum false positive rate of $10^{-12}$, but this may not cause loss of service or security. The insertion operation may not be considered efficient when the size of the set exceeds a threshold (e.g., time complexity of the search may vary with the magnitude of the logarithm of the false positive rate P) and does not cause any new memory allocations nor any spatial reorganization of data in memory. Thus, packet filtering service, and thus packet transmission service, should not be adversely affected by insertion of a rule into the active policy.

Another approach to the dynamic rule insertion problem is to allow for insertion of a new threat indicator and rule into an actively enforced policy without provisioning a dynamically fillable, initially empty Bloom filter. A new rule may be added or inserted into the active policy by inserting an associated indicator into an appropriate space-efficiency Bloom filter. As additional indicators are added, the associated filter's false positive rate will increase. Such a Bloom filter may have a threshold limit for additional indicators, and that limit may be associated with a threshold false positive rate considered to be tolerable for the associated application. The threshold false positive rate may be set by a system or policy administrator.

The first approach to rule insertions during active policy enforcement, using a dynamically fillable, initially empty Bloom filter, may be more effective when the number of rule insertions is expected to be relatively large compared to the number of rules in the policy (at policy creation time), and when false positive rates must be strictly maintained or have relatively low tolerances. The second approach to rule insertions during active policy enforcement may be more effective when the number of rule insertions is expected to be relatively small compared to the number of rules in the policy (at policy creation time), and when false positive rates have relatively high tolerances. As noted above, standard Bloom filters do not support element deletions from the set. As such, for applications that may require rule deletions, (probabilistic) data structures that have similar properties as standard Bloom filters but that also support efficient element deletions, such as some Bloom filter variants, Cuckoo filters, and the like, should be used to represent policies.

Bloom filters may also be used to ensure privacy for some CTI applications. For example, consider a first organization Org X that collects threat intelligence/threat indicators on threat actors in the form of network addresses. The first organization Org X may want to distribute a set of these indicators to a second organization Org Y, so that Org Y may search for/detect these indicators in network communications traffic. However, in some cases, such indicators may be considered highly sensitive (e.g., classified or sensitive personal information); therefore, Org X may not want to publish/distribute the indicators in a form that may compromise the privacy of the indicators. Org X may not want Org Y to be able to identify the indicators in the set, in case, for example, that Org Y leaks them to or allows them to be stolen by malicious actors. Yet Org X wants Org Y to be able to detect when these indicators appear in network communications traffic.

Bloom filter technology may be used to achieve these multiple objectives. Org X may Insert( ) the indicators into a sensitive data Bloom filter B, and an indicator encoding algorithm may be used to populate sensitive data Bloom filter B. The Insert( ) function encodes the set of indicators in such a way that it is computationally intractable to invert the encoded indicators and thus determine the indicators in the set, even when the encoding algorithm used by the Insert( ) function is known. Thus, Org X can distribute sensitive data Bloom filter B to Org Y without compromising the privacy of the indicators contained in B. Furthermore, if the sensitive data Bloom filter B or the data structure's bit vector is stolen by malicious actors, the malicious actors similarly have no way of determining the indicators in the set. At the same time, Org Y can use a sensitive data Bloom filter B to detect occurrences of the indicators in network communications traffic by extracting network addresses in the traffic, and then testing the network addresses for membership in B.

Furthermore, the first organization Org X may want to control which external entities are able to perform membership tests on sensitive data Bloom filter B. For example, in some situations, Org X may want the second organization Org Y to be able to perform membership tests on sensitive data Bloom filter B, but Org X may not want a third organization Org Z, which is associated with some set of threat indicators, to be able to test for membership of those indicators in sensitive data Bloom filter B if Org Z has obtained a copy of the bit vector contained in sensitive data Bloom filter B. In other words, Org X may not want Org Z to know that Org X has collected threat intelligence associated with Org Z.

To perform a membership test Member( ) on sensitive data Bloom filter B, the Member( ) function must use the same encoding algorithm A used by the Insert( ) function to populate the sensitive data Bloom filter B with the indicators. The encoding algorithm A is composed of specific arithmetic combinations of certain selected hash functions and simulated hash functions. Thus, Org X may secretly and/or securely share the encoding algorithm A with Org Y, and may separately distribute to Org Y only the bit vector contained in B instead of B itself. Org Y may perform membership tests on sensitive data Bloom filter B. Org X may not share the encoding algorithm A with Org Z, so that even if Org Z obtains a copy of the bit vector contained in B, Org Z cannot perform membership tests on sensitive data Bloom filter B.

The subject matter described herein may be implemented using any combination of hardware, software, or firmware. For example, the subject matter described herein may be implemented using a non-transitory machine-accessible and readable medium having stored thereon machine-executed instructions for controlling the machine to perform steps. Exemplary machine readable media suitable for implementing the subject matter described herein include disk memory devices, chip memory devices, programmable logic devices, application specific integrated circuits, and downloadable electrical signals. In addition, a machine readable medium that implements the subject matter described herein may be implemented using a single device or computing platform or may be distributed across multiple devices or computing platforms. Other details and features will be described in the sections that follow.

Turning to the topic of DNSes, a DNS is not strictly necessary for many networked applications, such as HTTP-mediated applications such as the World Wide Web (www), to function effectively over the Internet or another network. As used herein, a DNS may be public or private such that, for example, the DNSes discussed herein may be associated with the Internet or an Intranet. In practice, however, the Internet's DNS may be necessary because many Internet networked applications often critically depend on the DNS being available to quickly and efficiently resolve domain names into IP addresses. Thus, if the DNS is not readily available to service these networked applications, the networked applications may become unavailable. Since the global economy and society have become critically dependent on these networked applications, it may be disastrous when some Internet applications are not functioning effectively.

Malicious actors may cause massive disruptions to the global economy and society if those actors can successfully attack the DNS itself. Indeed, such attacks have occurred, which have publicly exposed the fact that the DNS does not have adequate protections to prevent such attacks. One type of direct attack on the DNS may use a large botnet, such as a large number of infected Internet-of-Things (IoT) devices, to send many DNS query requests to resolve domain names that may not be registered in the DNS. Each such request causes the DNS to search through its globally distributed database before determining that the domain name is not in the DNS and therefore cannot be resolved to an IP address. When a sufficiently large number of these malicious unresolvable requests are sent at a sufficiently high rate, the DNS may expend a large majority of its resources servicing these malicious requests while under-servicing, or denying adequate service to, the legitimate requests, which may cause the associated legitimate network applications to be unavailable. This type of attack is an application-level DDoS attack on the DNS.

Unregistered domain names may also be used to execute some exfiltration attacks, to steal sensitive data via the Internet. For example, a malicious actor may have penetrated a private enterprise network and installed malware that finds and collects sensitive information with potential value, such as a database of credit card information. The malicious actor may want to retrieve/transfer and collect this sensitive information via the Internet without being detected by the enterprise network administration. That is, the malicious actor may attempt to exfiltrate the information. One way to exfiltrate sensitive information, such as credit card information (e.g., card1234123412341234), is to encode sensitive information in a bogus domain name (e.g., card1234123412341234.www.example.com), insert the bogus domain name in a DNS query request message, and send the bogus DNS query request message to an external host posing as a DNS server, where the host is owned/operated or otherwise controlled by the malicious actor. Because enterprises often configure network firewalls to allow most or all outbound DNS query requests to any external destination, this type of attack may often succeed. It may be unlikely that the bogus domain name would match a domain name that is registered in the DNS. As such, it may be possible to identify DNS attacks using an unregistered domain name as an attack vector.

Note that there are some legitimate, non-malicious reasons for sending DNS requests with unregistered domain names into the DNS. For example, because the DNS is architected and implemented as a "lookup" service for certain types of information (i.e., translating domain names to IP addresses), some companies and their products leverage the DNS's lookup service for their own purposes, wherein unregistered domain names are used to transfer and exchange information. A typical approach for such a company is to register a domain in the DNS, for example, "leverage-DNS.net", and then configure and operate a DNS authoritative name server for "leverage-DNS.net". Thus, the DNS will route DNS requests for resolving domain names with the suffix "leverage-DNS.net" to this authoritative name server. For example, a hosted application instance X may issue a DNS request containing the (unregistered) domain name "lookup.5h6di89wp77.leverage-DNS.net". The DNS routes this DNS request to the name server "leverage-DNS.net". The name server may execute logic that, for example, extracts the label "5h6di89wp77" from the domain name, searches a local database for a record that is indexed by the key "5h6di89wp77", and then returns the record in the DNS response corresponding to the DNS request. This DNS response may be routed to the application instance X, thereby completing the data exchange.

Practical implementations of the present disclosure should account for such non-malicious uses of DNS requests with unregistered domain names. For example, a database of the names of authoritative name servers used for legitimate data exchange may be maintained and accessed by applications that want to determine if a particular unregistered domain name may be a component of a legitimate data exchange operation. Practical implementations should also account for scenarios where such associated systems may be exploited in some way by malicious actors.

In the following description, a general approach for protecting the DNS against attacks that use unregistered domain names contained in DNS requests as the attack vector is presented. The system may include DNS attack prevention logic that may be deployed in devices inserted at strategic locations in the network or configured to be run by one or more devices in the network. For example, the DNS attack prevention logic may be installed in (transparent or non-transparent) computing devices (e.g., appliances) in network paths that may be at or near originators of DNS query requests, or may be installed near DNS name servers that resolve DNS requests, or may be installed on endpoints, or may be installed on proxies that may terminate DNS sessions. For example, the use of protocols that encrypt DNS sessions, such as DoT (RFC 7858) and DoH (RFC 8484), may require that the DNS attack prevention logic be installed inside the man-in-the-middle of proxy devices. Each of these appliances and associated DNS attack prevention logic may include a DNS Gatekeeper function (hereafter abbreviated as "DNS-G/K") that may control access to the DNS and its resources. A DNS-G/K may execute DNS attack prevention logic and associated algorithms. The DNS attack prevention logic may detect in-transit DNS query request messages (contained in in-transit packets), and DNS attack prevention logic may determine the domain name contained in the qualified name, or QNAME, field.

The DNS attack prevention logic may determine if the domain name, from the message being analyzed, is registered in the DNS, without querying the DNS. If the DNS attack prevention logic determines a True value, indicating that the domain name is registered in the DNS, then the DNS attack prevention logic may forward the packet containing the DNS query request message towards its destination. That is, the DNS attack prevention logic may forward the query request message towards a DNS resource such as an authoritative name server. Otherwise, when the DNS attack prevention logic determines a False value, indicating that the domain name is not registered in the DNS, the DNS attack prevention logic may execute a DNS protective action. For example, the DNS attack prevention logic may drop the packet containing a bad DNS query request (such as a mistyped domain name) or bogus DNS query request (which may be part of an exfiltration attempt or DDoS attack) to avoid the wasting of DNS resources or the transferring of stolen data. The DNS attack prevention logic may generate a corresponding DNS query response with a response code (such as 'NXDOMAIN') and send the response back towards the source of the bad or bogus DNS query request, or may log and capture the bad or bogus DNS query request and may (i) report the source IP address of the bad or bogus DNS query request so that network authorities can examine the source host for malware infection and, if necessary, may remove the malware or otherwise prevent the host from attacking the DNS; and/or (ii) report the unregistered domain name so that authorities/analysts can check for potential attacks that use the domain name as a vector and/or use the domain name as threat intelligence and/or as training data for machine learning systems and/or as input to global DNS/Internet protection systems, etc. Based on multiple factors described below, for the purpose of network protection, it may be more protective to not generate or prevent sending of a DNS response to the origin of the request.

The above discussed test for the existence and/or registration of the domain name in the DNS may minimize or eliminate usage of DNS resources to process bad requests, and may advantageously also be as close to instantaneous as possible relative to packet transmission times and network performance metrics. That is, the latency added by the test and the overall DNS-G/K function should be relatively low or it may not be implemented, and should be efficient with respect to computational time, space/memory, and processing resources. Recall from above that, for example, a probabilistic data structure called a Bloom filter may satisfy these criteria. A Bloom filter (a) space-efficiently stores the elements of a set, (b) time-efficiently inserts elements into a set, and (c) time-efficiently determines if an element is a member of a set. Bloom filters are parameterized by P, a false positive rate, which may comprise probability that a set membership test for an element returns True when in fact the element is not a member of the set. For Bloom filters, the false negative rate is zero. That is, if a set membership test for an element returns False, it may be determined that the element is not a member of the set.

Bloom filters may be used to test for the existence/registration of the domain name in the DNS to efficiently determine if a given domain name is a member of the set of all domain names that may be currently registered in the DNS. For example, a Bloom filter of size approximately 1.8 GBytes is sufficient to store 500 million Bloom filter encoded domain names when the false positive rate $P=10^{-6}$. This Bloom filter containing 500 million elements can instantaneously determine if a given domain name is a member of the set, even when the false positive rate P is very low (e.g., $10^{-6}$ or one in a million). Space and time requirements vary with the magnitude of the logarithm of P. As such, decreasing the false positive rate $P=10^{-6}$ by a factor of one million to the false positive rate of $P=10^{-12}$, or one in a trillion, only causes space and time requirements to increase by a factor of 2. For comparison, at the present time of disclosure, the DNS contains on the order of one-half billion, or 500 million, registered domain names. For comparison, consider that the average size of domain names in the DNS is approximately 20 bytes, and thus the memory requirement for storing 500 million un-encoded domain names is approximately 10 GB; whereas the Bloom filter above with $P=10^{-6}$ requires approximately 1.8 GB of memory.

For the remainder of this specification, the Bloom filter (which may be abbreviated henceforth as "B/F") data structure will be used in the description of the disclosure, but this choice is exemplary and not meant to be limiting or restrictive in any way. As also discussed above, any data structure with sufficient and similar time and space efficiencies for storing a set of elements, inserting elements into the set, and testing elements' membership in a set may be used. For example, a Cuckoo filter has similar time and space efficiencies as a Bloom filter, and also has the capability to efficiently delete, or remove, elements from the set—a capability that a standard Bloom filter does not have. Some Bloom filter variants have been developed that support a delete capability. The capability to efficiently delete elements from a set may prove useful in some applications, implementations, and/or embodiments. The data structure may support an Insert( ) function for adding an element to the set, may support a Boolean-valued Member( ) function for testing set membership of an element, and may support a Delete( ) function for removing an element from a set. The following description also assumes that the data structure is probabilistic and is therefore associated with a non-zero false positive rate P, but again this choice is exemplary and not meant to be restrictive in any way.

A list of all domain names that are registered in the DNS may be created by aggregating lists and sublists, often called zone lists or zone files, of registered domain names. The lists may be obtained from multiple DNS registry operator organizations or associated delegates, from authoritative name servers that discover or publish their zone files, as well as from domain list aggregator services. However, some registrars for country code zones typically do not publish their zone files to any $3^{rd}$ parties. As such, some registered country code domains may need be discovered by other means, such as web crawling, and published. Such domains may be discovered by $3^{rd}$ party service providers. Regardless of the methods of collection, 100% complete lists of registered country code domains may not be available. This uncertainty may be factored in to the DNS protection logic of a DNS gatekeeper DNS-G/K.

A Bloom filter (referred to additionally and/or alternatively as DNS-REG or as a Bloom filter DNS-REG) may be created from this list. The Bloom filter DNS-REG may be created by a centralized service or server, which may generate the Bloom filter DNS-REG and distribute copies of the Bloom filter DNS-REG and associated DNS protection logic to subscribers, which may include one or more DNS gatekeepers (DNS-G/K). The centralized service may be associated with a management server that manages subscription services for the Bloom filter DNS-REG. The management server may store a plurality of Bloom filters DNS-REG, and may be configured to assign a particular Bloom filter DNS-REG to each device registering for the service. The particular Bloom filter DNS-REG may be selected by the management service based on processing capabilities of the subscribing device.

The Bloom filter DNS-REG may contain all domain names that are registered in the DNS, and may be associated with logic functions. The logic functions may include a Boolean-valued function Insert-Into-DNS-REG( ) which accepts a domain name as input, may insert the domain name into the set DNS-REG, and may return a True value if the insertion operation was successful or a False value if the operation was not successful. The logic functions may also include a Boolean-valued test function Member-of-DNS-REG( ), which accepts a domain name as input, and may return a True value if the input domain name is an element, or member, of the Bloom filter DNS-REG, and may return a False value if the input domain name is not an element of the set. Another logic function may be a delete element function Delete-from-DNS-REG( ) that may remove a specified element from the set DNS-REG. A delete element function may be useful for some applications, including updating a Bloom filter DNS-REG when domain names are de-registered from the DNS.

A DNS gatekeeper DNS-G/K may include logic for ingesting/receiving in-transit packets, for buffering and queueing packets, for forwarding or dropping packets containing DNS requests, for extracting domain names (e.g., QNAME field values) from DNS requests, for managing a local copy of DNS-REG and associated subscriptions to the centralized service, for invoking the functions Insert-Into-DNS-REG(and Member-of-DNS-REG( ) and Delete-From-DNS-REG( ), for logging and reporting invocations of Member-of-DNS-REG( ) that return False, for deciding whether or not to generate and forward corresponding DNS responses to sources or originators of the bad or bogus DNS requests, and the like. The DNS-G/K may be included or embedded in host operating systems such as Linux that manage DNS requests on behalf of application instances. For example, DNS-G/K logic may be included in web browsers, that originate/source/issue the DNS requests, or embedded in DNS stacks such as BIND, which is a known DNS server software used in both DNS authoritative name servers and DNS recursive resolvers. The DNS-G/K may be implemented as a micro-service that manages Bloom filter DNS-REG and filters DNS requests through Bloom filter DNS-REG.

These DNS gatekeepers (DNS-G/K) may be embodied in appliances and host computers, including endpoint elements, that may be broadly distributed across the Internet and that may be inserted in the network paths of DNS requests, including path terminals at origin endpoints and destination endpoints. These appliances and hosts may include DNS proxies, DNS servers, DNS resolvers, DNS name servers, network firewalls, network proxies, network gateways, network appliances, routers, switches, endpoints, and the like. DNS-G/K may also be deployed in Internet-attached networks operated by DNS registrar companies, DNS infrastructure and hosting service providers, and other organizations that may operate DNS registration services or DNS name servers for multiple DNS registrar companies or other organizations that may have many DNS requests entering and leaving their networks.

As the DNS may be continually registering new domain names, Bloom filter DNS-REG may be updated periodically (e.g., hourly, daily or weekly). The Bloom filter DNS-REG may be updated by a centralized service or management server and distributed, via push or pull mechanisms, to DNS-G/K subscribers. Alternatively or concurrently, the centralized service or management server may collect newly registered domain names from registrar organizations or their delegates, from $3^{rd}$-party domain list aggregator organizations, from authoritative name servers that discover their zone files, and/or from DNS authorities such as ICANN, or the like. The newly collected domain names may be provided in a feed to DNS-G/K subscribers, or may be provided to DNS-G/K subscribers as part of an update package. As the DNS-G/K subscribers receive such a feed, the subscribers may insert the domain names into their local copies of Bloom filter DNS-REG, by invoking the Insert-Into-DNS-REG( ) function or generating an updated DNS-REG. Similarly, the centralized service or management server may collect newly de-registered domain names, and may provide a feed to DNS-G/K subscribers that contains newly/recently de-registered domain names. As the DNS-G/K subscribers receive this feed, the DNS-G/K subscribers may delete the domain names from their local copies of Bloom filter DNS-REG by invoking the Delete-From-DNS-REG( ) function.

A DNS gatekeeper DNS-G/K may include logic to handle false positives, and may include logic to handle lag issues, which is described in more detail below, associated with Bloom filter DNS-REG. Such logic may be used in alternatives to the logic to forward the packet containing the DNS query request message towards its destination or to the logic to execute a DNS protective action above.

Regarding false positives, as noted above a Bloom filter is a probabilistic data structure that may be parameterized by a false positive rate P. The probability of a false positive P, which is associated with a membership test to determine if an element is contained in the Bloom filter, is a likelihood that the membership test may falsely return a True value. The Bloom filter may be an instance of Bloom filter DNS-REG. The logic may determine if the domain name of the packet being tested is registered in the DNS. The system may perform a membership test for a given domain name, with probability of a false positive P, is in Bloom filter DNS-REG. The membership test may incorrectly return a True value when in fact the domain name is not contained in Bloom filter DNS-REG. The logic to forward the packet containing the DNS query request message towards its intended destination may be executed, which may forward a bad or bogus DNS request towards its destination. That is, a potential attack associated with the bad or bogus DNS request may not be prevented or mitigated.

In the case that the bad or bogus DNS request is part of a DDoS attack on the DNS, the adverse effects of a false positive test result may be small. This is because it is likely that, assuming a reasonable value for the false positive rate P, most bogus DNS requests may be detected. When most bogus DNS requests are detected, those detected bogus requests do not cause false positives, and may therefore be blocked/dropped or otherwise handled as in the logic to execute a DNS protective action. Thus, it is unlikely that false positives will cause the DDoS attack to succeed, as a large number of bogus requests must be allowed in order for the DDoS attack to succeed. In the case that the DNS request is part of a DNS tunneling attack, for example as part of a data exfiltration operation, then the adverse effects of the false positive may be large, depending on the sensitivity of the exfiltrated information and/or the dependency of the exfiltrated information on other information that is blocked/dropped in the logic to execute a DNS protective action. For example, if the false positive contains a stolen root password, then the adverse effect may be significant. Conversely, if the false positive contains a small portion of a large file, then the exfiltrated information may have little to no value because its value depends on the context of the remainder of the file, which may not be successfully exfiltrated because the remainder of the associated information is included in separate DNS requests, determined to be true positives, that may be blocked/dropped by the logic to execute a DNS protective action.

The false positive rate P may be selected such that a false positive may be unlikely to occur in practice. For example, the false positive rate may be selected such that the false positive rate $P=10^{-12}$ or less. The tradeoff is that the smaller the false positive rate P is, the more memory is required for storing Bloom filter DNS-REG. The memory storage imposes a practical limit on the false positive rate P. However, different DNS-G/K subscribers may have different requirements and constraints for the false positive rate P and have different requirements and constraints for memory/storage of a Bloom filter DNS-REG. Thus, the centralized service or management server that provides Bloom filter DNS-REG may also provide different versions of Bloom filter DNS-REG that may be parameterized by different false positive rates P and thus different in-memory sizes of Bloom filter DNS-REG. The centralized service or management server may allow each subscriber to choose which version of Bloom filter DNS-REG the subscribers want access to or delivery of, with selection criteria being the combination of the false positive rate P and an associated memory size.

The centralized service, which may be provided by a management server, may select or assign a particular Bloom filter DNS-REG based on the processing capabilities of a computing device. The management server may be configured to retrieve memory capacity information from a third party device, such as from a product data sheet from a manufacturer website or a sales website. The management server may determine a particular Bloom filter DNS-REG to assign to a computing device based on memory size of a computing device, a false positive rate P limit for a security policy associated with the computing device, or lag limits of a computing device.

A management server may also receive information regarding DNS request handling from a plurality of different DNS-G/K subscribers. This information may include the domain names of monitored DNS query requests that were not found in a particular local Bloom filter DNS-REG, but were confirmed to include a valid domain name when the request was allowed to continue and was confirmed to be valid by the DNS-G/K based on a response from the DNS. The information may also include logged data relating to DNS requests which are determined to be bogus, either by testing a particular local Bloom filter DNS-REG or by monitoring for a DNS response to a DNS query request that was allowed to continue to its intended destination. The information may include at least a source, an intended destination, and other packet information of such DNS query requests.

The DNS-G/K's DNS protection logic may also factor in the value of the false positive rate P with other parameter values. Other parameter values may include DNS request rate values (described below), when deciding how to process DNS requests. For example, the handling of a True instance of Member-of-DNS-REG( ) may differ depending on the value of the false positive rate P associated with the local Bloom filter DNS-REG. For example, a first DNS-G/K with a local Bloom filter DNS-REG with a relatively high false positive rate P may be more likely to conclude that a True result of a membership test may be a false positive than a second DNS-G/K with a local DNS-REG with a lower value of P. The first DNS-G/K may thus handle the associated DNS request differently than the second DNS-G/K. For example, the first DNS-G/K may decide to drop the DNS request anyway, because of the relatively high likelihood of a false positive, in combination with other parameter values such as a DNS request rate value and other determined attack status values, while the second DNS-G/K may forward the request towards the DNS.

Regarding the lag mentioned above, a lag may occur when an instance of DNS-REG does not contain the same set of registered domain names as the actual DNS. For example, a domain name XYZ may have been recently registered in the DNS, but the domain name XYZ may not have been distributed by the centralized service or management server as an update to the distributed systems implementing a Bloom filter DNS-REG. That is, at a particular point in time, the DNS-G/K may not have downloaded the newly available version of Bloom filter DNS-REG. This type of lag may be called synchronization lag. Another example is a type of lag that may occur with country code domains. As discussed above, because registrars for country code zones typically do not discover their zone files to any $3^{rd}$ parties, non-deterministic methods such as web crawling may be used to compile lists of country code domains, with the result being that 100% complete lists of registered country code domains may not be available to a particular device or system. This type of lag may be referred to as a registration lag or a country-code lag.

Based on these types of lag, it may be possible, for a given executed instance of the Member-of-DNS-REG( ) test, to determine if the domain name XYZ of the packet being tested is in the DNS-REG, to return False, indicating a determination that the domain name XYZ is not registered in DNS. Based on that determination, the logic to execute a DNS protective action may be executed, and that logic may be configured to drop or block the tested DNS request. When the domain name XYZ is registered after the last update of the DNS-REG, this test does not reflect the validity of the recently registered domain name XYZ. The dropping of a valid DNS request, due to a delay in updating the DNS-REG, may be referred to as a "lag-drop".

The adverse effect of a lag-drop may be dependent on the intent of the actor that issued the associated DNS request. For example, if a legitimate or non-malicious actor issues a valid DNS request that is dropped by the DNS-G/K because of lag, then the adverse effect of the lag-drop may be considered significant because a legitimate business transaction may fail to complete. This example indicates that in the logic to execute a DNS protective action above, it may not be desirable to drop or block the DNS request. Conversely, some DNS requests for resolution of recently registered domain names may be associated with malicious activity, in which case the effect of a lag-drop may be considered non-adverse, desirable, or beneficial. For such requests associated with malicious activity, it is desirable that the logic executes a DNS protective action to drop or block the DNS request. As described above, in some implementations, it may not be practical to determine if a False return value for Member-of-DNS-REG( ) is due to lag or due to the input domain name being a bogus name that is never intended to be registered in the DNS. In practice, it may be more likely that a False return value is due to a bogus DNS name than to a lag issue; thus, in the logic to execute a DNS protective action, dropping or blocking the DNS request may be preferable to forwarding or allowing the DNS request.

One alternative to dropping or blocking in the logic to execute a DNS protective action may be to forward or allow the DNS request, but log the DNS request and monitor subsequent network traffic for the corresponding DNS response that is returned by the DNS. When the associated domain name has been determined to not be registered in DNS, the corresponding DNS response may include a response code of NXDOMAIN. Also, when there is no corresponding DNS response, the logic may determine that that the request is a bad or bogus DNS request associated with an attack. A cybersecurity application may then analyze the logged DNS request, for example, to determine if the DNS request may be associated with a DNS tunneling attack or exfiltration attack. The logic may determine a probability that a request is associated with a legitimate request, and based on a determination that the probability that a request is legitimate exceeds a threshold, the logic may allow a request determined to be legitimate to proceed to the DNS for resolution.

When the corresponding DNS response includes an IP address that resolves the domain name, or the logic determines that the domain name is registered in the DNS, then the False return value of Member-of-DNS-REG( ) may be determined to be associated with lag. For example, if a DNS request includes a domain name with a suffix that is a country code top-level domain (ccTLD), then the logic may determine that the DNS request is associated with a lag issue due to issues with collecting all country code domains. As such, the logic may determine that the DNS request is likely to be associated with communications that may be non-malicious. If the DNS request does not include a domain name with a country code TLD, the logic may determine that any lag issue may be a synchronization lag scenario, as discussed above for DNS requests containing recently registered domain names. As the logic may determine that the DNS request may be associated with malicious activity, the logic may monitor the DNS request with a cybersecurity application for subsequent activity associated with the DNS request and/or for a request response. That monitoring may allow the logic to determine if the subsequent activity, such as an HTTP(S) session that is associated with the IP address provided by the DNS response, and any associated actor(s) may be malicious. Based on a determination that the domain name in the request is valid, the DNS-G/K may insert the registered domain name into a local copy of Bloom filter DNS-REG, and may communicate the domain name determined to be a registered domain name to the centralized service or management server that distributes copies of Bloom filter DNS-REG to subscribers.

When a bad or bogus DNS request is detected, which may be associated with a DDoS attack on the DNS, the logic may execute a DNS protective action to drop or block the request in order to prevent or mitigate the attack. As described above, it may not be practical to determine if a bad or bogus DNS request is associated with a DDoS attack or with another type of attack. However, the logic may estimate if a bad or bogus DNS request is associated with a DDoS attack by determining when the associated system is seeing a high rate of bogus DNS requests, which is a characteristic of a DDoS attack. If an invalid DNS request is observed when the current rate of observed invalid DNS requests is higher than normal, the logic may determine that the high rate of invalid requests indicates that a DDoS attack is occurring. The rate of invalid DNS requests may be compared to a threshold. When the logic determines that it is probable that a DDoS attack is occurring, the logic may execute a DNS protective action logic to drop or block the DNS request. The logic may execute a DNS protective action logic to drop or block the DNS request when the rate of invalid DNS requests may be compared to a threshold.

The rate thresholds may be set for each device. The threshold rate of invalid DNS requests may be determined based on an initial rate of invalid DNS requests during a period of normal operation (when, for example, there are no active DDoS attacks occurring). For example, the logic may monitor a rate of invalid DNS requests over a period of time. As network traffic may vary by time of day and day of a week, the rate of invalid DNS requests may be tuned to specific times of day or days of the week. For example, for an enterprise network, an expected rate of bad DNS requests may be higher during a working day lunch hour than on a weekend evening. For a home network, an expected rate of invalid or bogus DNS requests may be higher during a weekend evening than during a working day lunch hour. Each specific gatekeeper device may have different rates based on a plurality of factors, including the location and network associated with device. For example, a home network based device may have substantially lower overall traffic compared to an enterprise network. Each specific gatekeeper device may be configured to monitor rates over time to adjust an expected rate of invalid or bogus DNS requests.

The rate thresholds may be set relative to a false positive rate P of the Bloom filter DNS-REG. That is, with respect to the false positive rate P of the Bloom filter DNS-REG, the threshold may be set to allow more possibly bogus requests to be passed to an intended destination in order to monitor for responses to determine possible registration lags with the Bloom filter DNS-REG. When there is a lower false positive rate, the DNS-G/K may set a lower rate threshold, which may allow more possibly bogus DNS query requests to be forwarded to their intended destinations. When the false positive rate is higher, the DNS-G/K may set a higher rate threshold, which may allow fewer possibly bogus DNS query requests to be forwarded to their intended destinations.

Generating an associated DNS response may exacerbate the DDoS attack by filling up DNS caches in any intermediate DNS servers. When the logic determines that it is probable that a DDoS attack is occurring, the logic may drop or block the DNS request without generating an associated DNS response (e.g., a response with RCODE:3=NXDOMAIN). If instead the logic determines that a request is a bogus DNS request while the current rate of observed bogus DNS requests is not higher than normal, the logic may execute a DNS protective action to forward or allow the DNS request and also log, monitor, and/or cyber analyze the associated event to determine the likelihood of an attack, the severity of an attack, and potential remedial action. To determine whether a DDoS attack is occurring, the logic may determine if a current rate of bad DNS request queries satisfies a threshold.

One method to estimate the normal rate of bogus DNS requests is to measure the time interval between each observation of a bogus DNS request and then use an efficient algorithm to estimate the average interval (and therefore the normal rate). The observed average interval between bogus DNS requests during a period when a DDoS attack is not occurring may be greater than the observed average interval between bogus DNS requests during a period when a DDoS attack is occurring. The logic may monitor and continually estimate the average time between observations, or inversely may monitor and continually estimate the rate of observations. Those average intervals may be estimated based on an exponentially weighted moving average (EWMA) method, or based on an exponential smoothing method. Exponential smoothing is time and space efficient because each update to the estimate after each observation requires only a constant-time computation (typically two multiplications and one addition), and typically only three values need be stored at any time.

An estimate of the average rate of bogus DNS requests may be determined to establish a baseline. When the estimate of the average rate of bogus DNS requests has been determined, a change in an estimated average rate of bogus DNS requests may be efficiently determined. The change may be estimated using, for example, an exponential averaging computation applied to the sequence of estimates of the average rate of bogus DNS requests. When there is no DDoS attack, the calculated change in the estimated average rate of bogus DNS requests should be close to zero. When the system determines that there is no DDoS attack, the logic may execute a DNS protective action to forward or allow the bogus DNS requests, while also performing a log, monitor, or analyze function on the bogus DNS request and the corresponding DNS response, if any. When a DDoS attack is launched, the calculated change in the estimated average rate should be non-zero and positive. When a DDoS attack is determined to be launched, the logic to execute a DNS protective action may drop or block bogus DNS requests. Furthermore, if the calculated change in the estimated average rate of bogus DNS requests becomes relatively large and positive (increasing), the logic to execute a DNS protective action may be modified to drop a bogus DNS request without generating a corresponding DNS response with an NXDOMAIN response code.

This alternative protective action may be implemented because devices that may be generating bogus DNS requests, including such requests during a DDoS attack, typically do not care about receiving the DNS response. As the devices generating the requests do not care about the responses, computational resources consumed by the DNS-G/K to generate DNS responses may be wasted, and may increase the effectiveness of a denial-of-service attack on the DNS-G/K. When DNS responses with NXDOMAIN response codes may be generated during such a DDoS attack, the DNS caches in intermediate DNS servers may fill up with NXDOMAIN responses to bogus DNS requests. In this case, DNS responses, which may include resolved IP addresses, to legitimate DNS requests may not be cached at intermediate DNS servers, which causes increasing DNS resource consumption to service legitimate DNS requests, which may further exacerbate the DDoS attack. This scenario may be considered a denial-of-service attack on DNS caches, and by extension an attack on the DNS.

When a DDoS attack subsides, the logic may detect a change in the estimated average rate of bogus DNS requests. The change in the estimated average rate of bogus DNS requests may be determined to become negative as the attack begins to subside. Based on the determination that the attack has begun to subside, the logic may begin to execute a DNS protective action to generate DNS responses with NXDOMAIN response codes when bogus DNS requests are detected and dropped.

In scenarios where attacks are not determined to be presently occurring, during initial periods of measuring bogus DNS request rates, and/or when the DNS-G/K is located such that it only observes a relatively small number of bogus DNS requests (e.g., at the edge of a well-protected private network), the sample size of bogus requests may be too small to compute accurate estimates. In these scenarios, as described in more detail above, it may be useful to also estimate rates associated with all DNS requests. The system may determine request rates associated with both bogus and legitimate DNS requests, and may compare the ratios of request rates of bogus DNS requests to request rates of all DNS requests. When a ratio of bogus requests to all requests changes significantly, the logic may determine that an attack is occurring. The ratio of bogus requests to all requests may be used to determine whether the system should generate and transmit a DNS response to a possible bogus request.

FIG. 1 depicts a representative environment 100 that may include packet filtering devices such as threat intelligence gateways (TIGs) 200 and 250 for securing networks 112 and 114 by enforcing CTI-derived policies provided by a security policy manager (SPM) 120. The TIGs 200 and 250 may be inserted inline in network access links 106 connecting networks 112 and 114 with network 110. Network 110 may be the Internet, which provides interconnection services between networks 112, 114, 116, and 118 and may enable communications between IP-addressable hosts 120 and 130-137 attached to the networks. The TIGs 200 and 250 may be physical or logical, and the networks' intra-connections and inter-connections may be wired, wireless, physical, virtual, and/or logical/software defined, in any combination.

Network 112 may be an exemplary enterprise network protecting its networked corporate assets using CTI-derived policies and a TIG 200 that implements aspects of the present disclosure, such as very large policies that require the space, time, and resource efficiencies achieved by the disclosure. TIG 200 may be subscribed to SPM 120 for policies derived from CTI that is supplied by many CTI providers and that spans a range of indicators, indicator types, attack types, risk values, indicator fidelities, etc., resulting in policies composed of tens of millions or hundreds of millions of packet filtering rules that may be characterized by their associated threat indicators.

Network 114 may be an exemplary network operated by a DNS infrastructure and managed services provider organization, with networked corporate assets that include DNS servers and proxies, for example hosts 132 and 133, that handle large volumes of DNS traffic, often on behalf of organizations that value high-performance DNS services, such as DNS domain name registry operators, authoritative name server providers, large global enterprises, content delivery network providers, ISPs, and the like. Network 114 is protected by TIG 250, which may be subscribed to SPM 120 for policies derived from CTI, and which may be configured with packet filtering logic that may determine if domain names included in packets are registered in DNS.

Network 116 may be a corporate enterprise network that is not protected/secured by TIGs and associated policies. Hosts 134 and 135 attached to Network 116 may be infected by malware or otherwise controlled by malicious actors.

Network 118 and associated networked assets may be controlled/operated by an organization of malicious actors. Network 118 is not protected/secured by TIGs and associated policies. Hosts 136 and 137 attached to Network 118 may be used by the organization to execute various attacks on remote network assets via Network 110 (e.g., the Internet), such as Networks 112, 114, and 116.

Figure 2:
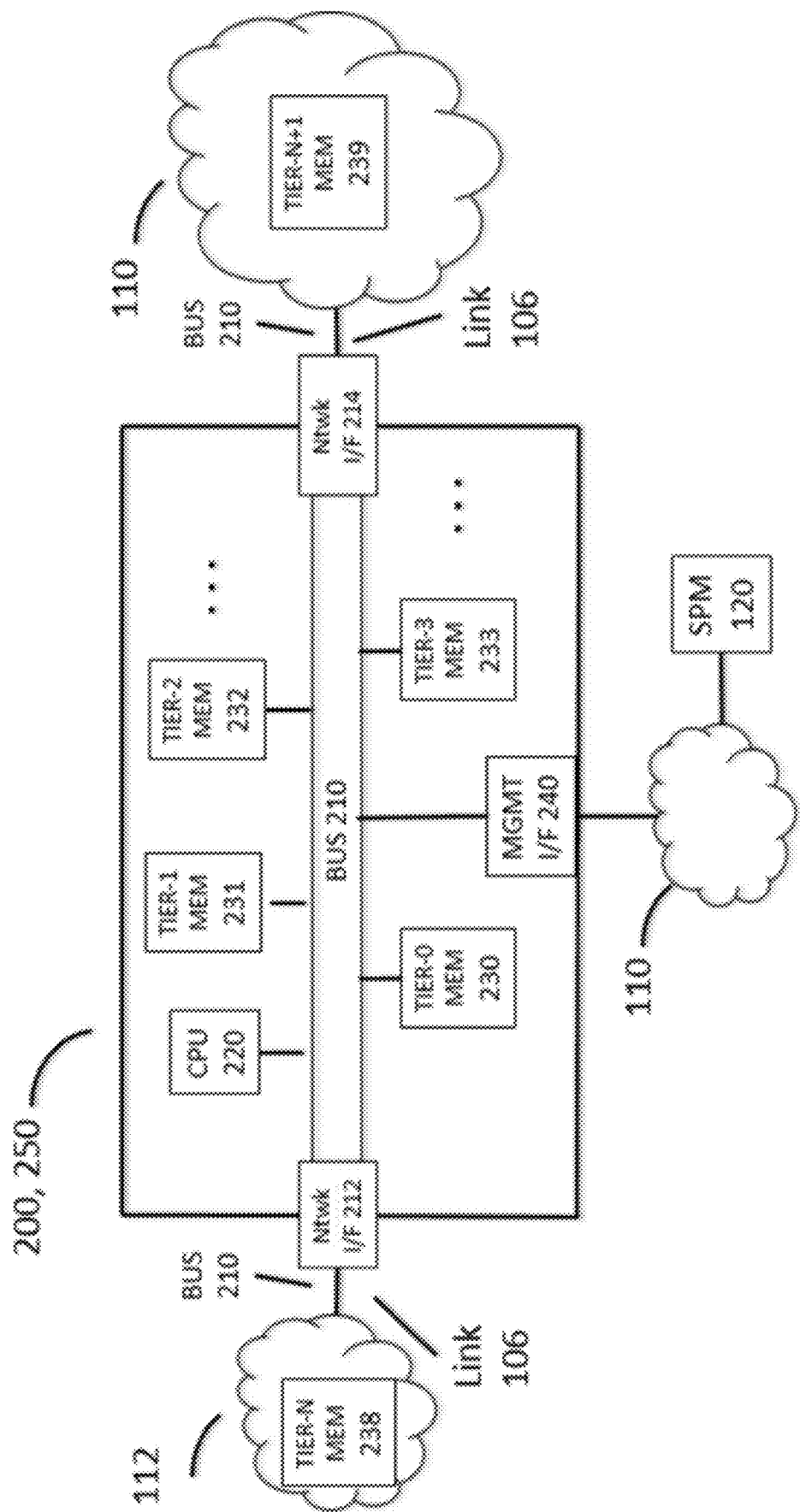
FIG. 2 depicts the functional and system components of an efficient TIG with a memory hierarchy.

FIG. 2 shows a system architecture for a TIG 200 that supports aspects of the present disclosure. Components may include a processor CPU 220, which may execute logic for configuring and operating the TIG 200, network interfaces 212 and 214, a management interface 240, and a hierarchy of memory modules TIER-0 MEM 230, TIER-1 MEM 231, . . . TIER-N+1 MEM 239. The components may be connected to a bus BUS 210 which may be used to transfer information between the components of TIG 200. The bus 210 may provide a data communications channel between the components of the TIG 200. The bus 210 may range in form and performance, from relatively fast and small, for example, an on-chip silicon bus connecting processor logic with on-chip cache memory, to the relatively slow and global, for example, the Internet. Other forms of the bus may include, for example, an integrated/embedded data bus of a printed circuit board (PCB), a parallel data cable connecting computers and peripheral devices, a serial optical cable connecting ports/interfaces of network switches and routers, an L2/L3 switched network, L3 routed network, and the like, in any combination. The bus 210 may be silicon, wired, wireless, physical, logical, virtual, software-defined, etc., in any combination. For example, as shown in FIG. 2, a portion of the bus 210 may be identified with network links 106 connecting network interfaces/ports 212 and 214 with networks 112 and 110.

The memory modules 230-239 may form a hierarchy that is tiered/parameterized by speed (read/write access time), density (bytes per unit volume in 3D space), capacity (measured in bytes), and cost per byte. Capacity, measured in bytes, may be highly correlated with density, because of space limitations associated with the memory type and location. (Capacity and density may be used interchangeably in this disclosure). Smaller-enumerated memory modules (e.g. TIER-0 MEM 230) may be associated with higher speeds, lower capacities, and higher costs than the higher-enumerated memory modules (e.g. TIER-3 MEM 233). Generally, speed and cost decrease, and capacity increases, as the enumeration increases from 230 to 239. The parameters of adjacent tiers may vary by one or more orders of magnitude. For example, TIER-0 MEM 230 may be on-chip SRAM cache memory; TIER-1 MEM 231 may be on-PCB SDRAM "main memory"; TIER-2 MEM 232 may be on-PCB NVRAM (e.g. NAND FLASH SSD); TIER-3 MEM 233 may be magnetic mechanical/spinning disk; and so on, with TIER-N+1 MEM 239 identified with the globally distributed memory used, for example, by the Internet DNS to store {domain name, IP address} pairs and associated information.

The hierarchical memory may enable cost effective implementation of features described herein related to time and space efficiency. A policy or partition(s) of a policy, as well as any associated Bloom filters, may be stored in the highest speed memory with sufficient space/available capacity. The policies may be stored after processing policy rules to achieve time-efficiency and/or space-efficiency measures, such as using Bloom filters to exploit rule match rates/probabilities and rule redundancies. That is, the rules or a policy may be processed to minimize the size of a Bloom filter, to minimize the false positive rate of a Bloom filter, or to eliminate redundant rules within a Bloom filter. If a TIG's performance measurement value does not meet an acceptable threshold, a TIG may allocate one or more memory tiers to the memory hierarchy of a TIG configuration. The TIG may also provide a hierarchal system of Bloom filters to reduce the number of packet filtering rule searches in a policy without compromising security.

Figure 3:
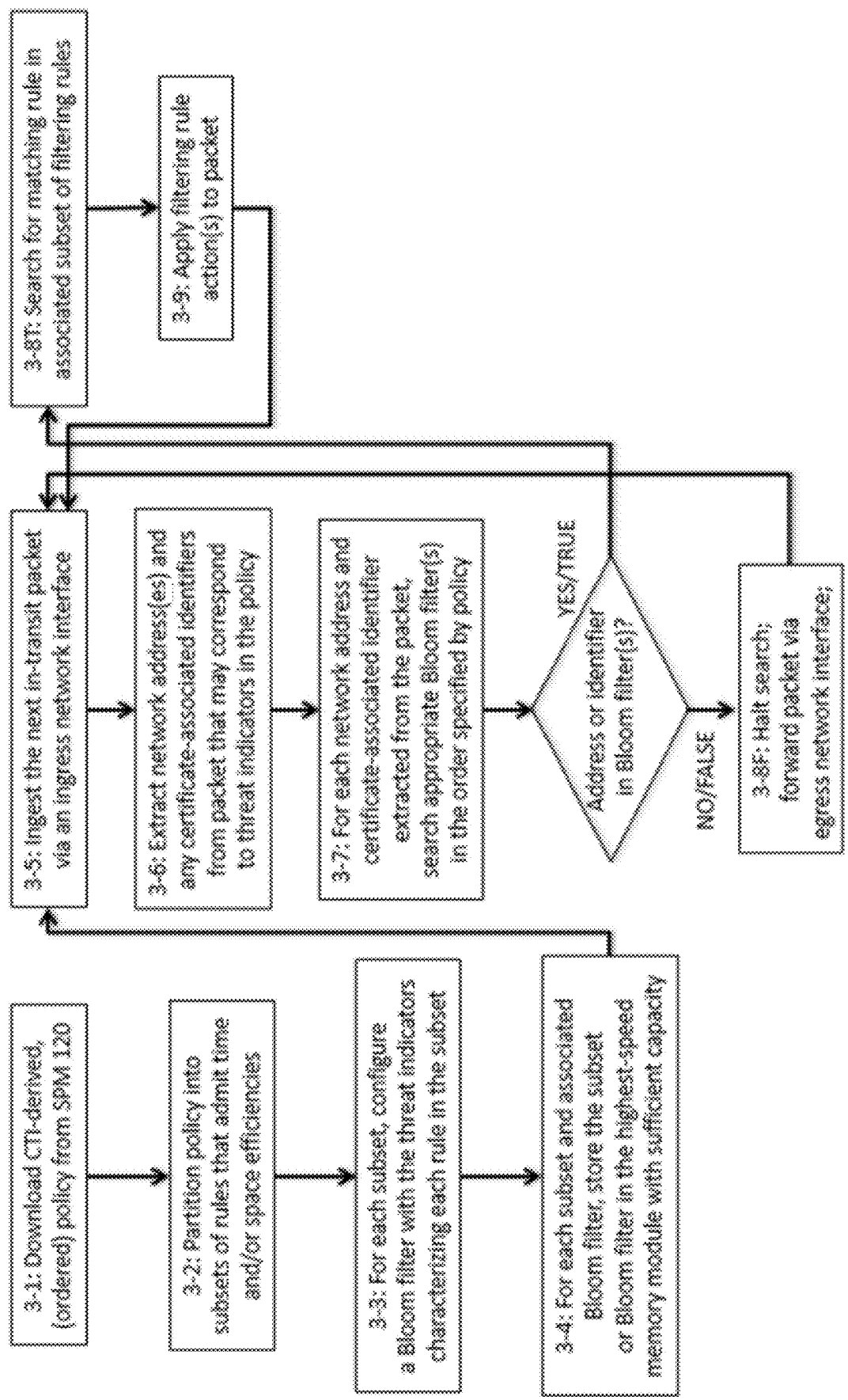
FIG. 3 is a flowchart describing the general operational concept of configuring a TIG for efficient operation and then efficiently filtering packets accordingly.

FIG. 3 depicts a flowchart that describes representative operations for configuring and operating an efficient TIG. In Step 3-1, a packet filtering device, such as threat intelligence gateway TIG 200, may download a CTI-derived policy from a security policy manager SPM 120. The CTI-derived policy may include a plurality of rules which may be preprocessed to eliminate redundancies. Packet-filtering devices may process or apply the packet filtering rules in the order that they are arranged in the policy file (although, rules may be re-ordered/re-arranged if the integrity of the policy is unaffected). The packet-filtering devices may process or apply the packet filtering rules in the order that the rules are spatially arranged. Some the features described herein may include processes that correspond to the rule ordering. As a TLS Certificate message and other packet data may be segmented across multiple L2 packets, references to a "packet" in this description may refer to multiple packets containing a single Certificate message or other packet data. For illustrative purposes that may assist in describing the methods, some exemplary orderings are described.

An SPM or a TIG may order and group the rules to meet some requirements and/or support TIG capabilities. For policies derived from CTI, the rules may be ordered/grouped in such a way as to improve security, improve TIG performance (for example, to decrease policy search time), improve cyberanalysis efficiency, etc. Rules may be ordered and sub-ordered, for example, by the indicator type and associated fidelity, or if the rules have identical actions and threat metadata (but have different indicators). The network-address indicator types may be URI, domain name, and IP address, and the associated rules may be ordered by decreasing fidelity. For example, URI rules may precede domain name rules, and domain name rules may precede IP address rules. Similarly, for certificate-related indicator types, certificates have higher fidelity than certificate authorities, which may be factored in to the ordering of associated packet filtering rules. Rules may also be ordered and sub-ordered by the rule action(s) or by order (in)dependencies. For example, rules with a block/deny/drop action may precede rules with non-blocking action(s). Rules that are order-independent may be re-arranged without changing the integrity of the policy. Various combinations of ordering and grouping criteria may be used. The rules may be ordered and grouped in such a way as to support/optimize time and/or space efficiencies.

In Step 3-2, the policy may be partitioned into subsets of rules where each subset may admit time and/or space efficiencies, according to the methods described herein. For example, a subset of rules with indicators that may be expected to have a relatively low rate of matching the network addresses of filtered packets may achieve a time efficiency by skipping the search for a matching rule, if it is known before initiating a search if the current network address does not match any of the indicators in the rules in the subset. Another space efficiency may be achieved if each rule in a subset has the same action(s) and same threat metadata (but a different indicator), as the subset of rules may be efficiently stored in memory as the set of (different) indicators associated with the single instance of the identical action(s) and threat metadata.

In Step 3-3, for each subset, a Bloom filter may be configured that contains each indicator for each rule in the subset. Each Bloom filter may be associated with a subset of rules, and may also be associated with the type or types of indicators the filter contains, in order to allow for further efficiencies. For example, a Bloom filter and its associated rule subset may only contain URI and domain name indicators; then the packet filtering device may search the policy for a rule with an indicator of type IP address, the search through a URI and domain name subset Bloom filter (and associated subset of rules) may be skipped. For time-efficiency Bloom filters, a pointer to a location in the (hierarchical) memory where the associated subset of filtering rules may be stored. The time-efficiency Bloom filter and its associated rule subset may be stored in the same tier of the memory hierarchy, or it may be the case that the Bloom filter may be stored in a different (e.g. faster) tier of the memory hierarchy than its associated subset because the subset of rules may be too large to fit in the same tier as its Bloom filter. Thus, the associated rule subset may be stored in a memory tier with more capacity (but with slower speed). The Bloom filter, to achieve space efficiency, may be associated with the single instance of the action(s) and threat metadata associated with all of the (different) indicators in the Bloom filter and associated subset of packet filtering rules.

In some cases, a rule subset may not produce time or space efficiencies, and/or there may be a requirement that the subset always be searched, and/or the rules may not be derived from CTI or otherwise may not be characterized by threat indicators. To associate a subset Bloom filter with each subset in the policy, a universal Bloom filter may be associated with such a rule subset that may always return TRUE value for any set membership test for any network address/element input. A universal Bloom filter may not require any memory/storage space for storing associated rule elements. A universal Bloom filter may be associated with one or more indicator types if each rule in the associated subset includes indicators of only those one or more indicator types. This may produce efficiencies when the rules in the associated subset only have indicators of type "IP address", and the current network address being searched for may be a URL. Thus, even though the membership test for the URL being in the universal Bloom filter may return a TRUE result, the subset search may be safely skipped. The universal Bloom filter may be considered a special case of a time-efficiency Bloom filter.

Furthermore, in some situations, it may be advantageous to associate a single time-efficiency Bloom filter with multiple subsets or even all subsets (e.g. the entire policy). It may be more time-efficient to test for element membership in a single set X than to separately perform membership test for a plurality of subset Bloom filters associated with each subset associated with a partition of the single set X. For example, for a policy including a subset J of filtering rules associated with domain-name indicators and a subset K of filtering rules also associated with domain-name indicators, where the domain-name indicators in J are all different than the domain-name indicators in K. Two Bloom filters J' and K' may be generated that respectively contain the domain-name indicators of J and the domain-name indicators of K, and that a third Bloom filter L', which acts as a combined subset filter, may be generated that contains the domain-name indicators of both J and K (each Bloom filter may have the same false positive rate P). The time to test membership in the single combined subset Bloom filter L' may be less than the sum of the time to test membership in Bloom filter J' and the time to test membership in Bloom filter K'.

Steps 3-2 and 3-3 are described herein as being executed by the TIG 200, but those steps may be executed by the SPM 120, or some portions of the steps may be divided between the TIG 200 and the SPM 120. If some portion of the Bloom filters may be computed by the SPM 120, the policy may be downloaded by the TIG 200, and the policy file may also include any associated Bloom filters and associated information. Another example is if the SPM 120 performs the partitioning of the policy into subsets and specifies the types(s) of efficiency, or Bloom filter(s), to be used (e.g., time efficiency, space efficiency, no efficiency (universal), etc.) for each subset, but then the TIG 200 configures the Bloom filters.

In Step 3-4, the subset Bloom filters and their associated subsets of the policy may be distributed, by the packet filtering device or the SPM 120, and may be stored in the memory hierarchy. Bloom filters and their associated subsets may be stored in the fastest memory module with sufficient available capacity. Time-efficiency Bloom filters may be stored in memory modules that are as fast as, or faster than, the memory storing rule subsets associated with the filter. Bloom filters may have priority over subsets of the policy with respect to memory capacity. The packet filtering device may determine a memory module for storing a Bloom filter or a rule subset of the policy based on a determined remaining capacity for each memory of the packet filtering device. The packet filtering device may prioritize storage of Bloom filters, such that a rule subset may not displace a Bloom filter for reasons of capacity.

In Step 3-5, the TIG 200 may receive at least one in-transit packet (via a network interface/device port) to begin the packet filtering process. In Step 3-6, network addresses and certificate-associated identifiers (if any) that may correspond to the threat indicators of the rules in the policy are extracted from the packet. The network addresses may be a source IP address and/or a destination IP address in an L3/IP-layer packet header, a domain name in a DNS query request message in a L7/applications-layer packet, a URL and domain name in an HTTP GET request method in the L7/applications-layer packet, and the like. The certificate-associated identifiers may include data extracted from fields contained in the X.509 certificates that may be included in TLS Certificate messages, such as the pair {Issuer Name, Serial Number} that uniquely identifies or characterizes an X.509 certificate, and identity data associated with the certificate authority that issued a certificate, which may include the certificate's Issuer Name.

In Step 3-7, the packet filtering device 200 may search for the network address or other identifier in each subset Bloom filter, as appropriate or based on a determination of associated threat indicator, for each network address and certificate-associated identifier (if any) extracted from the packet, and may search the data in the order corresponding to an ordering defined by the policy. The search may be conducted until either (T) the network address is found to be an element/member of a Bloom filter (a match is true result), or until (F) all of the Bloom filters have been searched unsuccessfully (a no match or match is false). Based on a no match result of the Bloom filter search, the network address or identifier may be determined not to be a member of any subset Bloom filter set and, thus, there is no filtering rule in the policy that will match and no filtering rule operator that must be applied. Based on the no match result (F), in Step 3-8F, packet filtering device 200 may halt the search process because it has been determined that there is no rule in the policy with a matching indicator, and may return the search processing to Step 3-5 to filter the next in-transit packet. Based on a match result (T), in Step 3-8T, packet filtering device 200 may search for a packet-filtering rule in the policy subset(s) associated with the Bloom filter with an indicator that matches the network address or identifier. In Step 3-9, packet filtering device 200 may apply the filtering rule's action(s) to the packet, and may return the packet processing to Step 3-5 to filter the next in-transit packet.

If multiple network addresses or certificate-associated identifiers are extracted from the packet in Step 3-6, packet filtering device 200 may, in Step 3-8, determine an order in which each network address or identifier may be searched for in the subset Bloom filters based on an indicator fidelity associated with each network address and identifier. For example, if a URL and an IP address are extracted from a packet, the packet filtering device 200 may search for the URL in the Bloom filters before conducting a similar search for the IP address, because (in general) URL indicators have higher fidelity than IP address indicators. Similarly, if a certificate identifier and a certificate authority identifier are extracted from a packet, the packet filtering device 200 may search for the certificate identifier in the subset Bloom filters before conducting a similar search for the certificate authority identifier, because (in general) certificate indicators may have higher fidelity than certificate authority indicators.

Figure 4:
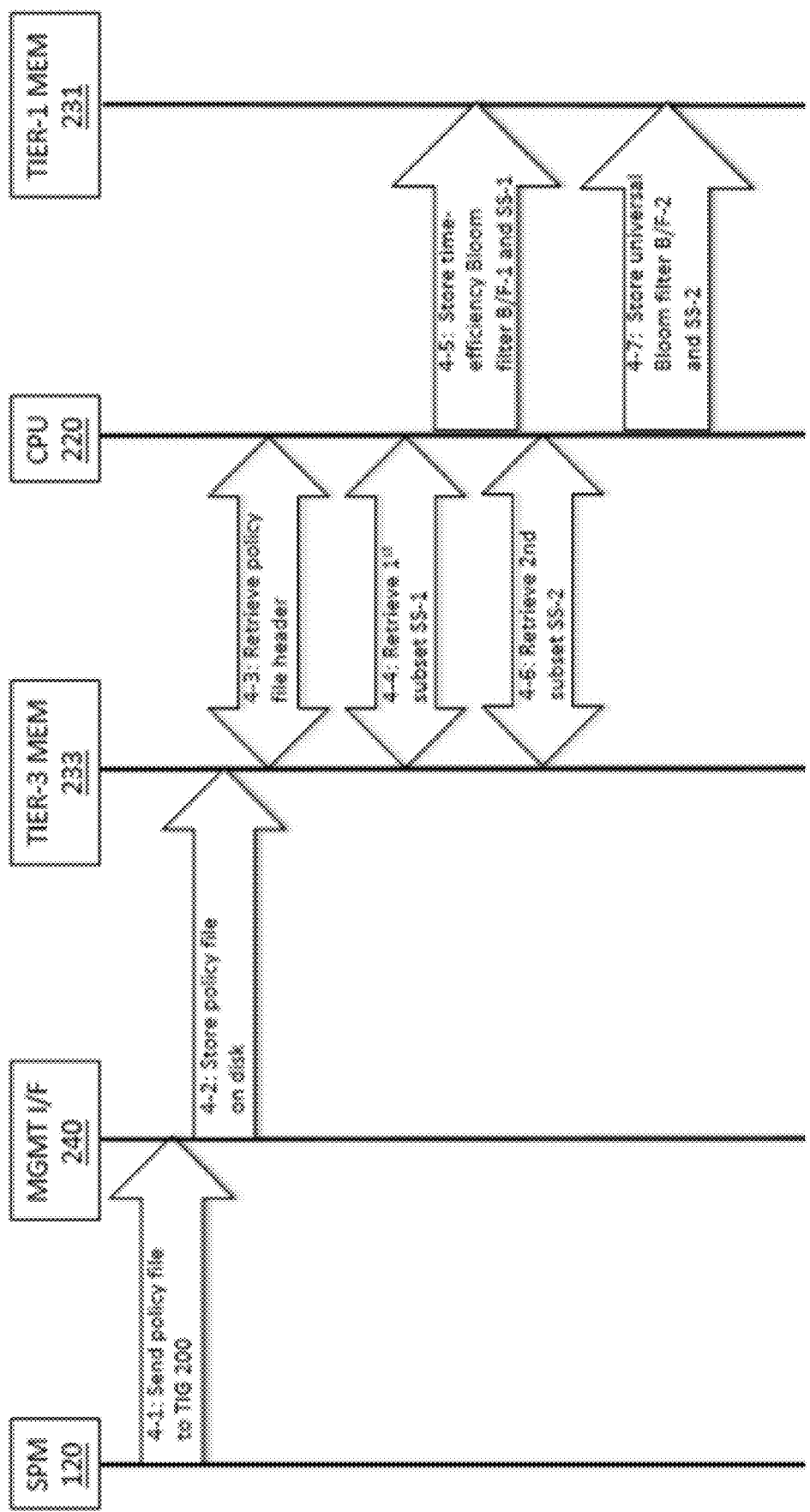
FIGS. 4, 5, 6, 7, 8, 9, 10, 11, 12, and 13 depict exemplary event sequences that illustrate methods for configuring and operating efficient TIGs, in accordance with one or more illustrative aspects described herein.

FIG. 4 illustrates an embodiment and associated event sequence in which a TIG 200 is configured for efficient packet filtering when a policy is partitioned into two subsets, where the partitioning of the packet filtering rules associated with the policy may be determined by indicator types and by the likelihood that a packet will match a rule in a subset. A time-efficiency Bloom filter may be associated with one subset, and a universal Bloom filter may be associated with the other subset. Both subsets of rules and their associated Bloom filters may be stored in the same memory module. This illustration generally corresponds to Steps 3-1 through 3-4 of FIG. 3.

In Step 4-1, the SPM 120 may send a file containing a policy to be enforced by TIG 200 on in-transit packets to the TIG's management interface MGMT I/F 240 (via Network 110 which may be, for example, the Internet). The policy file may include a header with a policy descriptor, which may include information such as a partitioning scheme partitioning the policy into two subsets, the type or types of efficiency to be applied to each subset, the size of the policy, the size of each subset, and the types of indicators in each subset. In Step 4-2, the MGMT I/F 240 may transfer (via BUS 210) the policy file to TIER-3 MEM 233, which may be lower speed memory such as a local mechanical/spinning magnetic disk (non-volatile, relatively large capacity, relatively cheap, relatively slow read/write access). In Step 4-3, the CPU 220 may retrieve the policy file header from the TIER-3 MEM 233. The policy file header may indicate how the policy is partitioned into subsets of rules, what efficiencies may be applied, and how the subsets may be distributed across multiple memory modules (if necessary, based on size information). As the CPU 220 processes the policy header file information, the CPU 220 may temporarily store portions of the information in, for example, TIER-0 MEM 230, which may be identified with on-chip cache memory, and in TIER-1 MEM 231, which may be identified with on-PCB main memory (not shown).

In Step 4-4, based on the policy file header information, the CPU 220 may retrieve subsets of packet filtering rules and may generate an associated subset Bloom filter. For example, CPU 220 may retrieve the first subset SS-1 from the disk 233, which is composed of packet filtering rules that have URL and domain name indicators. The policy header information may indicate that a policy wide time-efficiency Bloom filter should be generated for the first subset SS-1. CPU 220 may extract all of the indicators in the first subset, and may insert the extracted indicator data into a time-efficiency or policy Bloom filter B/F-1 (which may be configured for a false positive rate P). CPU 220 may associate the Bloom filter B/F-1 with the first subset SS-1, and may associated the Bloom filter B/F-1 with the types of indicators ("URL", "domain name") that the Bloom filter contains. In Step 4-5, the CPU 220 may analyze the memory capacity and may determine that main memory 231 has sufficient remaining available capacity to store the Bloom filter B/F-1 and its associated first subset SS-1, as well as the second subset SS-2. Accordingly, CPU 220 may store the time-efficiency Bloom filter B/F-1 and the first subset SS-1 in main memory 231.

In Step 4-6, based on the policy file header information, the CPU 220 may retrieve the second subset SS-2 from the disk 233, which may be composed of packet filtering rules that have indicators of type IP address and IP address range. Based on a determination that the policy header information specifies no specific subset efficiency for the second subset SS-2, the packet filtering device may generate a universal Bloom filter B/F-2 with types {"IP address", "IP address range" } to be associated with SS-2. The universal Bloom filter B/F-2 may be related to a plurality of threat indicator types. Based on an analysis of the memory capacity, in Step 4-7, the CPU 220 may store the universal Bloom filter B/F-2 and the second subset SS-2 in main memory 231. When it is determined that each subset of a policy has been processed or stored, the TIG 200 may determine that configuration for packet filtering for the current policy is complete.

Figure 5:
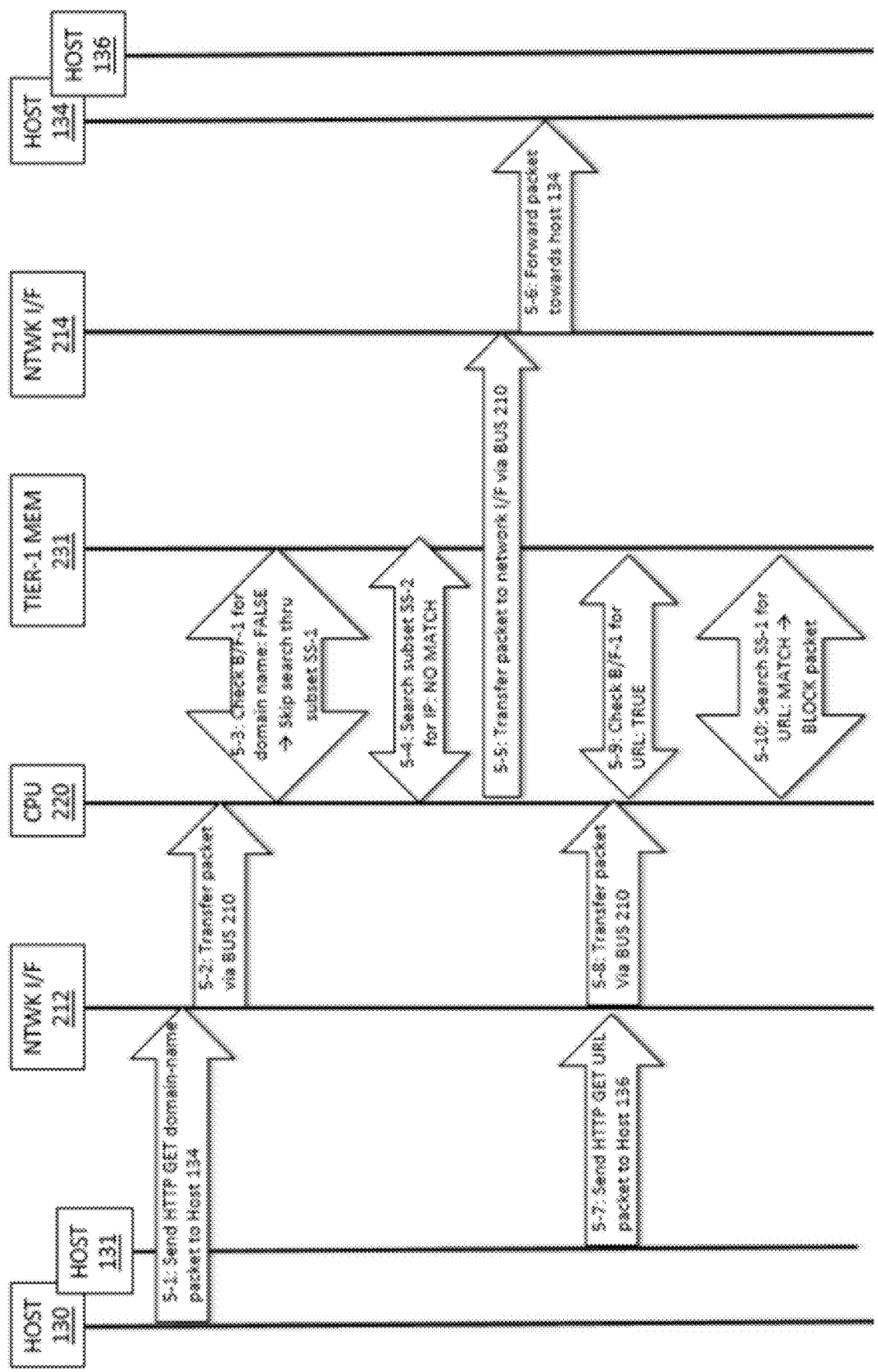

FIG. 5 illustrates a representative use case and associated efficient packet filtering process for the TIG 200 that was configured in FIG. 4. This illustration generally corresponds to Steps 3-5 through 3-9 of FIG. 3. In Step 5-1, for example, a human user operating a web browser hosted by desktop computer 130 attached to Network 112 may initiate a web/HTTP session with a web site named www.enterprise-xyz.com hosted by server 134 attached to Network 116. After resolving www.enterprise-xyz.com in the DNS (for example, to an IP address such as 12.34.56.78), the computer 130 may establish a TCP connection between 130 and 134 on port 80/HTTP (not shown in FIG. 5). The computer 130 may forward at least one packet towards web site 134 containing an HTTP GET request for http://www.enterprise-xyz.com (which may default to the URL for the home page, for example, http://www.enterprise-xyz.com/index.html).

In Step 5-2, the network interface 212 of TIG 200 may receive and ingest the in-transit HTTP get domain name packet, and may transfer received packets via BUS 210 to CPU 220 for filtering. The CPU 220 may extract data to be used for packet filtering, such as (a) domain name www.enterprise-xyz.com from the request/packet, and (b) destination IP address 12.34.56.78. The CPU 220 may sort the extracted data based on policy rules and may search the policy for each indicator in decreasing order of indicator type fidelity as defined by the policy. The CPU 220 may search the policy for matching rules based on a higher fidelity indicator such as domain name www.enterprise-xyz.com. If no match is determined, CPU 220 may search for rules matching a lower fidelity indicator such as the IP address 12.34.56.78.

In Step 5-3, CPU 220 may test the indicator types associated with (and contained in) B/F-1, the time-efficiency Bloom filter for the first subset SS-1 of packet filtering rules, to determine if they match the type of www.enterprise-xyz.com (domain name). Since B/F-1 contains indicators of type "domain name" and "URL", then CPU 220 may determine if www.enterprise-xyz.com is a member of B/F-1. When it is determined that a first subset SS-1 of the policy does not include a packet-filtering rule with the threat indicator www.enterprise-xyz.com, the B/F-1 membership test for www.enterprise-xyz.com returns FALSE or no match value, and the CPU 220 may skip a search through the first subset SS-1 of packet filtering rules. For a packet including an IP address, the CPU 220 may determine the indicator types associated with (and contained in) B/F-1, the Bloom filter associated with the first subset SS-1 of packet filtering rules, to determine if they match the type of 12.34.56.78 (IP address). Since B/F-1 contains indicators of type "domain name" and "URL", CPU 220 may skip the membership test for B/F-1 (and therefore may skip the search through the rules of SS-1).

In Step 5-4, CPU 220 may then determine the indicator types associated with B/F-2, the universal Bloom filter associated with the second subset SS-2 of packet filtering rules. Since the indicator types associated with B/F-2 are "IP address" and "IP address range", CPU 220 may skip the membership test for B/F-2 for the domain name www.enterprise-xyz.com and may also skip the search through the rules associated with the second subset SS-2. For a packet including the IP address 12.34.56.78, CPU 220 may determine the indicator types associated with B/F-2, the Bloom filter associated with the second subset SS-2 of packet filtering rules, to determine if they match the type of 12.34.56.78 (IP address). Since there is an indicator type match, CPU 220 may determine if the IP address associated with the packet 12.34.56.78 is contained in B/F-2. When the B/F-2 is a universal Bloom filter, the search may return a TRUE value. CPU 220 may search the second subset of rules for SS-2 for a packet-filtering rule with an indicator that matches 12.34.56.78. When no match is found, no actions or rule operators are applied to the packet, and the packet may be forwarded to its intended destination. Based on a determination of no match, in Step 5-5, the CPU 220 may transfer the packet to network interface 214 via BUS 210. In Step 5-6, the network interface 214 may forward packets that do not match a packet filtering rule to the network 110 towards the target destination web site www.enterprise-xyz.com (which is hosted by server 134 with IP address 12.34.56.78).

In Step 5-7, a human user operating an e-mail application hosted by desktop computer 131 attached to Network 112 may click on a URL link http://www.cyber-threat-network.com/download/malware.exe embedded in a phishing e-mail. Based on that action, the computer 131 may initiate a web/HTTP session with a web site named www.cyber-threat-network.com hosted by sending packets toward server 136 attached to Network 118. After resolving the domain name www.cyber-threat-network.com in the DNS to an IP address such as 87.65.43.21, the computer 131 may establish a TCP connection between computer 131 and 136 on port 80/HTTP, and the computer 131 may forward a packet towards host 136 containing an HTTP GET request for the URL http://www.cyber-threat-network.com/download/malware.exe. In Step 5-8, the network interface 212 of TIG 200 may receive and ingest the in-transit packet and may transfer the packet via BUS 210 to CPU 220 for filtering. The CPU 220 may extract the (a) URL http://www.cyber-threat-network.com/download/malware.exe and (b) the destination IP address 87.65.43.21 from the request/packet. The CPU 220 logic may be configured to search the policy for indicators in decreasing fidelity. Based on the fidelity determined for each type of threat indicator associated with the packet, the CPU 220 may first search the policy for rules matching the URL (e.g. http://www.cyber-threat-network.com/download/malware.exe), then (if necessary) may search for rules matching 87.65.43.21.

In Step 5-9, CPU 220 may determine the indicator types associated with (and contained in) B/F-1, the Bloom filter for the first subset SS-1 of packet filtering rules, in comparison to the indicator types associated with the received request/packet to determine if the B/F-1 indicator types match the type URL (e.g. http://www.cyber-threat-network.com/download/malware.exe). When the B/F-1 contains indicators of type "domain name" and "URL", the CPU 220 may determine if the URL http://www.cyber-threat-network.com/download/malware.exe is a member of B/F-1. When the first subset SS-1 in the policy does include a packet-filtering rule with the threat indicator http://www.cyber-threat-network.com/download/malware.exe, the B/F-1 membership test returns a TRUE value. Based on the determination of a match from the B/F-1 membership test, in Step 5-10, the CPU 220 may search through the first subset SS-1 of packet filtering rules to find the matching rule. The CPU 220 applies the action or operator for the rule, which may be to BLOCK, or drop, the packet. CPU 220 may then halt its search through the policy, and may return a value, for example a TCP RST packet, to the originating computer to terminate the connection request (not shown in FIG. 5).

Figure 6:
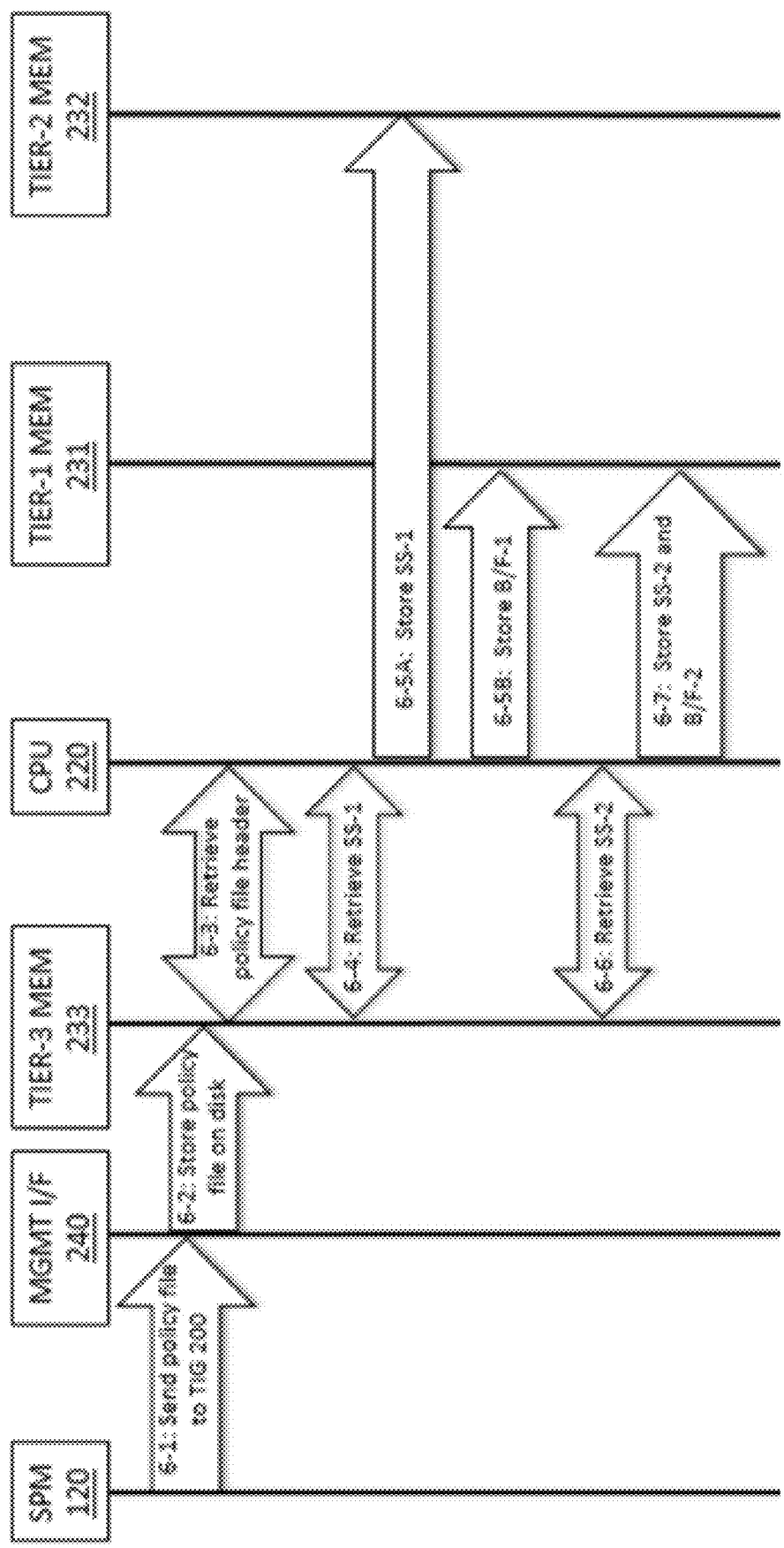

FIG. 6 illustrates an embodiment and associated event sequence in which a TIG is configured for efficient packet filtering when a policy may be partitioned into two subsets, where the partitioning may be determined based on indicator types of the rules in the subset and by the likelihood that a packet will match a rule in a subset. A time-efficiency or policy Bloom filter may be associated with both subsets. The subsets together may be too large to fit in available main memory 231, although each subset by itself will fit in main memory 231. The subset with the lower likelihood of matching a rule may be selected for storing in a different memory module that has sufficient available capacity but may be slower than main memory 231. Despite the slower memory, TIG performance may be maintained because of the time efficiency method of searching Bloom filters to avoid unnecessary searches of each rule of the subsets. This illustration generally corresponds to Steps 3-1 through 3-4 of FIG. 3. Steps 6-1, 6-2, and 6-3 are similar to Steps 4-1, 4-2, and 4-3 of FIG. 4, and a detailed description of receiving a policy file is not repeated.

In Step 6-4, based on the policy file header information, the CPU 220 may retrieve the first subset SS-1, which may be composed of packet filtering rules that have URL and domain name indicators, from the disk 233. The policy header information may indicate that a time-efficiency Bloom filter should be constructed for the first subset SS-1, and the CPU 220 may extract all of the indicators in the first subset, and may insert those indicators into a Bloom filter B/F-1 (which has, for example, been configured for a false positive rate P). CPU 220 may associate the Bloom filter B/F-1 with the first subset SS-1, and with the indicator types ("URL", "domain name") of the rules contained in SS-1. In Step 6-5, based on policy header file information, the CPU 220 may determine that main memory 231 has sufficient available capacity to store subset SS-1, but does not have sufficient available capacity to store both subsets SS-1 and SS-2. Because of the lower likelihood that SS-1 will need to be searched, CPU 220 may determine that SS-1 will be stored in a secondary memory module TIER-2 MEM 232 (that has sufficient available capacity to store the first subset SS-1, but is slower than main memory 231). Based on the capacity determinations, in Step 6-5A, CPU 220 may store the first subset SS-1 in memory module 232, and may associate the memory location of SS-1 with its associated Bloom filter B/F-1. In Step 6-5B, CPU 220 may store the Bloom filter B/F-1 in main memory 231.

In Step 6-6, based on the policy file header information, the CPU 220 may retrieve the second subset SS-2 from the disk 233, which may be composed of packet filtering rules that have indicators of types "IP address" and "IP address range". The policy header information may indicate that a time-efficiency Bloom filter should be constructed for SS-2. CPU 220 may extract all of the indicators in SS-2, and may insert the extracted threat indicators into a Bloom filter B/F-2 (which has, for example, been configured for a false positive rate P). CPU 220 may also associate the Bloom filter B/F-2 with the second subset SS-2, and may associate the Bloom filter B/F—with the types of indicators ("IP address", "IP address range") that it contains. In Step 6-7, the CPU 220 may determine that there is sufficient available memory in main memory 231 to store the Bloom filter B/F-2 and the second subset SS-2. Based on the capacity determination, the CPU 220 may store B/F-2 and the rules of the subset SS-2 in main memory 231. Based on a determination that the TIG 200 has completed configuration for efficient packet filtering for the received policy, the TIG 200 may begin to receive packets and begin filtering those packets using the generated Bloom filters.

Figure 7:
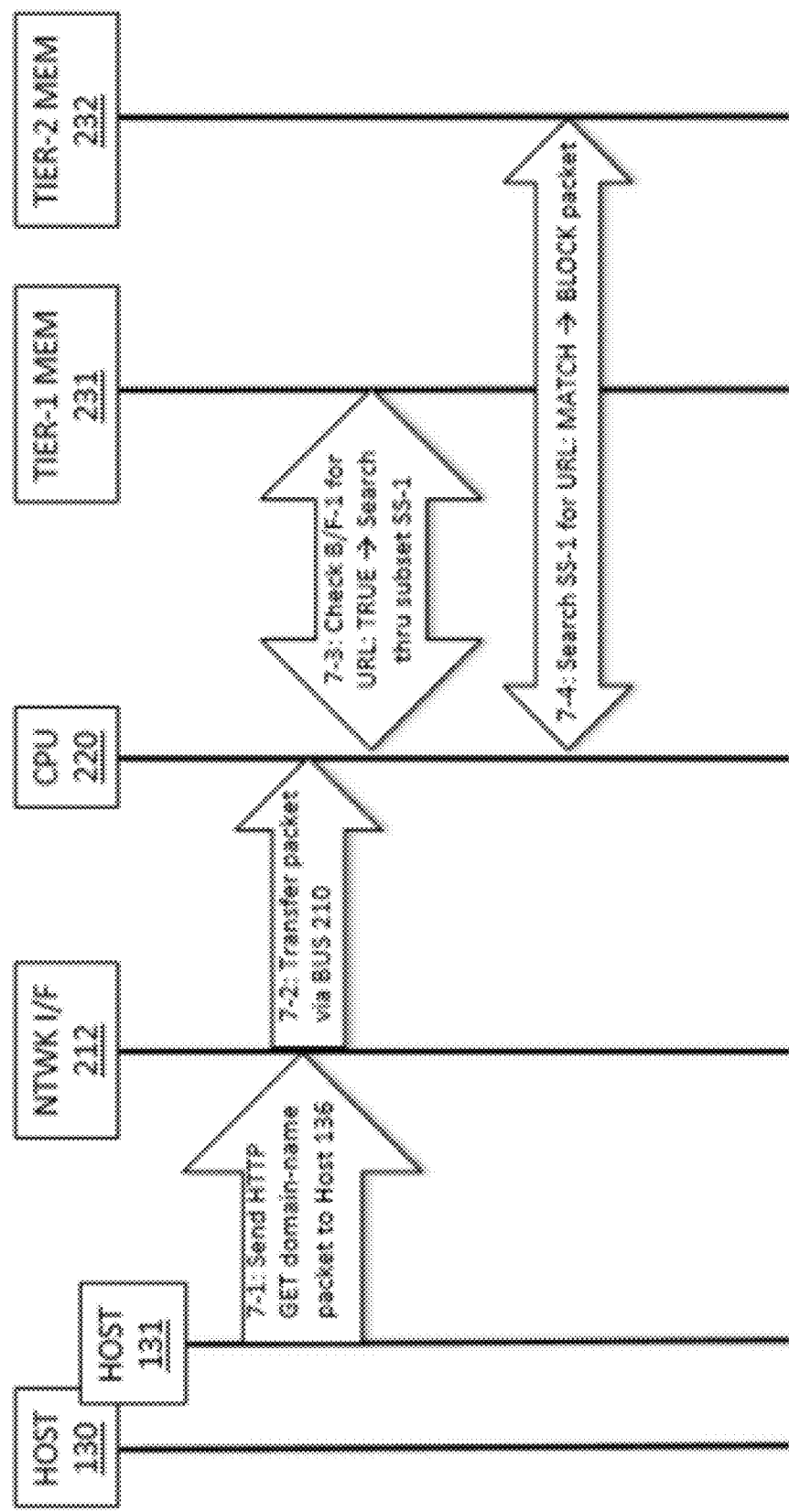

FIG. 7 illustrates a representative use case and associated efficient packet filtering process for the TIG 200 that was configured in FIG. 6. This illustration generally corresponds to Steps 3-5 through 3-9 of FIG. 3. Steps 7-1 and 7-2 are substantially the same as Steps 5-7 and 5-8 of FIG. 5, and a detailed description of Steps 7-1 and 7-2 for receiving and ingesting a packet for processing is not repeated. In Step 7-3, CPU 220 may determine the indicator types associated with (and contained in) B/F-1, the Bloom filter for the first subset SS-1 of packet filtering rules, to determine if the indicator types match the type ("URL") of http://www.cyber-threat-network.com/download/malware.exe. When B/F-1 contains indicators of type "domain name" and "URL", then CPU 220 may determine if the URL of the received packet http://www.cyber-threat-network.com/download/malware-.exe is a member of B/F-1. When the first subset SS-1 in the policy includes a packet-filtering rule with the threat indicator http://www.cyber-threat-network.com/download/malware.exe, the B/F-1 membership test returns TRUE value. In Step 7-4, CPU 220 may obtain from B/F-1 the memory location of SS-1 in TIER-2 MEM 232 and may search through the rules of subset SS-1 to find the matching packet-filtering rule (e.g. the rule that has an indicator http://www.cyber-threat-network.com/download/malware.exe). The CPU 220 may then apply the action or operators specified for the rule, which may be to BLOCK, or drop, the packet. The CPU 220 may then halt further or parallel searching through the policy, and may return a message or packet to the originating computer indicating that the communication session has been prevented or terminated (which may include, for example, transmitting a time-out message or a TCP RST signal/packet to the originating computer to terminate the TCP connection).

Figure 8:
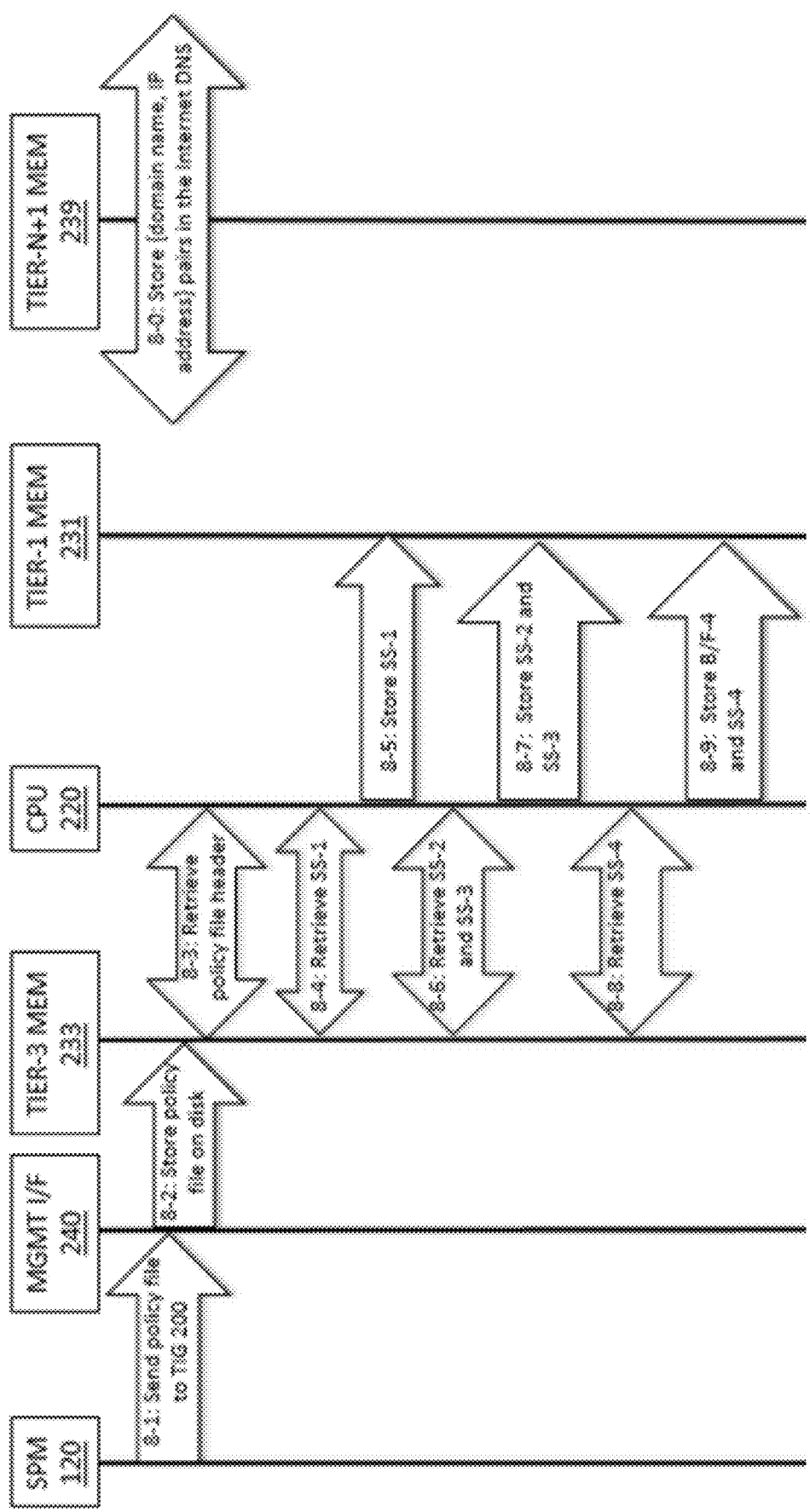

FIG. 8 illustrates an embodiment and associated event sequence in which a TIG is configured for efficient packet filtering when a policy is partitioned into four subsets. Three of the four subsets are represented by space-efficiency Bloom filters and associated information. The fourth subset is associated with a time-efficiency Bloom filter.

The first subset SS-1 of packet filtering rules may be represented by a space-efficiency probabilistic data structure or Bloom filter B/F-1 and the associated information as discussed below, such as an associated threat indicator type and an associated rule action. The indicators for the rules are the elements of the set of all domain names that are registered in the Internet DNS. These indicators are contained in the DNS Bloom filter B/F-1. The memory module associated with SS-1 may be the Internet DNS itself, which may be considered a globally distributed database of {domain name, IP address} pairs. This memory module may be identified with TIER-N+1 MEM 239 of FIG. 2 and FIG. 8. The DNS probabilistic data structure B/F-1 may be associated with two rule actions. As a first rule, when a membership test returns a TRUE value (e.g. the current domain name is registered in the DNS), then the associated rule's action or operator is a conditional operation. IF the current packet contains a DNS query request (to resolve the domain name to an IP address), THEN the rule action is to apply a packet transformation function that transforms the packet containing the DNS query request into a packet containing the DNS query response (e.g. the resolution of the domain name into an IP address). This packet transformation may be accomplished by forwarding the current packet containing the DNS query request into the Internet DNS, which will generate the corresponding DNS query response (packet). If the current packet determines an ELSE condition (e.g. the packet does not contain a DNS query request), the action may be null, which may signal the packet filtering logic to continue searching through the remainder of the policy including additional Bloom filters and subsets of rules. If the current packet is not a DNS query request, then it may be appropriate to skip the membership test (and subsequent application of the B/F-1 packet filtering rule(s)) associated with B/F-1. When a membership test returns FALSE (e.g. the domain name is not registered in the DNS), then the associated rule's action may also be a conditional action. When the membership test returns FALSE and IF the current packet does contain a DNS query request (to resolve the domain name to an IP address), THEN the rule actions may be to drop the packet and (optionally) apply a packet transformation function that generates a packet containing the corresponding DNS query response with RCODE=3 (NXDOMAIN or other indication of a non-existent Internet or Intranet domain name) and send the packet towards the origin host to terminate the request. When the membership test returns FALSE and the result is an ELSE response indicating the current packet does not contain a DNS query request, the action may be a null operation which may signal the packet filtering logic to continue searching through the remainder of the policy, including additional subsets of rules and their associated filters.

The second and third subsets, respectively SS-2 and SS-3, are also represented by, respectively, space-efficiency Bloom filters B/F-2 and B/F-3 (and associated information). For exemplary purposes, suppose both B/F-2 and B/F-3 are derived from a list of domain names from a single CTI provider (and thus any corresponding rules may have the same threat metadata), but each of the corresponding packet filtering rules have a single action: one of either a BLOCK action (e.g. an operation to drop the packet) or a MONITOR action (e.g. an operation to allow/forward the packet, but that may also log and capture the packet for possible subsequent threat analysis). The SS-2 may contain all of the rules with the BLOCK action, and accordingly associated B/F-2 may contain or represent all of the indicators for the rules with the BLOCK action. SS-3 may contain all of the rules with the MONITOR action, and accordingly the associated B/F-3 may contain all of the indicators for the rules with the MONITOR action. Thus, any determination of the TRUE result to a test of B/F-2 may result in the application of a BLOCK action and may store the CTI provider and associated threat metadata, and packet and environmental data as a log of the threat event (for subsequent use in, for example, cyberanalysis applications). Similarly, any determination of the TRUE result for a test of the B/F-3 may result in the application of a MONITOR action and may store the CTI provider and associated threat metadata, and packet and environmental data as a log of the threat event. The FALSE rule for both B/F-2 and B/F-3 may result in the application of a null operation or action, which may signal the packet filtering logic to continue searching the policy for a matching rule. The false positive rate $P_2$ associated with B/F-2 may be limited to (much) smaller/lower than the false positive rate $P_3$ associated with B/F-3. As rule subset SS-2 is composed of only BLOCK rules, a false positive/TRUE membership test result for B/F-2 means that the current packet may be blocked/dropped when it should not be, which is highly undesirable, assuming that the current packet is part of a legitimate business communication of the network being protected. As rule subset SS-3 is composed of only MONITOR rules, a false positive/TRUE membership test result does not result in the dropping/blocking of legitimate business traffic. In practice, the false positive rate $P_2$ may be, for example, $1/10^{12}$ (one in a trillion). That is, it is expected that only one in a trillion legitimate HTTP GET requests, for example, may be mistakenly dropped, an event that may never occur in practice; whereas typical values for the false positive rate $P_3$ may be, for example, $1/10^3$ (one in a thousand) or $1/10^6$ (one in a million). As discussed above, the system cost for lower false positive rates P for Bloom filters is an increase in memory space requirements. However, memory space requirements may vary with the logarithm of the false positive rate P. Thus, a Bloom filter for a set of N elements with a false positive rate of $1/10^{12}$ requires only twice the memory space as a Bloom filter for the same set of N elements with a false positive rate of $1/10^6$, even though the false positive rates differ by a factor of one million. These decisions may be made based on capacity thresholds associated with each memory provided in a packet filtering device, and are an example of selecting false positive rates for space-efficiency Bloom filters. The fourth subset SS-4 may include packet filtering rules that have indicators of type "IP address". The indicators may be contained in a time-efficiency Bloom filter B/F-4 that is computed by the policy manager SPM 120. The fourth subset SS-4 may not use a space-efficiency Bloom filter for representation.

False positive rates may be selected as follows. False positives are undesirable, thus relatively low false positive rates are desirable. One of the benefits of the disclosed systems and methods is improvement of the efficiency of memory/storage space usage; but because a Bloom filter's size (e.g. memory/space requirement) increases as the false positive rate decreases, it is (conversely) undesirable for false positive rates to be unnecessarily low. Thus, to select a false positive rate, the system should factor in the adverse effects of a false positive. For a time-efficiency Bloom filter, the adverse effect of a false positive is that the associated subset of packet filtering rules is unnecessarily searched, so there is a (small) time/latency cost; however, as a matching rule for a false positive will not be found, no action will be applied (in error) to the current packet and the adverse effect is only a delay in response. For a space-efficiency Bloom filter, however, the adverse effect of a false positive is that the action(s) of a matching rule will be applied in error to the current packet. If the action is to block/drop the (legitimate) packet, or otherwise modify/transform the packet, then the adverse effect of the false positive may be considered significantly adverse. If the actions are to allow the (legitimate) packet but log and capture a copy of it for subsequent cyber analysis, then the adverse effects are not as serious. Considering all of these factors, a method of selecting false positive rates will select such that (1) the false positive rates for time-efficiency Bloom filters may be higher than false positive rates for space-efficiency Bloom filters; (2) the false positive rates for space-efficiency or subset Bloom filters may be determined in part by the associated action(s): (a) when the action(s) cause the current in-transit packet to be dropped/blocked, the false positive rate should be relatively low, and also should be absolutely low such that in practice, a false positive may never occur (e.g., $1/10^{12}$, or one in a trillion); (b) when the action(s) do not cause the current in-transit packet to be dropped/blocked, then the false positive rate can be relatively higher, but also relatively lower than the false positive rates for time-efficiency Bloom filters. Finally, the false positive rate for a universal Bloom filter may be undefined, so a rate may not need to be selected for universal Bloom filters.

The illustration in FIG. 8 generally corresponds to Steps 3-1 through 3-4 of FIG. 3. In Step 8-0, {domain name, IP address} pairs may be continually stored in the globally distributed Internet DNS, which is represented by the memory module TIER-N+1 MEM 239. Steps 8-1, 8-2, and 8-3 are substantially similar to Steps 4-1, 4-2, and 4-3 of FIG. 4, and detailed descriptions of those steps are not repeated here. In Step 8-4, based on the policy file header information, the CPU 220 may retrieve the first subset SS-1 from disk 233. As discussed above, SS-1 is represented by a space efficiency Bloom filter B/F-1 and associated information, which may include rule actions and metadata for the processing logic. B/F-1 may contain all of the domain names that are (currently) registered in the Internet DNS, based on the last update time of the B/F-1. In Step 8-5, when it is determined that there is sufficient available capacity in main memory 231, CPU 220 may store B/F-1 and associated information in TIER-1 MEM 231.

In Step 8-6, based on the policy file header information, the CPU 220 may retrieve two rule subsets SS-2 and SS-3 from the disk 233. As discussed above, SS-2 and SS-3 may be represented by space-efficiency Bloom filters B/F-2 and B/F-3 and associated information. In Step 8-7, when it is determined that there is sufficient available capacity in main memory 231, CPU 220 may store B/F-2 and B/F-3 and associated information, which may include rules for SS-2 and SS-3, in TIER-1 MEM 231. In Step 8-8, based on the policy file header information, the CPU 220 may retrieve the subset SS-4 from the disk 233 and may compute a time-efficiency Bloom filter B/F-4, which contains all of the indicators (of type "IP address") associated with the packet filtering rules in SS-4. In Step 8-9, when it is determined that there is sufficient available capacity in main memory 231, CPU 220 may store B/F-4 and SS-4 in TIER-1 MEM 231. The TIG 200 may then be configured for efficient packet filtering for the current policy and may begin processing packets.

Figure 9:
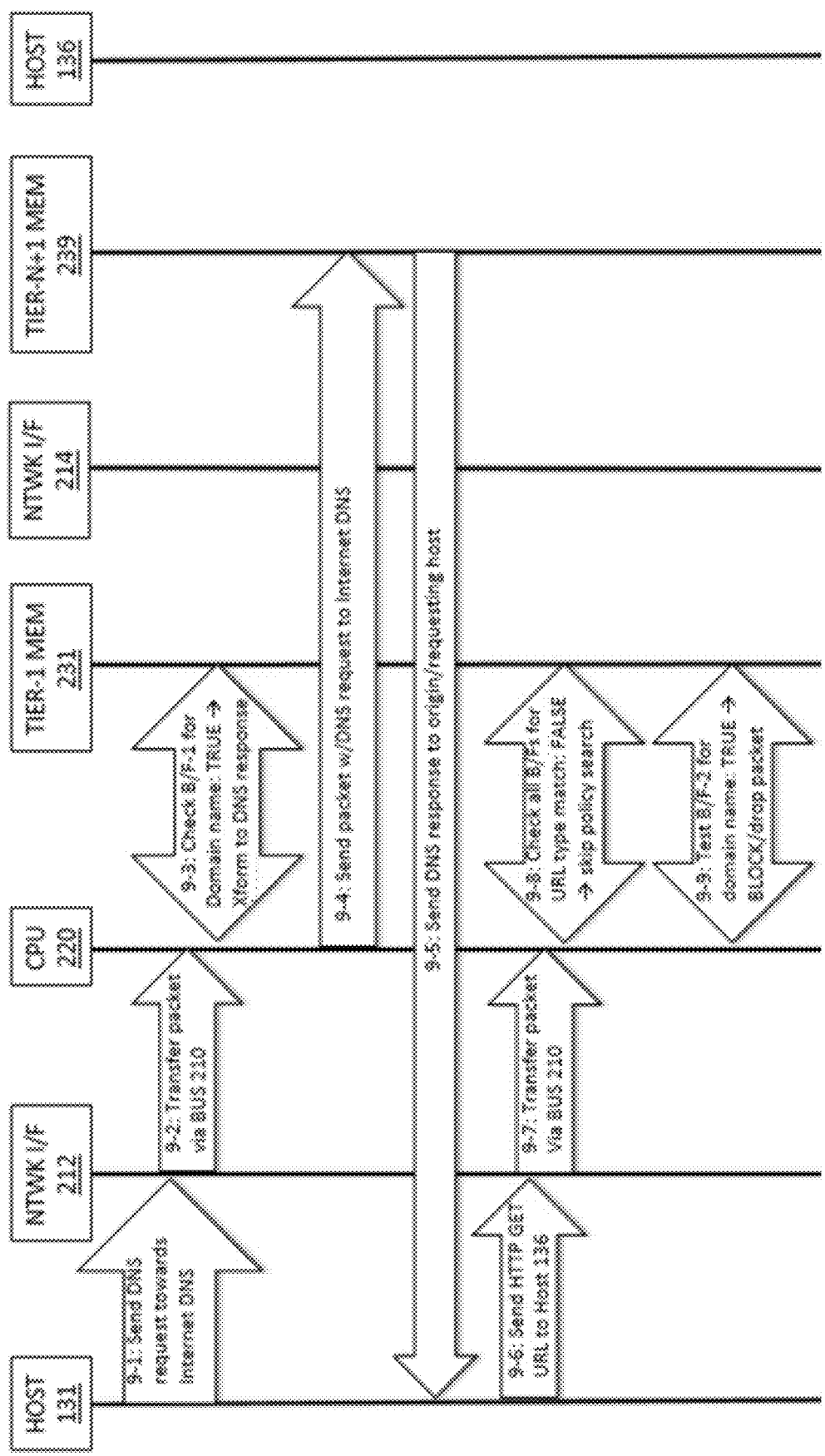

FIG. 9 illustrates a representative use case and associated efficient packet filtering process for the TIG 200 that was configured in FIG. 8. This illustration generally corresponds to Steps 3-5 through 3-9 of FIG. 3.

In Step 9-1, for example, a human user operating an e-mail application hosted by desktop computer 131 attached to Network 112 may click on a URL link http://www.cyber-threat-network.com/download/malware.exe in a phishing e-mail. The computer 131 may initiate a web/HTTP session with a web site named www.cyber-threat-network.com hosted by server 136 attached to Network 118. Before the computer 131 can connect to the web site, however, the desktop computer 131 may need to resolve the domain name www.cyber-threat-network.com to an IP address. Accordingly, computer 131 may generate and forward a packet containing a DNS query request (to resolve www.cyber-threat-network.com to its IP address) towards the Internet DNS service. The packet's destination IP address field value that may be contained in the L3/IP header, for example 18.27.36.45, may be the IP address of the DNS server that computer 131 has been configured to contact for DNS service. The packet's destination port in the L4/TCP header may be 53, the port for DNS service. In Step 9-2, the network interface 212 of TIG 200 may receive and ingest the in-transit packet and may transfer the packet via BUS 210 to CPU 220 for filtering. CPU 220 may extract the (a) domain name www.cyber-threat-network.com from the DNS query request, and (b) the destination IP address 18.27.36.45. The packet filtering logic may be configured to filter for domain name indicators before filtering for IP address indicators. Thus, domain name www.cyber-threat-network.com may be filtered first through the policy.

In Step 9-3, CPU 220 may check the indicator types associated with (and contained in) B/F-1, the (space-efficiency) Bloom filter containing all of the domain names currently registered in the Internet DNS, to determine if the Bloom filter indicator types match the type ("domain name") of www.cyber-threat-network.com. Since B/F-1 contains indicators of type "domain name", then CPU 220 checks if domain name www.cyber-threat-network.com is a member of B/F-1. When the www.cyber-threat-network.com has been registered in the Internet DNS, the membership test may return a TRUE result. In Step 9-4, CPU 220 may transform the packet containing the DNS query request into a packet containing the corresponding DNS query response by sending the packet containing the request towards the Internet DNS (via network interface 214), represented by TIER-N+1 MEM 239. The CPU 220 may halt the search through the policy. In Step 9-5, the Internet DNS may generate a packet containing the corresponding DNS query response, which may include the resolved IP address (e.g. 87.65.43.21) for the domain name www.cyber-threat-network.com, and may send the packet to Host 131.

In Step 9-6, after resolving www.cyber-threat-network.com in the DNS, and establishing a TCP connection between computer 131 and host 136 on port 80/HTTP (the packets of which are efficiently filtered through the TIG 200 policy without a match), computer 131 may forward a packet towards 136 containing an HTTP GET request for http://www.cyber-threat-network.com/download/malware.exe. In Step 9-7, the network interface 212 of TIG 200 may receive and ingest the in-transit packet and may transfer the received packet via BUS 210 to CPU 220 for filtering. CPU 220 may extract from the packet (a) the URL http://www.cyber-threat-network.com/download/malware.exe, (b) the domain name www.cyber-threat-network.com, and (c) the destination IP address 87.65.43.21. The CPU 220 logic may be configured to search the policy for indicators in order of decreasing fidelity and, thus, CPU 220 may first search the policy for rules matching the URL http://www.cyber-threat-network.com/download/malware.exe, then search the domain name www.cyber-threat-network.com, and then search the IP address 87.65.43.21.

In Step 9-8, CPU 220 may determine the indicator types associated with (and contained in) B/F-1, the Bloom filter for the first subset SS-1 of packet filtering rules, to determine if they match the indicator type of URL http://www.cyber-threat-network.com/download/malware.exe (which is "URL"). When B/F-1 contains indicators of type "domain name" (but not "URL"), CPU 220 may skip the membership test for B/F-1 (and thus the search through SS-1). Similarly, the indicator types may be checked for B/F-2, B/F-3, and B/F-4 without a type match. Thus, the policy may not be searched when no rule exists that has an indicator that will match http://www.cyber-threat-network.com/download/malware.exe. In Step 9-9, CPU may search the policy for a rule with an indicator matching the domain name www.cyber-threat-network.com. The membership test of B/F-1 may return a TRUE value (e.g. www.cyber-threat-network.com is registered in the DNS). When the current packet is not a DNS query request, there is no rule action to be applied based on the indication of match from the membership test of B/F-1, and the policy search may continue. When a membership test in (space-efficiency) B/F-2 returns TRUE (e.g. a rule exists that has an indicator that will match http://www.cyber-threat-network.com/download/malware.exe), and the associated rule action is BLOCK, the packet may be dropped, which may prevent the malware download from occurring.

Figure 10:
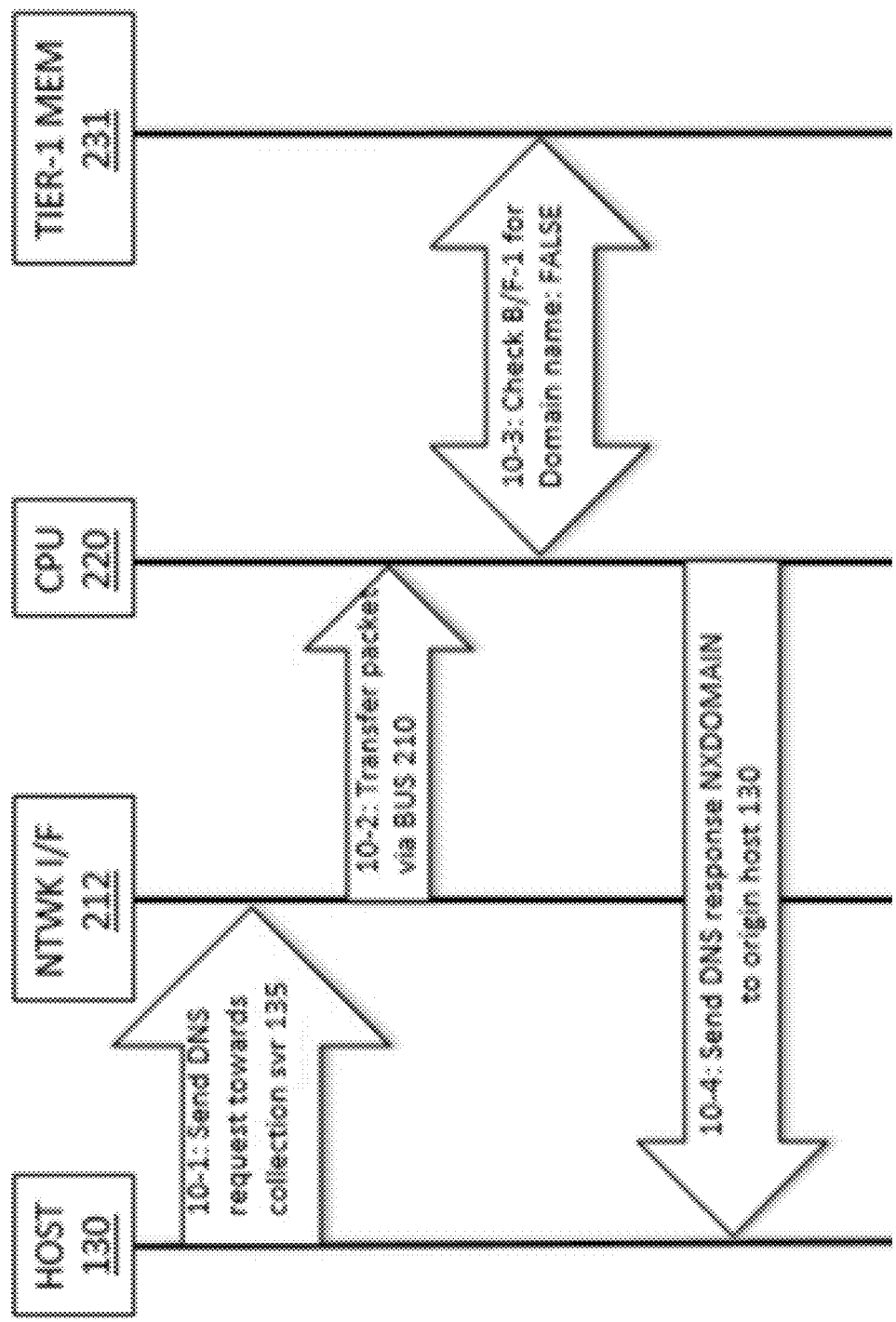

FIG. 10 illustrates a representative use case and associated efficient packet filtering process for the TIG 200 as configured in FIG. 8. In this configuration, TIG 200 may detect and may handle bogus DNS query requests containing domain names that are not registered in the DNS. This illustration generally corresponds to Steps 3-5 through 3-9 of FIG. 3. A host 135 attached to (unsecured) network 116 may have been hijacked to function as a collection server for sensitive data that may be exfiltrated/stolen using DNS tunneling methods, which use bogus DNS query requests to exfiltrate information. However, neither the IP address nor any domain name associated with Host 135 may be known to CTI providers, and thus TIG 200 may not have been configured with a CTI-derived packet filtering rule for detecting communications between Host 135 and hosts attached to network 112. Host 130 attached to (secured) network 112 may be compromised by malware that collects sensitive corporate information, for example, credit card numbers, managed by Host 130. The malware may attempt to exfiltrate this information to Host 135 using DNS tunneling.

In Step 10-1, the malware executing on host 130 may send a packet addressed to Host 135 (with IP address, for example, 45.36.27.18) and destination port 53 (DNS) that may contain a DNS query request with the (bogus) domain name "visa5234334164939009.www.legit-domain.com", which actually contains a credit card number. In Step 10-2, the network interface 212 of TIG 200 may receive and ingest the in-transit packet and may transfer the packet via BUS 210 to CPU 220 for filtering. CPU 220 may extract the (a) domain name visa5234334164939009.www.legit-domain.com, and (b) the destination IP address 45.36.27.18, from the DNS query request. The packet filtering logic may have been configured to filter for domain name indicators before filtering for IP address indicators. Thus, visa5234334164939009.www.legit-domain.com may be filtered first through the policy.

In Step 10-3, CPU 220 checks the indicator types associated with (and contained in) B/F-1, the (space-efficiency) DNS Bloom filter containing all of the domain names currently registered in the Internet DNS, to determine if they match the type ("domain name") of visa5234334164939009.www.legit-domain.com. Since B/F-1 contains indicators of type "domain name", then CPU 220 may check if domain name visa5234334164939009.www.legit-domain.com is a member of B/F-1. Since the bogus domain name visa5234334164939009.www.legit-domain.com has not been registered in the Internet DNS, the membership test returns FALSE value. In Step 10-4, CPU 220 may apply an operator or action associated with the FALSE result for a test of B/F-1 for DNS query requests. The false result action may be to (a) drop the current packet containing the DNS query request for visa5234334164939009.www.legit-domain.com, thereby preventing the exfiltration/DNS tunneling attack; (b) apply a packet transformation function that generates a packet containing the corresponding DNS query response with RCODE=3 (NXDOMAIN); and (c) may send the DNS query response towards the host 131. Based on the FALSE result for a test of B/F-1, the CPU 220 may halt the search through the policy.

Figure 11:
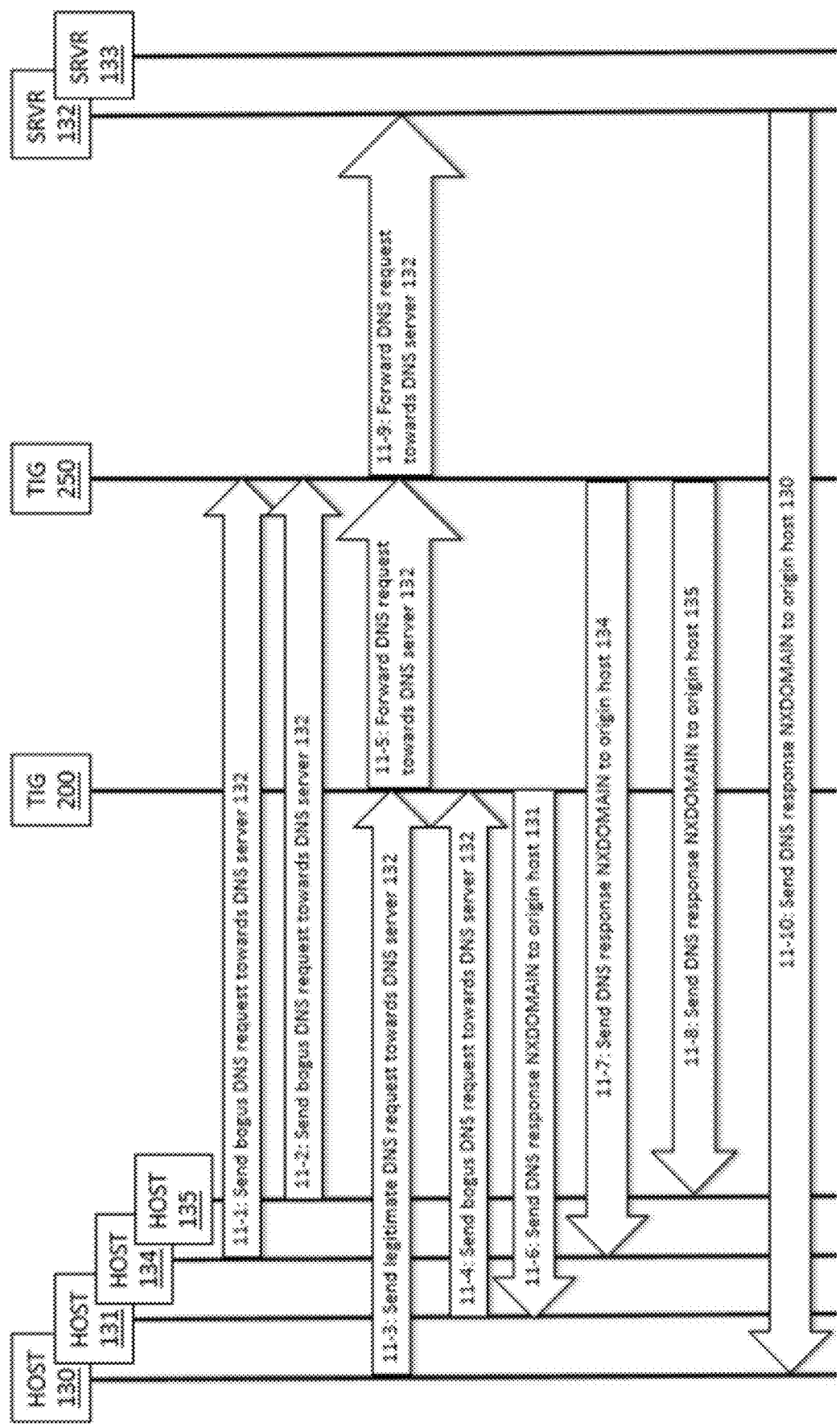

FIG. 11 illustrates a representative use case for efficient TIGs that may protect the Internet DNS from a type of DDoS attack that uses bogus DNS requests as the attack vector. The use case's environment is represented by FIG. 1. The TIGs 200 and 250, respectively protecting Networks 112 and 114, may be configured the same way as in FIG. 8 with the same policy. Recall that the policy configured in FIG. 8 includes a subset SS-1 represented by a space-efficient DNS probabilistic data structure, such as Bloom filter B/F-1, and associated information that contains all of the domain names that are currently registered in the Internet DNS. One type of attack on the Internet DNS is a DDoS attack in which many globally distributed, malware-infected endpoints may send many bogus DNS query requests to resolve domain names that are not registered in the DNS. The malware may use a domain-name generation algorithm (DGA) to randomly generate domain names, for example q0e8vqq0y8n.www.legit-site.net, that are unlikely to match registered domain names. The DNS may search its distributed database trying to resolve these (unresolvable) requests. If there are a sufficiently large number of these bogus requests, then the DNS spends a (large) majority of its resources trying to satisfy the bogus requests while underserving legitimate requests, thereby denying service to the legitimate requests. Because many popular applications (e.g. the web) depend on the DNS to operate, a successful DDoS attack on the DNS results in a successful attack on DNS-dependent applications.

DNS infrastructure provider networks such as Network 114 are designed and configured to receive many DNS query requests to service by, for example, DNS name servers 132 and 133; thus, during a DDoS attack on the DNS using bogus DNS requests as an attack vector, such networks may receive many of these bogus DNS requests. The TIG 250 may be configured as in FIG. 8 to protect Network 114 and some portion of the Internet DNS from these bogus requests, while continuing to service legitimate DNS requests, thereby mitigating the DDoS attack. Furthermore, the TIG 200 configured as in FIG. 8 and protecting Network 112 may prevent bogus DNS requests that may be issued by, for example, a malware-infected host 131 attached to Network 112, from being transmitted to the Internet (identified with Network 110 in FIG. 1) and attacking the DNS.

Host 131 that may be attached to (TIG-protected) network 112, and hosts 134 and 135 that may be attached to (unprotected) network 116, may be infected by malware that may issue bogus DNS requests when commanded by, for example, host 136 attached to network 118 (operated by malicious actors). Further, the DNS infrastructure (not shown) of the networked environment of FIG. 1 may be configured such that DNS query requests originating from hosts attached to networks 112 and 116 are serviced by DNS name servers 132 and 133 attached to network 114. For example, servers 132 and 133 may be configured to be the authoritative name servers for the domains example-132.net and example-133.net, in which case DNS query requests for domain names including example-132.net and example-133.net may be routed to servers 132 and 133.

In Step 11-1, host 134 may generate and send a bogus DNS query request to resolve domain name ppk6h0ec.www.example-132.net towards DNS Server 132. In Step 11-2, host 135 may generate and send a bogus DNS query request to resolve domain name 61kwrari.www.example-132.net towards DNS Server 132, which may be sent simultaneously with the request from host 134. In Step 11-3, host 130 may generate and send a legitimate DNS query request to resolve domain name www.example-132.net towards DNS server 132, which may be sent simultaneously with requests from other hosts. In Step 11-4, host 131 may generate and send a bogus DNS query request to resolve domain name hyq1yn2c.www.example-133.net towards DNS Server 133, which may be sent simultaneously with requests from other hosts.

In Step 11-5, TIG 200 (a) may receive and ingest the legitimate DNS query request from 130, (b) may test B/F-1 to determine that domain name www.example-132.net is registered in the DNS, and (c) forwards the DNS query request towards DNS server 132. In Step 11-6, TIG 200 (a) may receive and ingest the bogus DNS query request from 131, (b) may test a DNS probabilistic data structure, B/F-1, to determine that a bogus domain name hyq1yn2c.www.example-133.net is not registered in the DNS, (c) may drop the DNS query request (packet), (d) may decide to generate/spoof the corresponding DNS query response with RCODE=3 (NXDOMAIN), and (e) may send the DNS query response back to origin host 131. In Step 11-7, TIG 250 (a) may receive and ingest the bogus DNS query request from 134, (b) may test B/F-1 to determine that bogus domain name ppk6h0ec.www.example-132.net is not registered in the DNS, (c) may drop the DNS query request (packet), (d) may decide to spoof/generate the corresponding DNS query response with RCODE=3 (NXDOMAIN), and (e) may send the DNS query response back to origin host 134. In Step 11-8, TIG 250 (a) may receive and ingest the bogus DNS query request from 135, (b) may test the B/F-1 to determine that bogus domain name 61kwrari.www.example-132.net is not registered in the DNS, (c) may drop the DNS query request (packet), (d) may decide to generate the corresponding DNS query response with RCODE=3 (NXDOMAIN), and (e) may send the DNS query response back to origin host 135.

In Step 11-9, TIG 250 (a) may receive and ingest the legitimate DNS query request from 130, (b) may test the B/F-1 to determine that domain name www.example-132.com is registered in the DNS, and (c) may forward the DNS query request towards DNS server 132. In Step 11-10, DNS server 132 (a) may receive the DNS query request from 130 to resolve www.example-132.com, (b) may service the request by searching the DNS for the IP address 12.34.56.78 assigned to www.example-132.com, (c) may generate the corresponding DNS query response, and (d) may send the DNS query response back to origin host 130. Based on the tests of domain name B/F-1, TIGs 200 and 250 may prevent the bogus DNS query requests from expending/wasting any DNS resources trying to resolve unregistered domain names. The denial-of-service attack may be remediated/prevented. Thus, the DNS may be fully available to service the legitimate DNS query requests.

Figure 12:
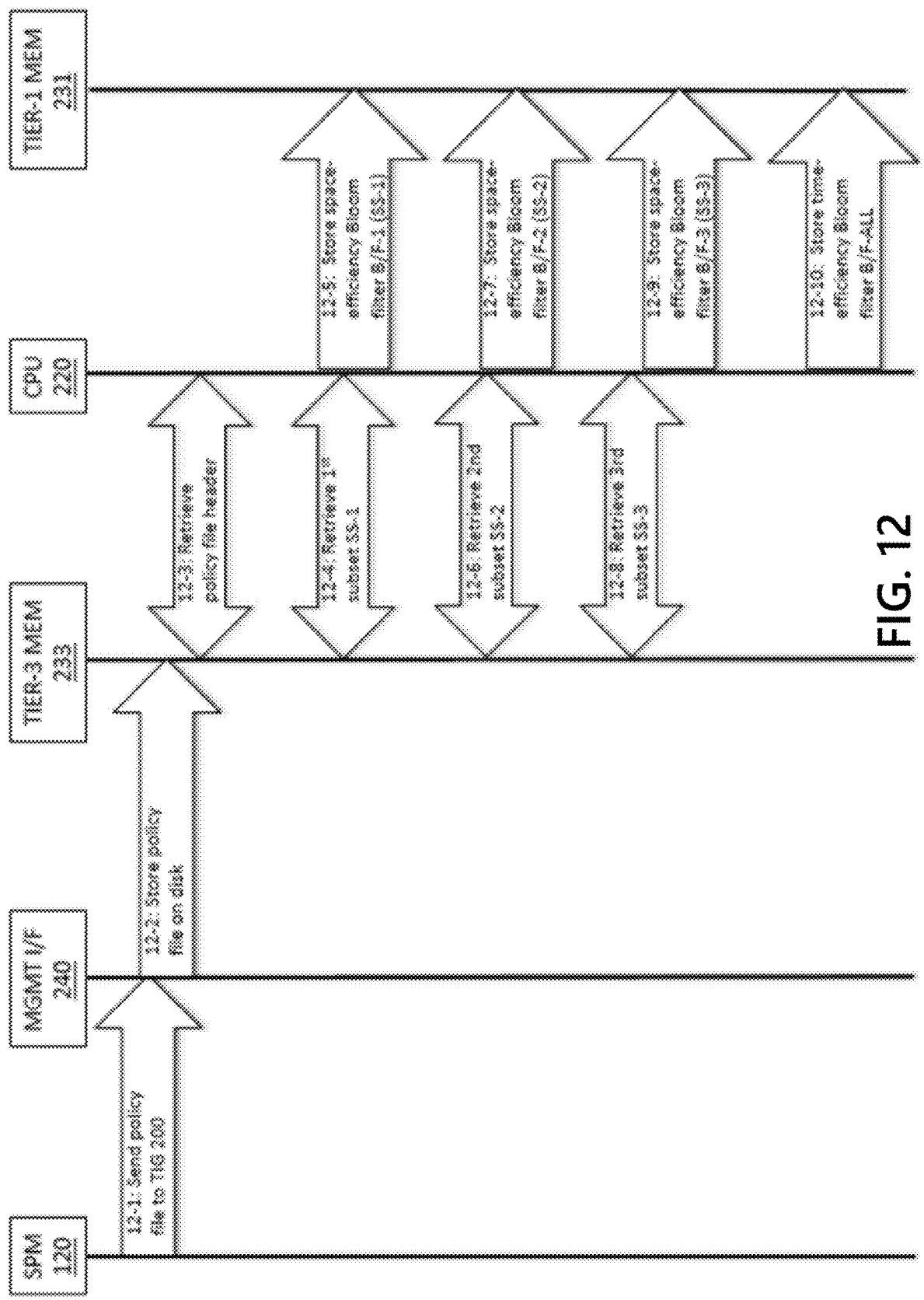

FIG. 12 illustrates an embodiment and associated event sequence in which a TIG may be configured for efficient packet filtering when a policy is partitioned into three subsets, where the partitioning is determined by types of indicators and by the types of packet transformation functions for the rules. A time-efficiency Bloom filter may be associated with the entire set, or a union of all three subsets. Each subset may be associated with (and represented by) a space-efficiency Bloom filter. All Bloom filters may have a false positive rate value that has been selected based on the type of Bloom filter (e.g. time-efficiency or space-efficiency) and based on the type of packet transformation functions (e.g. BLOCK or MONITOR) associated with rules in the subsets. The subsets and associated Bloom filters may be stored in the same memory module. This illustration generally corresponds to Steps 3-1 through 3-4 of FIG. 3.

In Step 12-1, the SPM 120 may send a file containing a next policy to be enforced by TIG 200 on in-transit packets to the TIG's management interface MGMT I/F 240 (via Network 110 which may be identified with, for example, the Internet). The policy file may include a header with a policy descriptor, which may include information such as a partitioning scheme of the set of packet filtering rules into subsets, the type or types of efficiency to be applied to each subset, the size of the policy, the size of each subset, and the types of indicators in each subset.

In Step 12-2, the MGMT I/F 240 may transfer (via BUS 210) the policy file to TIER-3 MEM 233, which may be identified with a local mechanical/spinning magnetic disk (non-volatile, relatively large capacity, relatively cheap, relatively slow read/write access). In Step 12-3, the CPU 220 may retrieve the policy file header from the disk 233. The policy file header may indicate how the policy is partitioned into subsets of rules, what efficiencies may be applied, and how the subsets may be distributed across multiple memory modules (if necessary, based on size information). As the CPU 220 processes the policy header file information, the CPU may temporarily store portions of the information in other portions of memory, such as TIER-0 MEM 230, which may be identified with on-chip cache memory, and in TIER-1 MEM 231, which may be identified with on-PCB main memory. These temporary storage events are not shown.

The policy descriptor data may specify a plurality of information. The policy descriptor data may specify that SS-1 is a subset of packet filtering rules, where each rule may include (a) a threat indicator of type Certificate-Identifier, which is a pair {CA-Identifier, Serial Number}; (b) a BLOCK packet operator or transformation function; and (c) the threat metadata such as "<threat-type=revoked certificate>". SS-1 may be encoded as a space-efficiency Bloom filter B/F-1 using a false positive rate $P=10^{-12}$. The policy descriptor data may specify that SS-2 is a subset of packet filtering rules, where each rule may include (a) a threat indicator of type domain name; (b) a BLOCK packet operator or transformation function; and (c) the threat metadata such as "<threat-type=credentials phishing site>". SS-2 may be encoded as a space-efficiency Bloom filter B/F-2 using a false positive rate $P=10^{-12}$. The policy descriptor data may specify that SS-3 is a subset of packet filtering rules, where each rule may include (a) a threat indicator of type domain name; (b) a MONITOR packet operator or transformation function; and (c) the threat metadata such as "<threat-type=malware CDN>". SS-3 may be encoded as a space-efficiency Bloom filter B/F-3 using a false positive rate $P=10^{-6}$. The policy descriptor data may specify a time-efficiency Bloom filter B/F-ALL associated with and containing all of the threat indicators in SS-1, SS-2, and SS-3, and with a false positive rate $P=10^{-3}$.

In Step 12-4, based on the policy file header information, the CPU 220 may retrieve the first subset SS-1 from the disk 233. CPU 220 may extract all of the indicators (of type Certificate-Identifier) in SS-1, and may insert the indicators into both the space-efficiency Bloom filter B/F-1 (with a false positive rate $P=10^{-12}$) and the time-efficiency Bloom filter B/F-ALL (with a false positive rate $P=10^{-3}$). CPU 220 may associate the Bloom filter B/F-1 with the packet transformation function BLOCK, with the threat metadata "<threat-type=revoked certificate>", and with the indicator type Certificate-Identifier. CPU 220 may associate the indicator type Certificate-Identifier with B/F-ALL. In Step 12-5, the CPU 220 may determine that main memory 231 has sufficient remaining available capacity to store the Bloom filter B/F-1 (which represents SS-1). Based on the capacity determination, CPU 220 may store the space-efficiency Bloom filter B/F-1 in main memory 231.

In Step 12-6, based on the policy file header information, the CPU 220 may retrieve the second subset SS-2 from the disk 233. CPU 220 may extract all of the indicators (of type Domain-Name) in SS-2, and may insert the indicators into both the space-efficiency Bloom filter B/F-2 and the time-efficiency Bloom filter B/F-ALL. CPU 220 may associate the Bloom filter B/F-2 with the packet transformation function BLOCK, with the threat metadata "<threat-type=credentials phishing site>", and with the indicator type Domain-Name. CPU 220 may associate the indicator type Domain-Name with B/F-ALL. After that operation, B/F-ALL is associated with two types of indicators (Certificate-Identifier and Domain-Name). In Step 12-7, the CPU 220 may determine that main memory 231 has sufficient remaining available capacity to store the Bloom filter B/F-2 (which represents SS-2). Based on the capacity determination, CPU 220 may store the space-efficiency Bloom filter B/F-2 in main memory 231.

In Step 12-8, based on the policy file header information, the CPU 220 may retrieve the third subset SS-3 from the disk 233. CPU 220 may extract all of the indicators (of type Domain-Name) in SS-3, and may insert the indicators into both the space-efficiency Bloom filter B/F-3 and the time-efficiency Bloom filter B/F-ALL. CPU 220 may associate the Bloom filter B/F-3 with the packet transformation function MONITOR, with the threat metadata "<threat-type=malware CDN>", and with the indicator type Domain-Name. The CPU 220 may determine that the indicator type Domain-Name has already been associated with B/F-ALL, as discussed in Step 12-6 above. In Step 12-9, the CPU 220 may determine that main memory 231 has sufficient remaining available capacity to store the Bloom filter B/F-3 (which represents SS-3). Based on the capacity determination, CPU 220 may store the space-efficiency Bloom filter B/F-3 in main memory 231. In Step 12-10, the CPU 220 may determines that main memory 231 has sufficient remaining available capacity to store the Bloom filter B/F-ALL (which contains all of the threat indicators in SS-1, SS-2, and SS-3). Accordingly, CPU 220 may store the time-efficiency Bloom filter B/F-ALL in main memory 231. Based on a determination that all rule subsets of the policy have been processes, the TIG 200 may be determined to be configured for efficient packet filtering for the current policy and may begin to receive packets for filtering.

Figure 13:
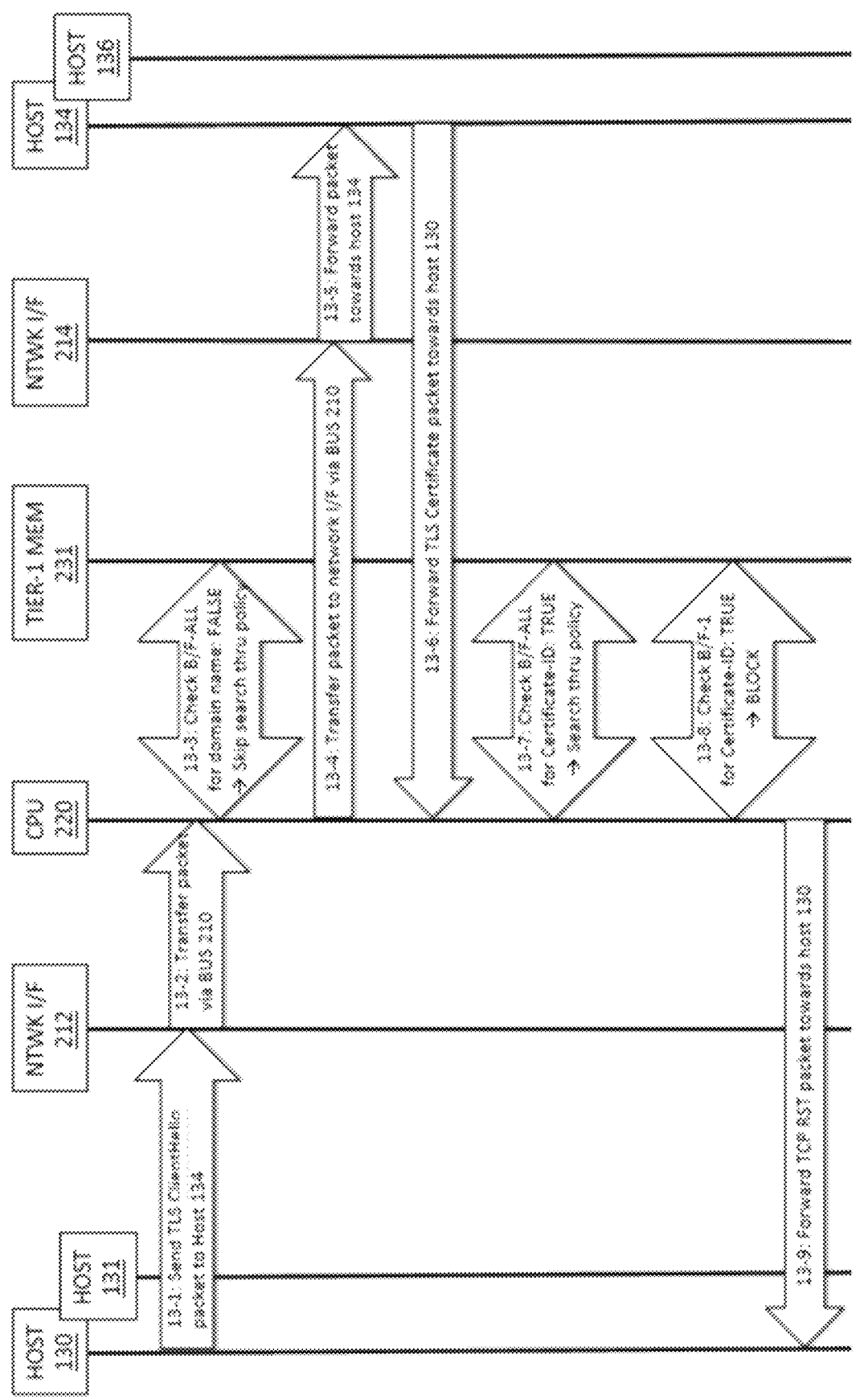

FIG. 13 illustrates a representative use case and associated efficient packet filtering process for the TIG 200 that was configured in FIG. 12. This illustration generally corresponds to Steps 3-5 through 3-9 of FIG. 3. The version of the TLS protocol used in FIG. 13 may generally correspond to TLS 1.2.

In Step 13-1, for example, a human user operating a web browser hosted by desktop computer 130 attached to Network 112 may initiate a (secured) web/HTTPS session with a web site named www.enterprise-xyz.com hosted by server 134 attached to Network 116. Host 130 may resolve www.enterprise-xyz.com in the DNS to an IP address (e.g. 12.34.56.78), and may establish a TCP connection between 130 and 134 on port 443/HTTPS (not shown in FIG. 13). The CPU 220 may filter these packets by extracting IP addresses from the L3 headers of these packets and searching the policy; however, when B/F-ALL does not contain any IP-Address indicators, CPU 220 may not search the policy for these IP addresses. Computer 130 may initiate the TLS tunnel setup handshake by forwarding a packet towards web site 134 containing a TLS ClientHello message.

In Step 13-2, the network interface 212 of TIG 200 may receive and ingest the in-transit packet and may transfer it via BUS 210 to CPU 220 for filtering. CPU 220 may extract the domain name www.enterprise-xyz.com from the SNI field in the ClientHello message. In Step 13-3, CPU 220 may determine if the filter B/F-ALL contains indicators of type Domain-Name, which may return a TRUE value. CPU 220 may test if www.enterprise-xyz.com is a member of B/F-ALL, which may return a FALSE value. Base on the false value indicating the domain name is not in the policy, the CPU 220 may skip the search through the policy. In Step 13-4, the CPU 220 may transfer the packet to network interface 214 via BUS 210. In Step 13-5, the network interface 214 may forward the packet into the network 110 towards the target destination web site www.enterprise-xyz.com, which may be hosted by server 134 with the IP address 12.34.56.78. Server 134 may receive and ingest the packet at port 443, may process the ClientHello message, and may respond to the ClientHello by sending a packet containing a TLS ServerHello message back to host 130 (not shown in FIG. 13).

In Step 13-6, host 134 may send a packet containing a TLS Certificate message towards host 130. The packet may be received and ingested by the TIG (via network interface 214) and processed by CPU 220. CPU 220 may extract the "Issuer Name" and "Serial Number" values from the certificate and associate those values with a Certificate-ID. In Step 13-7, CPU 220 may determine if B/F-ALL contains indicators of type Certificate-Identifier associated with the filtered packet, which may return TRUE result. The CPU 220 may determine if B/F-ALL contains Certificate-ID associated with the filtered packet, which may return TRUE result. Based on the TRUE result, the CPU 220 may test the rules associated with B/F-ALL to determine any rules and operations associated with the packet data being tested. In Step 13-8, CPU 220 may determine if B/F-1 contains indicators of type Certificate-Identifier, which may return a TRUE result. Based on the TRUE result, the CPU 220 may determine if B/F-1 contains Certificate-ID, which may return a TRUE result. Based on the TRUE result associated with the Certificate-ID, the certificate for www.enterprise-xyz.com may be determined to have been revoked by the certificate authority that issued the certificate, and the system may determine that site administrators have not yet obtained and installed a new (unrevoked) certificate.

In Step 13-9, CPU 220 may apply the packet transformation function BLOCK associated with B/F-1, which may cause the packet to be dropped, and may cause a TCP RST packet to be sent to host 130 (via network interface 212) to terminate the TCP connection, thereby halting the TLS tunnel setup handshake process.

Figure 14:
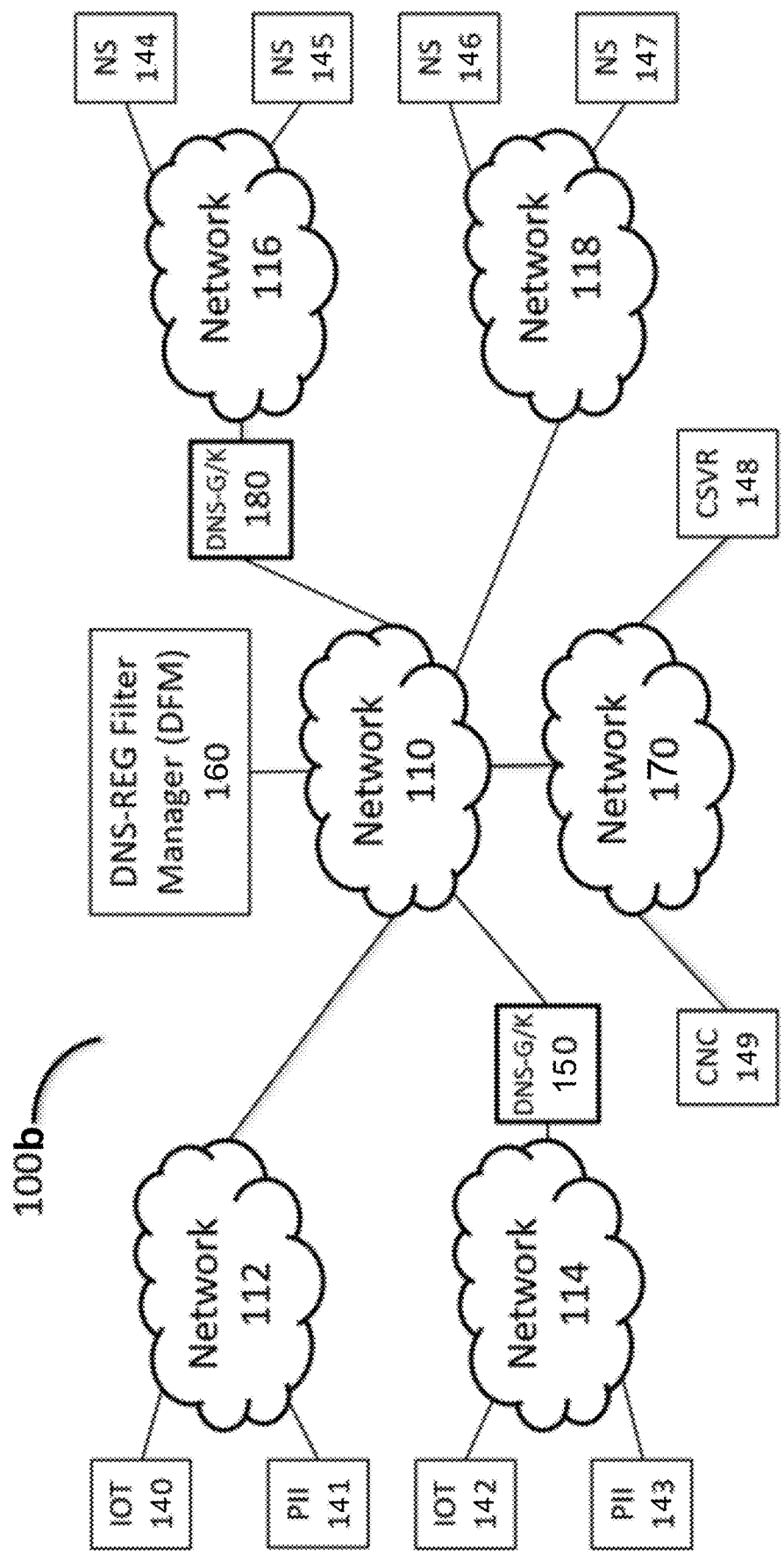
FIG. 14, which may be the same or similar as FIG. 1, depicts an illustrative network environment for a DNS attack prevention system that is protecting portions of both the DNS and networks that use the DNS from threats and attacks.

In accordance with the disclosure, FIG. 14, which may be the similar to FIG. 1, depicts a representative network environment 100. The network environment 100 may include a DNS attack prevention system that acts to protect the domain name system (DNS) of an internetwork, such as the public Internet and private networks that may be interconnected by the public Internet, from attacks that may use bogus DNS requests as attack vectors. As with FIG. 1, the network 110 may be the public Internet, which may interconnect networks 112, 114, 116, 118, and 120 (which may be the same or similar as those as described with respect to FIG. 1).

The network 112 may be a private enterprise network with a plurality of hosts. The plurality of hosts may include at least one "Internet of Things" (IoT) device IOT 140, such as a security camera or appliance that may be remotely managed and operated via the Internet, and a personally identifiable information (PII) host PII 141. Host IOT 140 and other IoT devices (not shown) attached to network 112 may have been infected with malware that may generate attacks on the DNS by issuing many bogus DNS requests with domain names designed to attack specific authoritative name servers (such as host NS 144 attached to network 116, described below). Host PII 141 is representative of a personal computer or server that manages sensitive information, such as personally identifiable information (PII), credit card information, and the like. Host PII 141 may be infected by malware that collects credit card information and the infected host may use a DNS tunneling method to exfiltrate the information to collection server CSVR 148 attached to network 170 (described below). Both attacks may issue requests with domain names that may not be registered in the DNS.

Network 114 and attached hosts IOT 142 and PII 143 may be similarly configured and similarly compromised as Network 112 and hosts IOT 140 and PII 141. However, Network 114 may be configured with a DNS gatekeeper, DNS-G/K 150, located at or near a boundary between Network 114 and the Internet 110. Network 114 may be configured such that the DNS-G/K 150 filters all DNS requests crossing the boundary of Network 114 and may control which DNS requests may access the DNS.

Network 116 may be operated by a DNS infrastructure provider organization DIPO-X. Authoritative name servers NS 144 and NS 145 may be DNS authoritative name servers for the domains example-144.com and example-145.com, which DIPO-X may operate on behalf of associated registrar organizations. Both name servers NS 144 and NS 145 may be configured to provide their zone files, which may include lists of all the registered domain names those servers manage, to authorized requestors. Network 116 may have a DNS gatekeeper DNS-G/K 180 located at or near a boundary between Network 116 and the Internet 110. Network 116 may be configured such that the DNS gatekeeper DNS-G/K 180 filters all DNS requests crossing the boundary and may control which DNS requests may access the DNS name servers for example-144.com (authoritative name server NS 144) and example-145.com (authoritative name server NS 145).

Network 118 may be operated by a DNS infrastructure provider organization (e.g., DIPO-Y). Host authoritative name servers NS 146 and NS 147 may be DNS authoritative name servers for the domains example-146.com and example-147.com, which DIPO-Y may operate on behalf of associated registrar companies. Both name servers NS 146 and NS 147 may be configured to provide their zone files, which may include lists of all the registered domain names those servers manage, to authorized requestors. Network 118 need not have a DNS gatekeeper that controls which DNS requests may access the DNS name servers for example-146.com (authoritative name server NS 146) and example-147.com (authoritative name server NS 147).

Network 170 may be operated by at least one malicious actor. Network 170 may include a collection server host CSVR 148 which may collect data exfiltrated by bogus DNS requests, and may include botnet command and control host system CNC 149 that may execute a botnet command and control process that instructs infected devices to launch DDoS attacks on the DNS. A malicious data collection process executing on collection server CSVR 148 may receive bogus DNS requests on port 53, the well-known port for DNS. The collection server CSVR 148's public IP address may be, for the following examples, 21.43.65.87. A network firewall (not shown) associated with Network 170 may be configured to allow inbound packets with destination IP address 21.43.65.87 of the collection server CSVR 148 and destination port 53. Network 170 may not have a DNS gatekeeper controlling access to the DNS.

The Bloom filter DNS Filter Manager (DFM) 160, which may act as a system management server, may execute as a host attached to a private network (not shown) that interfaces the Internet 110. The DFM 160 may continually collect lists of registered domain names from all DNS authoritative name servers, such as DNS authoritative name servers NS 144-147, and/or from associated domain lists aggregators (not shown in FIG. 1), and from other sources of registered domain names. The DFM 160 may encode and may store all of the registered domain names in at least one data structure DNS-REG, and each Bloom filter DNS-REG$_{PX}$ may have an associated false positive rate $P_X$. The DFM 160 may distribute the data structures or Bloom filters to subscribing DNS gatekeepers (e.g., DNS-G/K 150 and DNS-G/K 180).

The DFM 160 may also include functions for managing information supplied by or uploaded by the subscribing DNS gatekeepers (e.g., DNS-G/Ks 150 and 180). This information may include unregistered domain names detected by the subscribing DNS gatekeepers DNS-G/Ks 150 and 180 and associated metadata (e.g., attack type estimates, timestamps, rate estimations, origin hosts, DNS-G/K IDs, etc.), which may be used as threat intelligence for determining or detecting other attacks. The information may also include statistics on DNS requests and responses observed by the DNS-G/Ks 150 and 180 and element management information for the DNS-G/Ks 150 and 180. The DFM 160 may also include functions for providing information collected from DNS-G/Ks 150 and 180 to subscribing applications (not shown in FIG. 1), such as threat intelligence providers, cyberanalysis applications, network element managers, DNS monitoring applications, DNS protection applications, Internet protection applications, etc.

The DNS-G/K 150 and the DNS-G/K 180 shown in FIG. 14 (and FIG. 15, discussed below) may, but need not, be all or portions of a network device, such as the TIG 200 and/or the TIG 250. In general, the DNS-G/K 150 and the DNS-G/K 180 may execute on any computing device, including but not limited to those computing devices discussed above or below.

Figure 15:
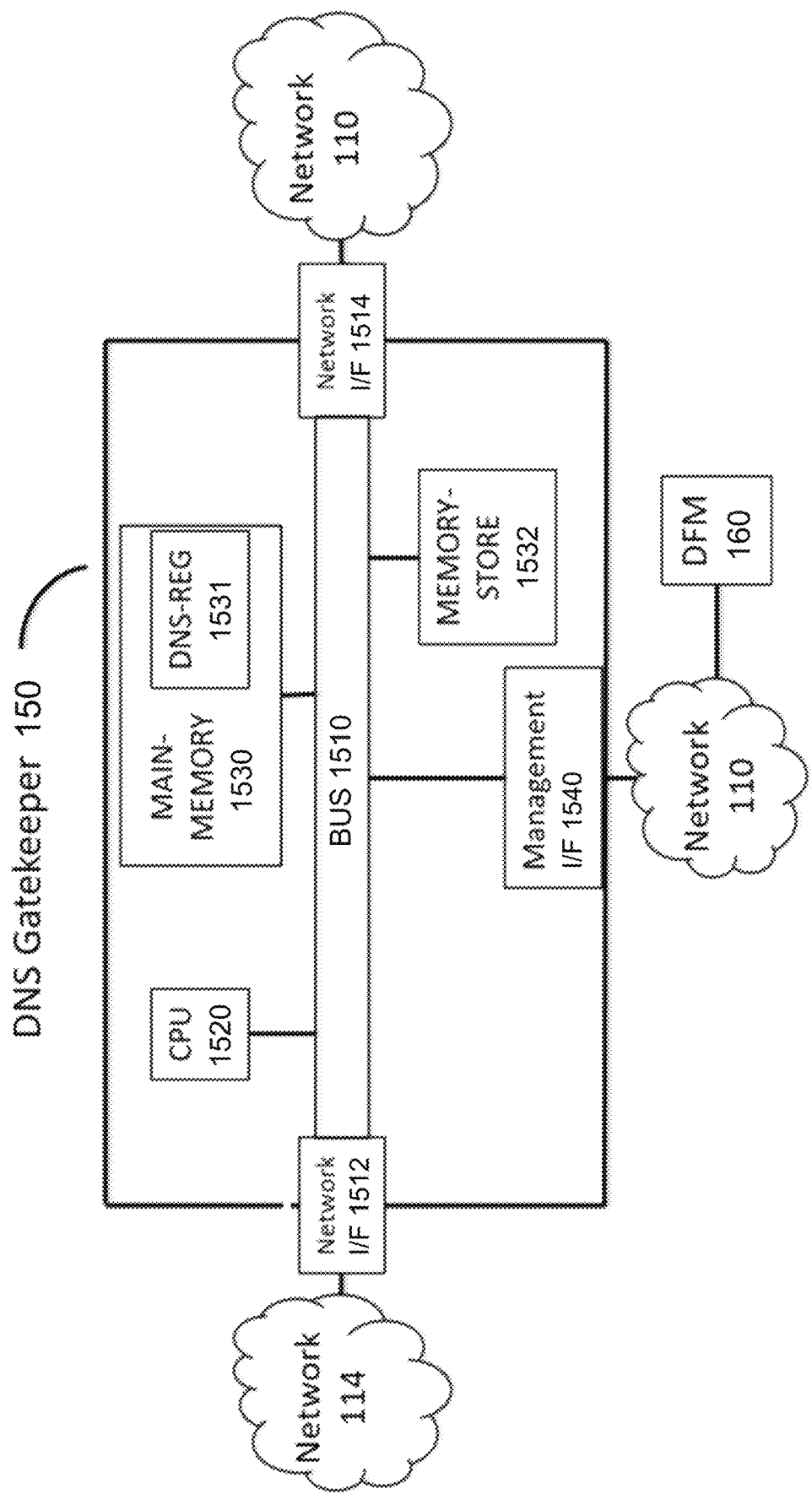
FIG. 15 depicts example components of a DNS Gatekeeper (DNS-G/K) protection device.

FIG. 15 shows a representative system components diagram for the DNS-G/K 150 and/or the DNS-G/K 180 that supports aspects of the present disclosure. The DNS-G/K 150 shown in FIG. 15 may be the same or similar as the DNS-G/K 180 and/or DNS-G/K 150 shown in FIG. 1. DNS-G/K 150 components may include a processor CPU 1520, which may execute logic for configuring and operating the DNS-G/K 150, network interfaces 1512 and 1514 for interfacing Networks 114 and 110, respectively, a management interface MGMT I/F 1540 that connects to Network 110, a main memory module MAIN-MEMORY 1530 that may contain a data structure (e.g., a Bloom filter) DNS-REG 1531, and a memory store MEMORY-STORE 1532 for persistent storage. The components may be connected to a bus, BUS 1510, which may be used to transfer information between the components of the DNS-G/K 150. The Bloom filter DNS-REG 1531 may be provided to the DNS-G/K 150 by DFM 160 via the management interface 1540 and Network 110. The system components of the DNS-G/K 150 may be any combination of (e.g., co-resident) processes or applications executing on the same host, processes executing on different hosts, processes executing on virtual infrastructure, such as a hypervisor, or other arrangement of components and software. Similarly, the bus, BUS 1510, may not solely be an integrated/embedded data bus of a printed circuit board (PCB), but may also be, for example, an L2/L3 switched network, L3 routed network, L2/L3 network links connecting logical components, and the like, in any combination. The data bus may be wired, wireless, physical, logical, virtual, software-defined, etc., in any combination. Network interfaces 1512 and 1514 may be L3 transparent. Network interfaces 1512 and 1514 may not have assigned IP addresses and may not participate in L3 routing processes. Similarly, network interfaces 1512 and 1514 may be L2 transparent. Network interfaces 1512 and 1514 may not have assigned MAC addresses and thus may not participate in ARP processes. The management interface MGMT I/F 1540 may have an assigned IP address for communicating with management devices, such as DFM 160.

Figure 16:
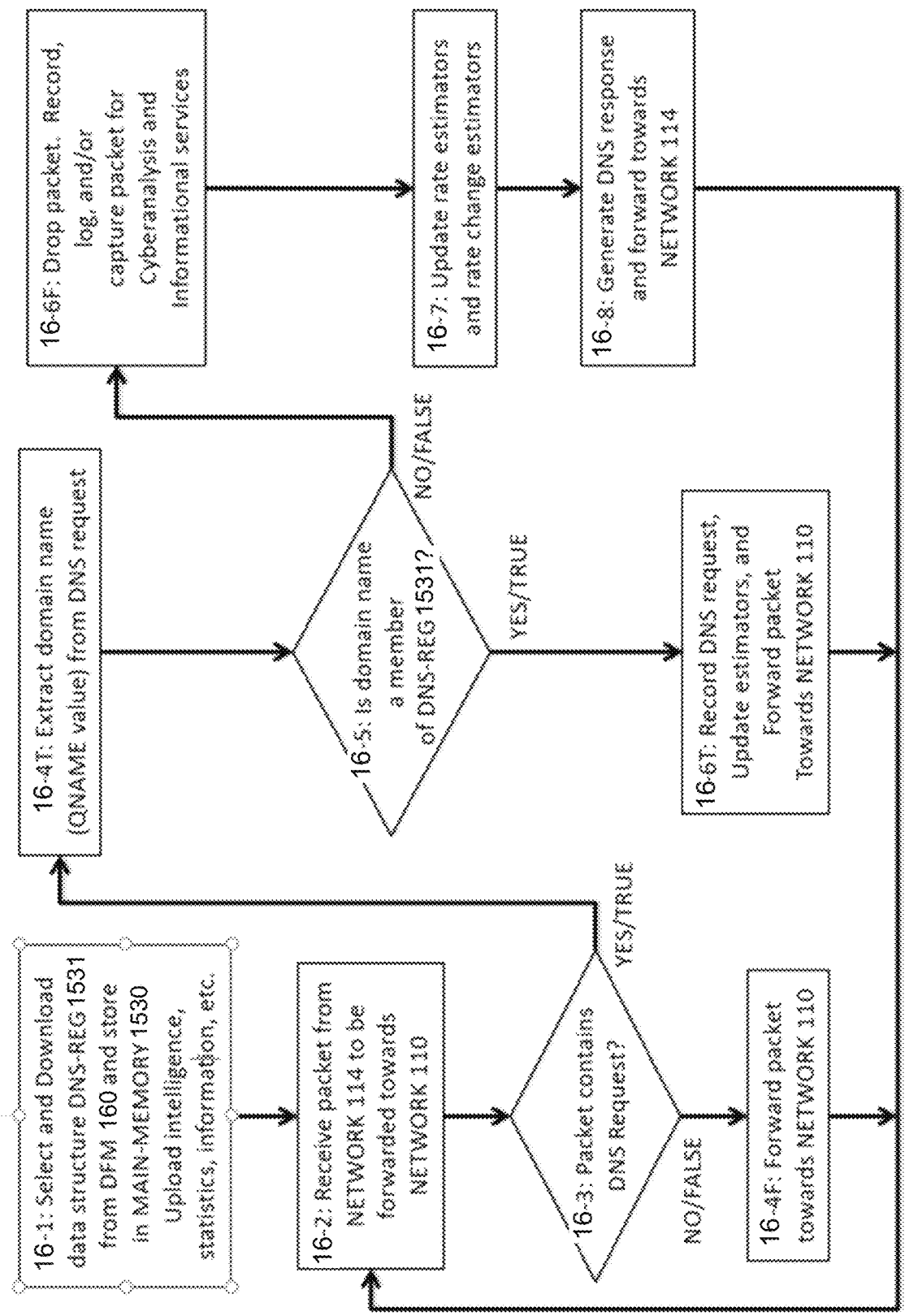
FIG. 16 depicts a flowchart of an example operational concept for the DNS-G/K.

FIG. 16 is a flowchart for a representative operational concept of the DNS-G/K 150. In Step 16-1, the DNS-G/K 150 may select a data structure (e.g., a Bloom filter), DNS-REG 1531, offered by the DFM 160, and may download and store the Bloom filter DNS-REG 1531 in its main memory MAIN-MEMORY 1530. The Bloom filter DNS-REG 1531 may contain all domain names currently registered in the DNS, as available to or determined by the DFM 160. The DFM 160 may offer multiple versions of DNS-REG 1531 for use by DNS gatekeepers, which may be characterized by false positive rates and corresponding memory requirements for storing the set of all registered domain names. The versions of the DNS-REG 1531 may also be characterized by creation time, and the selection and download of the DNS-REG 1531 may be part of an update process of the DNS-G/K 150. A Bloom filter (e.g., DNS-REG 1531) may be selected by the DNS-G/K 150 based on an associated false positive rate P and/or based on corresponding memory requirements for storing the set of domain names in the DNS-REG 1531. In Step 16-1, the DNS-G/K 150 may also upload to DFM 160 information collected in Steps 16-6, 16-7, and 16-8. The upload may be part of an update process. The upload may include data such as bad, bogus, or unregistered domain names detected by the DNS-G/K 150 and associated metadata (e.g., timestamps, origin host identifiers, estimated attack type, rate estimations, etc.), which may be used, for example, as threat intelligence and in threat intelligence reports. The upload data may include statistics on DNS requests and responses observed by the DNS-G/K 150, and domain names that DNS-G/K 150 determined may be registered in the DNS but that may not be contained in the local instance the Bloom filter DNS-REG 1531 (e.g., due to synchronization lag). Such domain names may have been determined by the DNS-G/K 150 in Step 17-12 of FIG. 17 (described below). Other information such as DNS-G/K 150 element management information may also be uploaded.

In Step 16-2, the DNS-G/K 150 may receive an in-transit packet from NETWORK 114, which may be intended to be forwarded towards NETWORK 110. The DNS-G/K 150 may also process packets transmitted in the opposite direction, from NETWORK 110 towards NETWORK 114, but for illustrative purposes, only one direction is described. In Step 16-3, the DNS-G/K 150 may determine if the packet contains a DNS query request. If the packet does not contain a DNS query request, then in Step 16-4F, the packet may be forwarded into NETWORK 110, and the DNS-G/K 150 cycles back to Step 16-2 to process additional packets. If the packet does contain a DNS query request, then in Step 16-4T, the domain name, which may be contained in a QNAME field, may be extracted.

In Step 16-5, the DNS-G/K 150 may test if the domain name is a member of the set contained in the Bloom filter (e.g., the DNS-REG 1531). The DNS-REG 1531 may include the set of all domain names currently registered in the DNS, based on the last update according to the DFM 160. When the membership test returns TRUE, or when it is determined that the name is registered in the DNS, in Step 16-6T the packet and associated DNS requests and metadata may be recorded for analysis and statistics purposes and stored in MEMORY-STORE 1532. In addition, the ratio of the rate of bad, bogus, or unregistered domain names DNS requests to the rate of all DNS requests and/or the ratio of the rate of change in the rate of bad, bogus, or unregistered domain names DNS requests to the rate of all DNS requests may be updated by the DNS-G/K 150, the packet may be forwarded into NETWORK 110, and the DNS-G/K 150 may cycle back to Step 16-2 to process additional packets.

When the membership test returns FALSE, and/or when it is determined that the name is not registered in the DNS and determined that the DNS request is associated with bad, bogus, or unregistered domain names, then in Step 16-6F, the packet may be dropped or blocked. The packet and associated information and metadata (e.g., a domain name, time, location, direction, origin, attack type estimate, rate estimates, etc.) may be recorded for statistics purposes, packet and associated information and metadata may be logged and/or captured, and the packet and associated information and metadata may be stored in MEMORY-STORE 1532. This data subsequently may be transmitted to or uploaded to the DFM 160 as in Step 16-1 above. The packet and associated information and metadata may be made available for use in cyberanalysis applications, threat intelligence applications, and network protection applications such as applications for securing and protecting the global DNS and the global Internet (not shown in FIG. 16). For example, during a high-rate DDoS attack using bogus DNS requests as the attack vector, logging and/or capturing the packets associated with the attack may consume unacceptably large amounts of computing resources. As such, statistical information requiring fewer resources may be collected instead. The cyberanalysis application may identify infected hosts that may be the originators of the bogus DNS requests. The packet and associated information and metadata may be provided to a cyber threat intelligence database, which subsequently may be used by applications and systems that protect networks. For example, DNS infrastructure providers and Internet service providers may collectively use the data to drive global DNS and global Internet protection applications.

In Step 16-7, the rate of bad, bogus, or unregistered domain names DNS requests may be updated to incorporate the occurrence of the bad, bogus, or unregistered domain name DNS request. The DNS-G/K 150 may determine or compute the rate of occurrence of bad, bogus, or unregistered domain name DNS requests, or a rate of occurrence of all DNS requests. The DNS-G/K 150 may determine or compute the rate of change in the occurrence of bogus DNS requests, or a change of rate of occurrence of all DNS requests. The rate of DNS requests and/or the rate of change in the rate of DNS requests may be used in Step 16-8 to determine the type of attack associated with the bad, bogus, or unregistered domain name DNS request(s), and may be used to determine a DNS response, if any, that may be generated. In Step 16-8, the DNS-G/K 150 may determine what type of DNS query response, if any, to generate in response to the bad, bogus, or unregistered domain name DNS query request, and may forward any generated DNS response towards Network 114. When generating a DNS response, the DNS-G/K 150 may spoof an actual DNS responder, and may send a spoofed response to the originator of the associated DNS request and any intermediate devices that may have observed the DNS request. The spoofed response may appear to the requesting device to be a response from an authenticated name server of the DNS.

The factors used to determine the DNS response may include: the current estimated rates of bad, bogus, or unregistered domain name requests and of legitimate DNS requests, rates of change of bad, bogus, or unregistered domain name requests and of legitimate DNS requests, the false positive rate P of the data structure (e.g., DNS-REG 1531), an estimated lag, if the domain name includes a country code in its suffix, an estimate of the type of attack for which the bad, bogus, or unregistered domain name DNS request is an attack vector, and/or the syntactical characteristics of the domain name (e.g., information entropy values, correlation with human language words, label lengths, alphanumeric characteristics, and the like). For example, based on the current values of the rate of bad, bogus, or unregistered domain name DNS requests and/or the rate of change in the rate of bad, bogus, or unregistered domain name DNS requests, the DNS-G/K 150 may determine that a high-volume DDoS attack is occurring. Based on a determination that an attack is occurring, the DNS-G/K 150 may determine not to generate any DNS response to send back to the source of the DNS request. Generating DNS responses (e.g., a response with response codes of NXDOMAIN) to bad, bogus, or unregistered domain name DNS requests during such a DDoS attack may exacerbate the attack by consuming processing resources or filling up DNS caches in intermediate DNS proxies with the NXDOMAIN responses to the bad, bogus, or unregistered domain name DNS requests, which causes legitimate DNS requests and associated responses to not be stored in the DNS caches, which causes more loading on the DNS.

In another example, a non-DDoS attack, such as a DNS tunneling attack or exfiltration may be occurring based on the current values of the rate of bad, bogus, or unregistered domain name DNS requests and the rate of change in the rate of bad, bogus, or unregistered domain name DNS requests. Such attacks should be prevented, but are less likely to over-consume processing resources or to fill up DNS caches. The DNS-G/K 150 may determine that a non-DDoS attack, such as a DNS tunneling attack or exfiltration may be occurring. Based on a determination that such an attack is occurring, the DNS-G/K 150 may generate a DNS response with response code NXDOMAIN and may transmit that response to the source of the DNS request. DNS caches in any intermediate DNS proxies may store the DNS-G/K 150 generated NXDOMAIN response, and subsequent bad, bogus, or unregistered domain name DNS requests, including retries of previous bad, bogus, or unregistered domain name DNS requests, may be handled by the intermediate DNS proxies. Conversely, the DNS-G/K 150 may decide not to generate a DNS response and transmit it back to the source of the DNS request in order to, for example, prevent the source from realizing that it may have been discovered or otherwise identified as a malicious actor.

In yet another example, the DNS-G/K 150 may determine that the bad, bogus, or unregistered domain name DNS request may be the result of human error, or simulated human error generated by malware, while operating an application that generates DNS requests, such as a web browser. Based on such a determination, the DNS-G/K 150 may generate a DNS response with response code NXDOMAIN. Based on the response code, the application may not time out while waiting for a response to the request and may not automatically re-issue the same bad, bogus, or unregistered domain name DNS request. For example, web browsers generating faulty DNS requests may repeat this retry cycle multiple times if a DNS response is not received for a DNS request, which may cause the browser to be temporarily unavailable to the human operator, until the browser gives up. The repetition of issuing the same bad DNS request may be viewed as a denial-of-service attack. The repetition of issuing the same bad DNS request may be prevented by the DNS-G/K 150 generating and sending a DNS response with response code NXDOMAIN.

Figure 17:
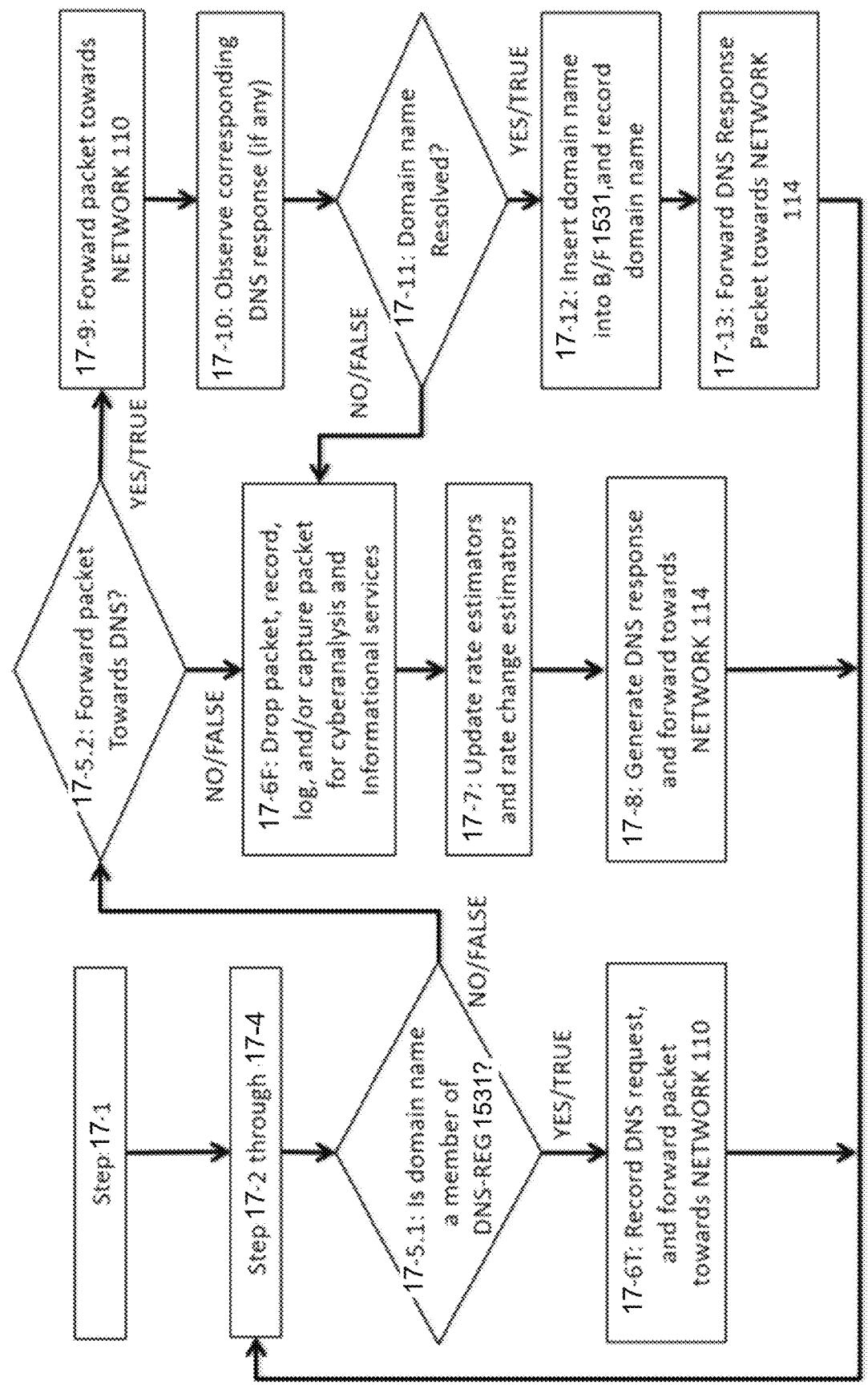
FIG. 17 depicts another flowchart of an example operational concept for the DNS-G/K.

FIG. 17 is a flowchart for operations of a DNS gatekeeper, such as the DNS-G/K 150. Steps 17-1 through 17-4 in FIG. 17 are substantially the same as Steps 16-1 through 16-4 in FIG. 16; therefore, a description of those steps is not repeated here or in the drawing. The other steps relate to the handling of DNS requests that may be forwarded, by the DNS-G/K 150, towards the DNS even though the domain name membership test of Step 16-5 in FIG. 16 returned FALSE.

As discussed above, some requests may relate to domain names that are not in the DNS-REG 1531 due to lag, such as a country-code lag. For example, some gaps in the collection of all country code domains may occur in the domain names registered in a local DNS-REG 1531, and a country code domain CCD-X that is registered in the global DNS may not be included in the Bloom filter DNS-REG 1531 that was distributed by the DFM 160 in Step 16-1 of FIG. 16 or Step 4-1 in FIG. 4. Similarly, synchronization lag may be a factor if, for example, the DNS-G/K 150 determines that a local Bloom filter (e.g., the DNS-REG 1531) stored in the DNS-G/K 150 has not been updated, based on a data that may be received from DFM 160, in a relatively long time. Additionally, some requests may relate to domain names that are not in the DNS-REG 1531 due to the use of unregistered domain names by legitimate information exchange services.

In Step 16-5, a membership test for CCD-X in Bloom filter DNS-REG 1531 may return a FALSE value and, in Step 16-6F, the associated packet may be dropped. However, when a packet is dropped, no new information is gathered by the DNS-G/K 150. As an alternative to dropping, if it is determined that there is a sufficient probability that the domain name is actually registered in the DNS, or for other possible reasons such as intelligence collection, or such as because a determination may be made that the unregistered domain name is part of a legitimate information exchange service, then the DNS-G/K 150 may decide not to drop the DNS request packet but instead forward the DNS request packet into the DNS. The DNS-G/K 150 may monitor and observe the corresponding DNS response, which may contain either a resolved IP address, such that it is determined that the domain name is registered in the DNS, or an error code such as NXDOMAIN, such that it is determined that the domain name is not registered in the DNS; or there will be no response, which may indicate a DNS tunneling attack. In view of those considerations, additional processing may be provided in place of the determination in Step 16-5. In FIG. 17, such determinations are provided in Steps 17.5.1 and 17.5.2.

In Step 17.5.1, the DNS-G/K 150 may test if the domain name is a member of the set contained in Bloom filter DNS-REG 1531, which is representative of all domain names currently registered in the DNS. If the membership test returns TRUE, such that the DNS-G/K 150 determines that the name is registered in the DNS, in Step 17-6T the packet and associated DNS requests may be recorded for statistical purposes and may be stored in MEMORY-STORE

1532. The DNS-G/K 150 may forward the packet into NETWORK 110, and the DNS-G/K 150 may cycle back to Step 17-2 and process more packets.

If the membership test returns FALSE, such that it is determined that the domain name is not registered in the DNS-REG 1531, in Step 17.5.2 the DNS-G/K 150 may determine whether to forward the packet towards the DNS. The forwarding determination may be based on a determination by DNS-G/K 150 that the FALSE result of the membership test was due to some type of lag. For example, the DNS-G/K 150 may determine if the domain name includes a suffix that is a country code. Based on a determination that the domain name includes a suffix that is a country code, the DNS-G/K 150 may conclude that the FALSE result may have been due to country-code lag (as described above). Alternatively, the DNS-G/K 150 may determine that the local copy of Bloom filter DNS-REG 1531 has not been updated by DFM 160 in a relatively long time, and may conclude that the FALSE result may have been due to synchronization lag (described above). The forwarding determination may also be based on a determination by the DNS-G/K 150 that the FALSE result of the membership test was due to the use of an unregistered domain name as part of a legitimate information exchange service. For example, the DNS-G/K 150 may determine that the unregistered domain name includes a suffix that corresponds to an authoritative name server operated by a legitimate information exchange service.

When, in Step 17-5.2, the DNS-G/K 150 may determine not to forward the DNS request packet towards the DNS, Steps 17-6F, 17-7, and 17-8 may be executed. These steps are substantially the same as Steps 16-6F, 16-7, and 16-8 of FIG. 16; therefore, a detailed description is not repeated here. When the DNS-G/K 150 determines to forward the DNS request packet, in Step 17-9 the DNS-G/K 150 may forward the DNS request packet towards the DNS via the NETWORK 110. When the DNS-G/K 150 determines that a domain name in a request is not registered in the DNS-REG 1531 but the request packet should be forwarded, the DNS-G/K 150 may activate logic to monitor for communications associated with the forwarded request packet and may detect a corresponding DNS response. In Step 17-10, the DNS-G/K 150 may detect or observe the corresponding DNS response, if any, transiting towards the NETWORK 114.

In Step 17-11, the DNS-G/K 150 may check if the DNS response indicates a resolved IP address, such that it is determined that that the domain name is not represented in the DNS-REG 1531 but is registered in the DNS. If the DNS-G/K 150 does not observe a DNS response indicating a resolved IP address, the DNS-G/K 150 may execute Steps 17-6F, 17-7, and 17-8 (as described above), and the DNS-G/K 150 may cycle back to Step 17-2 to process additional packets. If the DNS-G/K 150 does observe a DNS response indicating a resolved IP address, in Step 17-12 the DNS-G/K 150 may insert the domain name into the local DNS-REG 1531, and may record the domain name for informational purposes and may upload it to the DFM 160 in Step 17-1. In Step 17-13, the DNS-G/K 150 may forward the DNS response packet towards its destination (via NETWORK 114), and the DNS-G/K 150 may cycle back to Step 17-2 to process additional requests.

In Step 17-10, it may also be the case that no DNS response is observed. For example, when the associated DNS request is a vector for a DNS tunneling attack (e.g., an exfiltration), the collection server CSVR 148 may not be configured to respond to DNS requests. A logic path for handling this case is not shown in FIG. 17. When no DNS response is observed, the DNS-G/K 150 may determine that the DNS request may be a vector for a DNS tunneling attack. The DNS-G/K 150 may capture, may log, and/or may record the DNS request, and may generate an alert to a cyberanalysis application that a DNS tunneling attack may have occurred. An alert, which may be associated with a single domain name or a plurality of domain names, and associated information, may be uploaded to the DFM 160 in Step 17-1.

Figure 18:
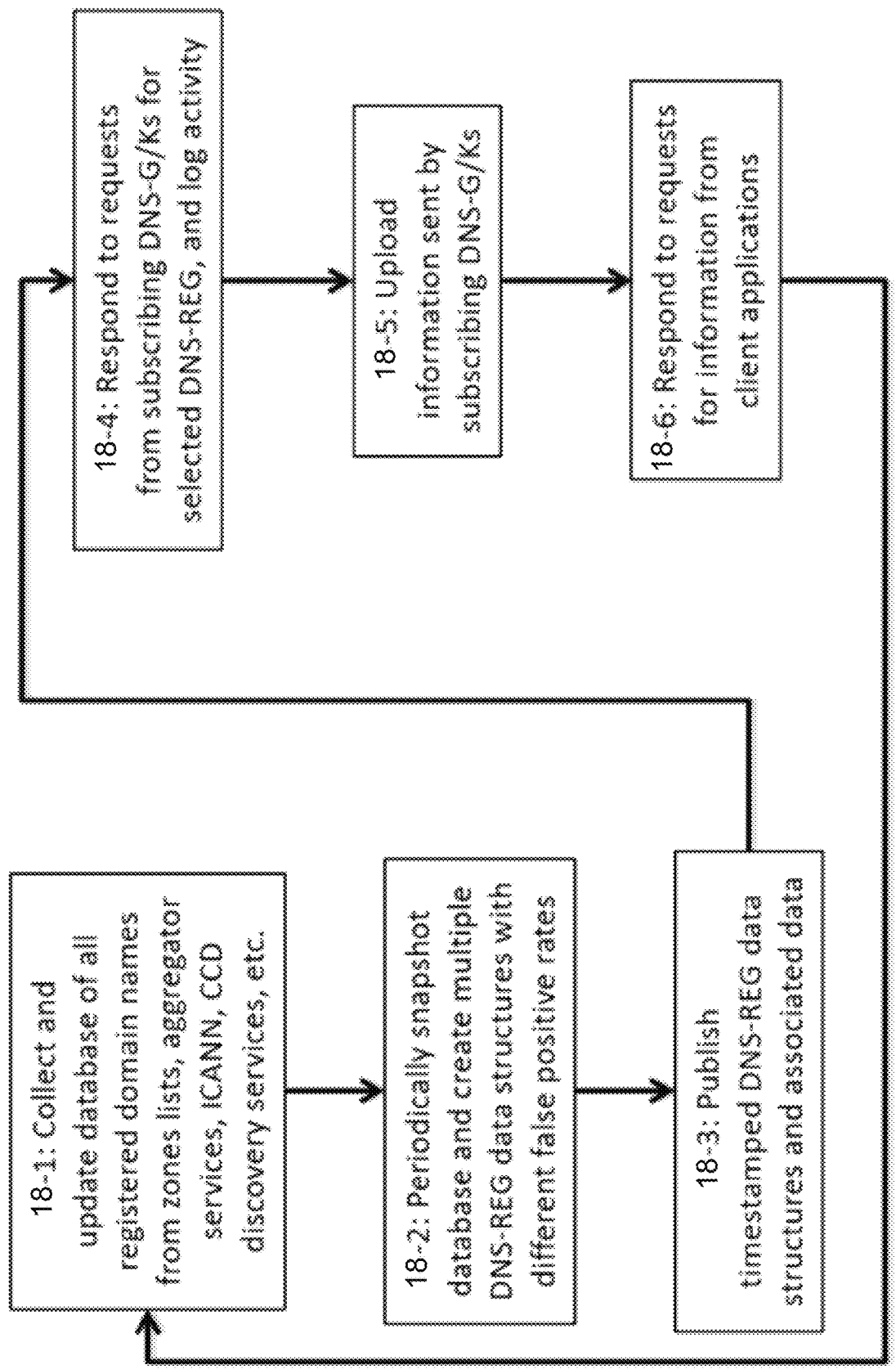
FIG. 18 depicts a flowchart of an operational concept of a DNS Filter Manager.

FIG. 18 is a flowchart showing operational concepts of a DNS Filter Manager (DFM 160). Note that all of the steps shown in FIG. 18 may be executed in a different order, not just the order shown, and may be executed concurrently and continually. The ordering of steps shown in FIG. 18 is representative and for descriptive purposes only, and not intended to be limiting or restrictive in any way.

In Step 18-1, the DFM 160 may collect and may aggregate lists of domain names that are currently registered in the DNS. The DFM 160 may create a database of domain names that is accessible or sharable with other computing devices. Sources of these lists may include zone files, which may be discovered by DNS registry operator organizations and/or associated delegates and/or authoritative name servers, domain list aggregator services, third party services that discover country code domains (CCDs), ICANN, and the like.

In Step 18-2, the DFM 160 may snapshot the database of currently registered domain names, possibly according to a schedule, which may be periodic. The snapshot may be used as the source data of the DNS-REG 1531 data structures (e.g., Bloom filters) that may be provided to subscribing computing devices, such as DNS-G/Ks 150 and 180. Using the data in the snapshot, the DFM 160 may generate multiple DNS-REG 1531 instances. Each instance DNS-REG$_{PX}$ may be characterized by a false positive rate $P_X$. For probabilistic data structures such as Bloom filters and the like, the magnitude of the logarithm of the false positive rate P may be proportional to the memory requirements for storing the elements of the set. That is, for each DNS-REG 1531 instance, the lower the false positive rate associated with the instance DNS-REG$_{PX}$, the more memory may be required to store a given number of elements in the set. Each instance of a local DNS-G/K 150 may have different local resource requirements. For example, each local DNS-G/K 150 may have different limits on available local main memory for storing a DNS-REG$_{PX}$ instance. As such, the DFM 160 may offer multiple DNS-REG$_{PX}$ instances with different false positive rates and different memory sizes so that a given DNS-G/K 150 may select the DNS-REG$_{PX}$ instance that meets local resource requirements.

In Step 18-3, the DFM 160 may publish the newly created DNS-REG$_{PX}$ instances and associated information/metadata, such as timestamp data, and makes the DNS-REG$_{PX}$ instances available to authorized DNS-G/K subscribers. In Step 18-4, the DFM 160 may respond to subscriber requests by sending a selected DNS-REG$_{PX}$ and associated information to each requesting subscriber. The DFM 160 may log each such request and response, and the log data may be used for a global monitoring application for the DNS-G/Ks 150 and other subscribers. Such a monitoring application may transmit alerts to administrators of subscribing DNS-G/K 150 instances that have not recently updated their local DNS-REG instances.

In Step 18-5, the DFM 160 may upload and store information sent by subscribing DNS-G/Ks 150. As noted above, this information may include unregistered domain names detected by a subscribing DNS-G/K 150 and associated metadata (e.g., timestamps, origin host, estimated attack type, etc.), which may be used, for example, as threat intelligence in detecting related packets. The information may also include statistics on DNS requests and responses observed by the DNS-G/K 150, DNS-G/K 150 element management information, domain names that DNS-G/K 150 may have determined to be registered in the DNS but that may not be contained in the local instance of Bloom filter DNS-REG 1531. Such domain names may have been determined in a process described with regards to Step 17-12 of FIG. 17.

In Step 18-6, the DFM 160 may respond to requests for information, including information that may have been collected in Step 18-5 (described above). Requests for information may be received from various clients systems, such as cyberanalysis applications, threat intelligence provider services, Internet and DNS monitoring systems, domain list aggregator services, and the like. The DFM 160 may cycle back to Step 18-1, or the processes described above may be concurrently or continually performed.

Some possible variants of the DFM 160 concept of operations illustrated in FIG. 18 may reduce resource requirements and reduce lag. For example, in FIG. 18, the most recently generated version of DNS-REG$_{PX}$ containing all registered domain names may be distributed to each subscriber when requested. At scale and at high request frequency, it may be inefficient to continually distribute complete instances of the DNS-REG 1531. In order to reduce resource consumption, a subscriber may request a "delta" set instead of an update of an entire DNS-REG$_{PX}$. That is, the subscriber may indicate to the DFM 160 the last timestamped version of a DNS-REG$_{PX}$ that it downloaded (e.g., version x.04-01-2019.0800). The DFM 160 may compute the delta between version x.04-01-2019.0800 and the most recent version (e.g., x.04-02-2019.0800). A delta set may include all of the newly registered domain names contained in version x.04-02-2019.0800 but not contained in x.04-01-2019.0800, and may contain all of the recently deregistered domain names contained in x.04-01-2019.0800 but not contained in x.04-02-2019.0800. This delta set may be sent to the requesting subscriber DNS-G/K 150. The requesting subscriber DNS-G/K 150 may insert the newly registered domain names into its local copy of DNS-REG 1531 and may delete the recently deregistered domain names from its local copy of DNS-REG 1531. In another variant, the DFM 160 may provide a continual feed of newly registered domain names and newly deregistered domain names. Subscribers to the continual feed may insert the newly registered domain names into their local DNS-REG and delete the recently deregistered domain names from their local DNS-REG. This variant may reduce lag processing issues, as described above.

Some other possible variants of the DFM 160 concept of operations illustrated in FIG. 18 may reduce DNS-G/K 150 local resource requirements, including memory requirements and processing requirements. For example, some DNS-G/Ks 150 may not need a complete DNS-REG 1531 with all known/available registered domain names to provide effective protections against attacks, but instead require only a relatively small subset of registered domain names in their local instances of DNS-REG 1531. Referencing FIG. 1, consider the Network 116 that may be operated by a first DNS infrastructure provider organization (e.g., DIPO-X). DIPO-X may operate two (2) authoritative name servers NS 144 and NS 145 that may be respectively the authoritative name servers for, for example, the domains example-144.com and example-145.com. The DNS may be configured such that all DNS query requests for domain names *.example-144.com and *.example-145.com will be routed to authoritative name server NS 144 and authoritative name server NS 145 attached to Network 116. Thus, such requests will pass through, or be filtered by, DNS gatekeeper DNS-G/K 180 and will be tested for membership in DNS gatekeeper DNS-G/K 180's local instance of DNS-REG 1531.

It is likely the case, however, that most, if not all, DNS query requests that ingress Network 116 may be requests, both legitimate and bad, bogus, or unregistered domain name DNS requests, for resolving domain names of the form *.example-144.com and *.example-145.com. Therefore, the DNS gatekeeper DNS-G/K 180's local DNS-REG 1531 does not need to be populated with every registered domain name in the DNS, but instead only needs to be populated with registered domain names of the form *.example-144.com and *.example-145.com. Compared to a complete Bloom filter DNS-REG 1531, a Bloom filter containing only these domain names will require less local memory and also less time to perform membership tests. Thus, it may be beneficial if the DFM 160 allows subscribers to customize the Bloom filters that the subscribers use to configure their DNS gatekeepers. The DFM 160 may maintain and may update the custom Bloom filters and provide them upon request to the associated subscribers.

Alternatively, since DIPO-X may be the registrar and administrator for the authoritative name servers example-144.com and example-145.com, DIPO-X may create and manage a Bloom filter containing registered domain names of the form *.example-144.com and *.example-145.com, and configure DNS-G/K 180 with this Bloom filter. DIPO-X may also provide this Bloom filter to DFM 160 as an alternative to publishing zone files. DFM 160 may then include this Bloom filter in the Bloom filters DNS-REG 1531 (by, for example, forming the union) that DFM 160 distributes to subscribers. This way, DIPO-X may retain any privacy and protections it desires by not discovering/publishing its zone files, but may participate with the administrators of DFM 160 and the DNS-REG 1531 filters in helping to secure the DNS and the Internet. In practice, for example, this approach may be useful for registrars for country code zones that do not publish their zone files.

Figure 19:
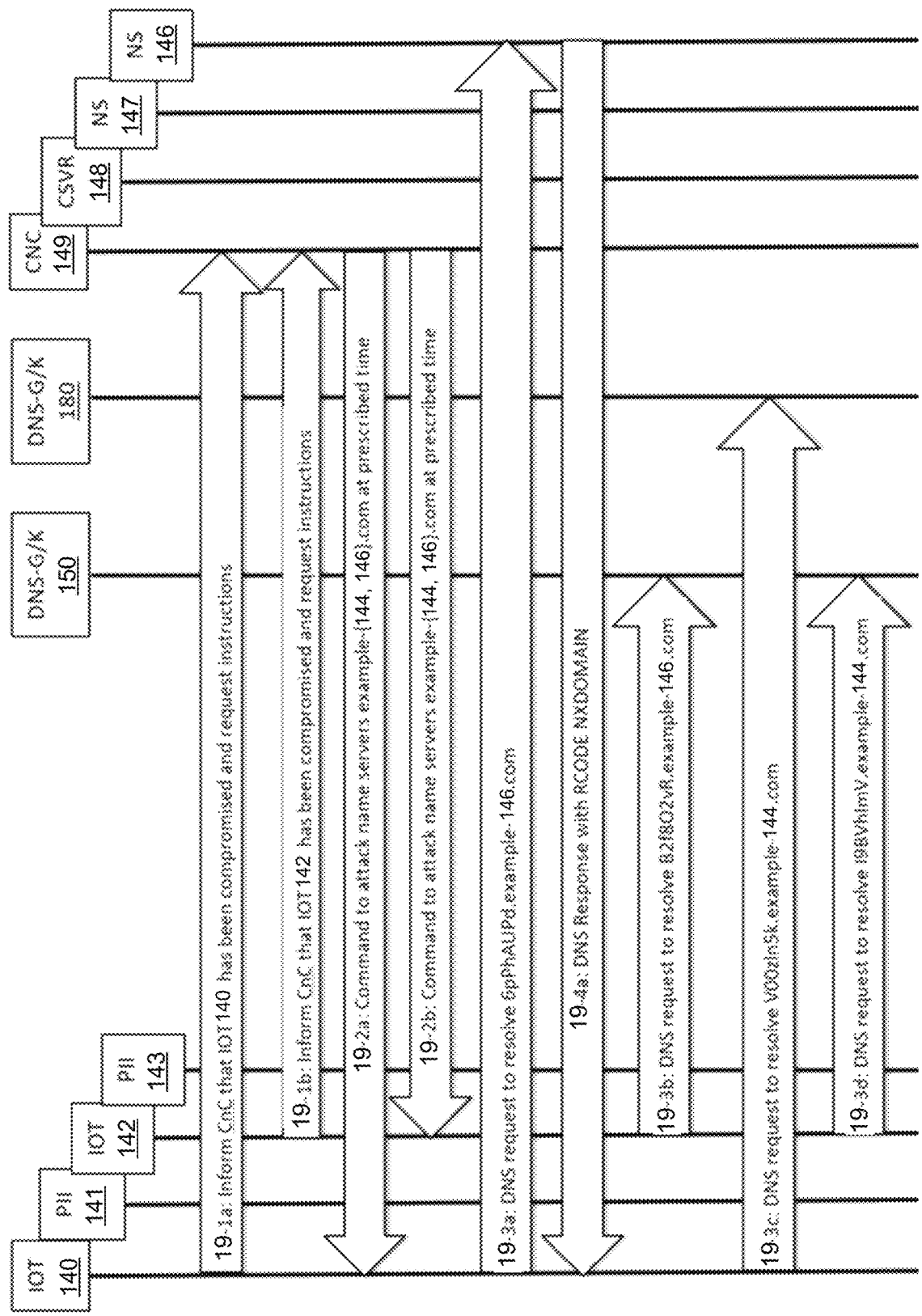
FIG. 19 depicts an example event sequence that illustrates methods for preventing some attacks on the DNS.

FIG. 19 illustrates event sequences for an embodiment of an internetwork with DNS gatekeepers that may mitigate or prevent DDoS attacks on the DNS. In Steps 19-1a and 19-1b, malware that have compromised devices IOT 140 and IOT 142 contact a botnet command and control system CNC 149 to notify the command and control system CNC 149 of their presence and to request instructions. In Steps 19-2a and 19-2b, the command and control system CNC 149 may instruct IOT 140 and IOT 142 to attack DNS authoritative names servers for example-144.com and example-146.com with bad, bogus, or unregistered domain name DNS requests at a prescribed time T.

In Step 19-3a, at the prescribed time T, IOT 140 generates a bogus DNS request to resolve the domain name 6pPhAUPd.example-146.com. IOT 140 uses a random string generator to create the string "6pPhAUPd", which it then uses as the subdomain label to construct a domain name that the DNS will route to the authoritative name server NS 146 for example-146.com for resolution. This domain name generation method assumes that resultant domain names are highly unlikely to have been registered in the DNS. IOT 140 forwards the bogus DNS request towards the authoritative name server NS 146 for example-146.com.

In Step 19-4a, authoritative name server NS 146 receives the DNS request to resolve 6pPhAUPd.example-146.com.

Since 6pPhAUPd.example-146.com was never registered in the DNS, NS 146 wastes resources searching for, but not finding, a corresponding DNS entry in its DNS database. NS 146 generates a corresponding DNS response to the request with RCODE=3 ("NXDOMAIN", which signals that the domain name does not exist in the DNS), and forwards the DNS response towards the requestor IOT 140. Any caching DNS proxies in the network path between authoritative name server (e.g., NS 146) and a device (e.g., the IOT 140) may insert a cache entry for the pair {6pPhAUPd.example-146.com, NXDOMAIN}.

Thus, the bogus DNS request generated by IOT 140 in Step 19-3*a* has wasted network bandwidth resources, DNS name server resources, and DNS cache resources. These resources may no longer be available to service legitimate DNS requests.

In Step 19-3*b*, at the prescribed time T, and similar to Step 19-3*a*, IOT 142 generates a bogus DNS request to resolve the domain name B2f8O2vR.example-146.com. The IOT 142 may forward the bogus DNS request towards the authoritative name server NS 146 for example-146.com. As the bogus DNS request egresses the network 114, it may be received by the DNS gatekeeper DNS-G/K 150. DNS-G/K 150 may test if B2f8O2vR.example-146.com is a member of its local instance of Bloom filter DNS-REG. The membership test may return FALSE, such that it is determined that B2f8O2vR.example-146.com is not a member of Bloom filter DNS-REG and therefore is not registered in the DNS. DNS-G/K 150 may check its rate of invalid or bogus DNS requests, rate of change in the rate of invalid or bogus DNS requests, and other parameters, and decides that the request may be part of a DDoS attack. Accordingly, the DNS-G/K 150 may drop the packet containing the DNS request, but does not generate a corresponding DNS response to send back to the originator of the DNS request (as this would consume resources and thus help carry out the DDoS attack). DNS-G/K 150 may log, capture, and locally store the bogus DNS request, for possible future retrieval by, for example, a threat intelligence provider service, and/or a cyberanalysis service, etc. DNS-G/K 150 has thus prevented the bogus DNS request from attacking the DNS and wasting resources, which may instead be applied to servicing legitimate DNS requests.

In Step 19-3*c*, at the prescribed time T, and similar to Step 19-3*a*, IOT 140 generates a bogus DNS request to resolve the domain name V00z1n5k.example-144.com. The IOT 140 may forward the bogus DNS request towards the name server NS 144 for example-144.com attached to Network 116. Before ingressing Network 116, the request may be received by DNS gatekeeper DNS-G/K 180 (which DIPO-X has installed at the boundary of Network 116 to protect its DNS infrastructure). The DNS gatekeeper DNS-G/K 180 may test if V00z1n5k.example-144.com is a member of its local instance of Bloom filter DNS-REG. The membership test returns FALSE, as it may be determined that V00z1n5k.example-144.com is not a member of the Bloom filter DNS-REG and therefore is not registered in the DNS. The DNS gatekeeper DNS-G/K 180 may decide that the bogus DNS request may be part of a DDoS attack. Accordingly, the DNS gatekeeper DNS-G/K 180 may drop the packet containing the DNS request, but need not generate a corresponding DNS response to send back to the originator of the DNS request. The DNS gatekeeper DNS-G/K 180 has thus prevented the bogus DNS request from attacking the DNS and wasting resources, which may instead be applied to servicing legitimate DNS requests.

In Step 19-3*d*, at the prescribed time T, and similar to Step 19-3*b*, IOT 142 generates a bogus DNS request to resolve the domain name I9BVhImV.example-144.com. IOT 142 forwards the bogus DNS request towards the name server NS 144 for example-144.com. As the bogus DNS request egresses the network 114, it is received by the DNS gatekeeper DNS-G/K 150. DNS-G/K 150 tests if I9BVhImV.example-144.com is a member of its local instance of the Bloom filter DNS-REG. The membership test returns FALSE, as it is determined that I9BVhImV.example-144.com is not a member of the Bloom filter DNS-REG and therefore is not registered in the DNS. DNS-G/K 150 checks a rate of invalid or bogus DNS requests and/or a rate of change in the rate of invalid or bogus DNS requests, and decides that the request may be part of a DDoS attack. Accordingly, DNS-G/K 150 drops the packet containing the DNS request, but does not generate a corresponding DNS response to send back to the originator of the DNS request. DNS-G/K 150 has thus prevented the bogus DNS request from attacking the DNS and wasting resources, which may instead be applied to servicing legitimate DNS requests.

Figure 20:
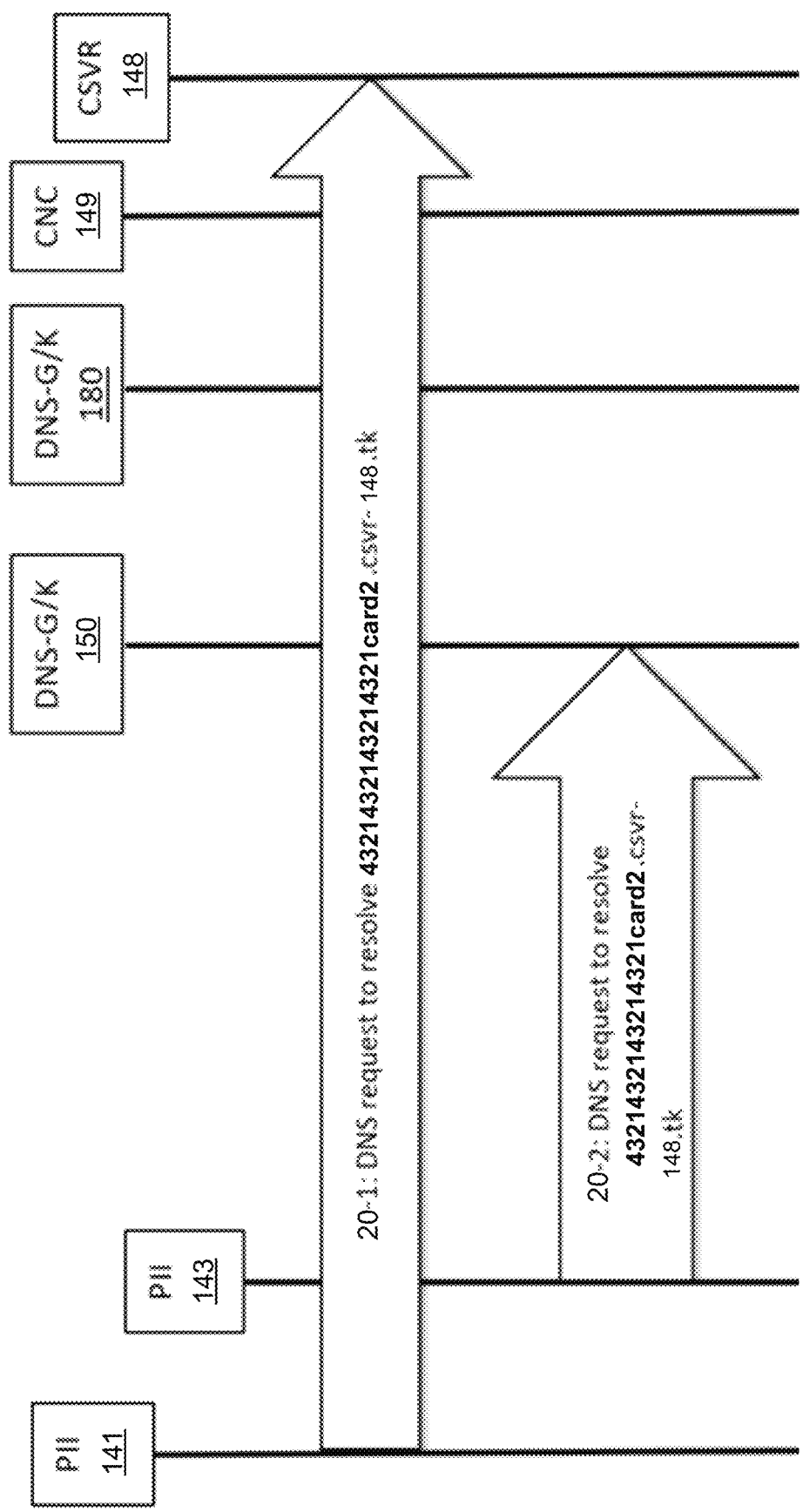
FIG. 20 depicts an event sequence that illustrates methods for preventing some DNS tunneling attacks.

FIG. 20 illustrates event sequences for an embodiment of an internetwork with DNS gatekeepers that may mitigate or prevent DNS tunneling attacks.

Recall from above and from FIG. 14 that hosts PII 141 attached to Network 112 and PII 143 attached to Network 114 may be servers that manage sensitive information, such as personally identifiable information (PII), credit card information, and the like. Hosts PII 141 and PII 143 have also been infected by malware that collects credit card information and then uses a DNS tunneling method to exfiltrate the information to collection server CSVR 148 attached to network 170 (described below). CSVR 148 has been assigned a public IP address 21.43.65.87. The collection server CSVR 148 may be configured with a DNS server that may ingest DNS requests on port 53, the well-known port for DNS. The malware on PII 141 and PII 143 have been configured to send DNS requests to IP address 21.43.65.87 (the IP address of collection server CSVR 148).

In Step 20-1, PII 141 attached to Network 112 reads a credit card number "1234123412341234" and associated credit card issuer name "card" from a local database, constructs a (bogus) DNS request to resolve, for example, 1234123412341234card.csvr-148.tk, encapsulates the request in a UDP datagram packet with destination port 53, encapsulates the datagram in an IP packet with destination IP address 21.43.65.87, and forwards the packet towards 21.43.65.87 (CSVR 148). The packet is routed through the internetwork to collection server CSVR 148 port 53, where the DNS server listening on port 53 receives the bogus DNS request to resolve 1234123412341234card.csvr-148.tk. The DNS server extracts the (stolen) credit card information "1234123412341234" from the DNS request, and stores the DNS request in a local database, thereby successfully completing the exfiltration. The DNS server does not generate a corresponding DNS response to the bogus DNS request, in order to, for example, avoid detection.

In Step 20-2, PII 143 attached to Network 114 may read a credit card number "4321432143214321" and associated credit card issuer name "card2" from a local database, constructs a bogus DNS request to resolve, for example, 4321432143214321card2.csvr-148.tk. The PII 143 may encapsulate the request in a UDP datagram packet with destination port 53, may encapsulate the datagram in an IP packet with destination IP address 21.43.65.87, and may forward the packet towards the IP address of collection server CSVR 148 (21.43.65.87). As the packet egresses the network 114, it may be received by the DNS gatekeeper DNS-G/K 150. The DNS-G/K 150 may test if the request 4321432143214321card2.csvr-148.tk is a member of its local instance of the Bloom filter DNS-REG. The membership test may return FALSE, as it is determined that 4321432143214321card2.csvr-148.tk is not a member of the Bloom filter DNS-REG and therefore is not registered in the DNS. The DNS-G/K 150 may check the local gatekeeper stored rate of bad, bogus, or unregistered domain name DNS requests and legitimate DNS requests and/or the rate of change in the rate of bad, bogus, or unregistered domain name DNS requests and legitimate DNS requests, and other parameters, and may decide that the request is not part of a DDoS attack but may be part of a DNS tunneling attack. Accordingly, the DNS-G/K 150 may drop the packet containing the DNS request, but may not generate a corresponding DNS response to send back to the originator of the DNS request. DNS-G/K 150 may thus prevent a bogus DNS request from exfiltrating stolen credit card numbers to malicious actors. The DNS-G/K 150 may log, capture, and locally store the bogus DNS request. This information may be provided to, for example, a threat intelligence provider service, and/or a cyberanalysis service, etc. These services may identify a malicious collection server CSVR 148 (IP address 21.43.65.87) and Network 170 as being associated with malicious actors, and host PII 143 as being compromised by exfiltrating malware. This information may be used to further protect the network by, for example, the enterprise disinfecting host PII 143, and/or by a threat intelligence provider distributing collection server CSVR 148's IP address 21.43.65.87 and associated threat metadata (e.g., attack type is "DNS tunneling") as a threat indicator to subscribers, as well as distributing the IP address space block of (malicious) Network 170, for example, 21.43.65.0/24.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Figure 21:
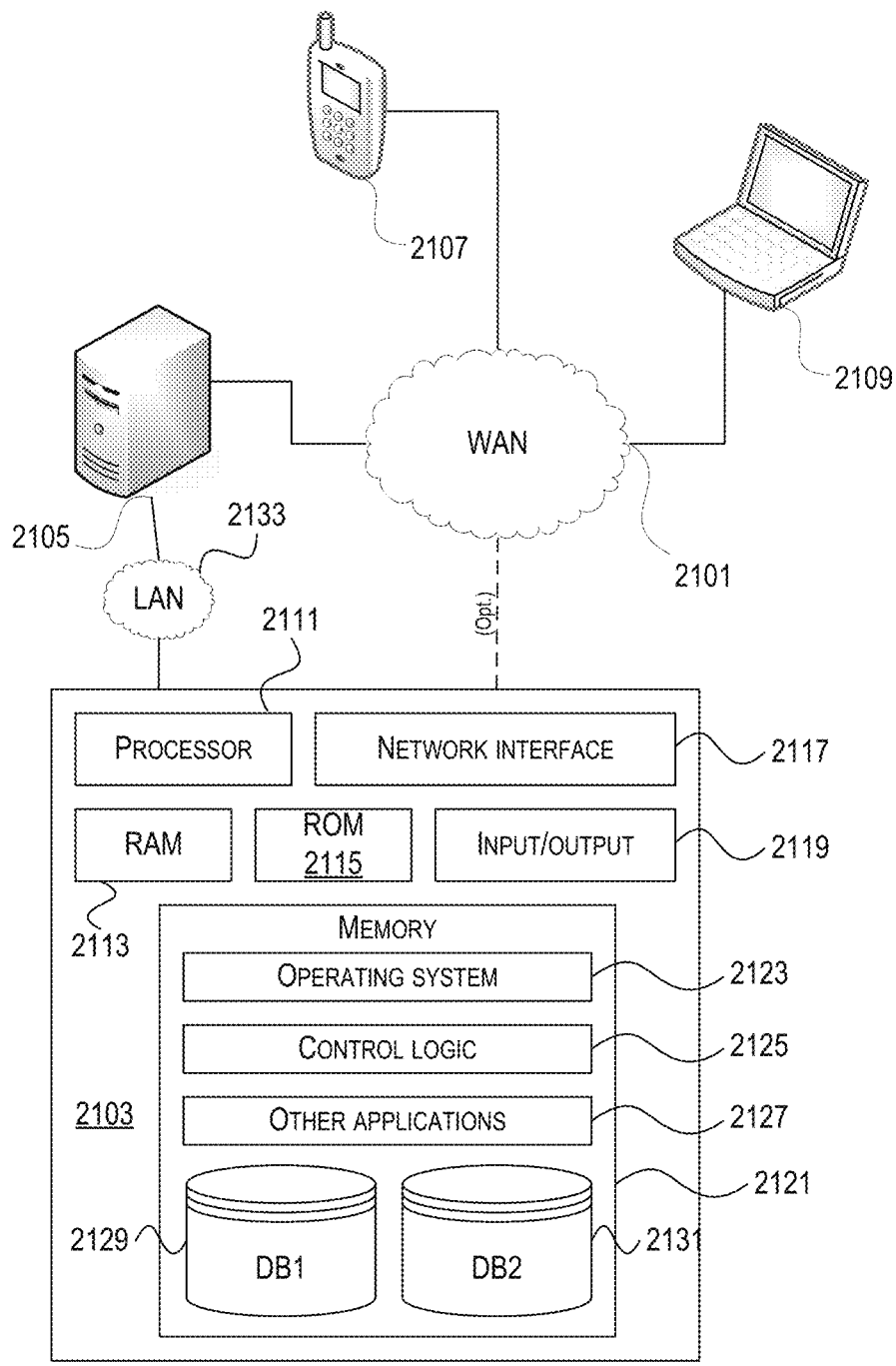
FIG. 21 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 21 illustrates one example of a system architecture and data processing device that may be used to implement one or more illustrative aspects described herein in a standalone and/or networked environment. Various network nodes 2103, 2105, 2107, and 2109 may be interconnected via a wide area network (WAN) 2101, such as the Internet. Other networks may also or alternatively be used, including private intranets, corporate networks, local area networks (LAN), metropolitan area networks (MAN), wireless networks, personal networks (PAN), and the like. Network 2101 is for illustration purposes and may be replaced with fewer or additional computer networks. A local area network 2133 may have one or more of any known LAN topology and may use one or more of a variety of different protocols, such as Ethernet. Devices 2103, 2105, 2107, and 2109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 2103, web server 2105, and client computers 2107, 2109. For example, the DNS-G/K 150 may be implemented as any one of a plurality of different devices, including each of the various network nodes 2103, 2105, 2107, and 2109. Data server 2103 provides overall access, control and administration of databases and control software for performing one or more illustrative aspects describe herein. Data server 2103 may be connected to web server 2105 through which users interact with and obtain data as requested. Alternatively, data server 2103 may act as a web server itself and be directly connected to the Internet. Data server 2103 may be connected to web server 2105 through the local area network 2133, the wide area network 2101 (e.g., the Internet), via direct or indirect connection, or via some other network. Users may interact with the data server 2103 using remote computers 2107, 2109, e.g., using a web browser to connect to the data server 2103 via one or more externally exposed web sites hosted by web server 2105. Client computers 2107, 2109 may be used in concert with data server 2103 to access data stored therein, or may be used for other purposes. For example, from client device 2107 a user may access web server 2105 using an Internet browser, as is known in the art, or by executing a software application that communicates with web server 2105 and/or data server 2103 over a computer network (such as the Internet).

Servers and applications may be combined on the same physical machines, and retain separate virtual or logical addresses, or may reside on separate physical machines. FIG. 21 illustrates just one example of a device and network architecture that may be used, and those of skill in the art will appreciate that the specific device and network architecture and data processing devices used may vary, and are secondary to the functionality provided, as further described herein. For example, services provided by web server 2105 and data server 2103 may be combined on a single server.

Each component 2103, 2105, 2107, 2109 may be any type of known computer, server, or data processing device. Data server 2103, e.g., may include a processor 2111 controlling overall operation of the data server 2103. Data server 2103 may further include random access memory (RAM) 2113, read only memory (ROM) 2115, network interface 2117, input/output interfaces 2119 (e.g., keyboard, mouse, display, printer, etc.), and memory 2121. Input/output (I/O) 2119 may include a variety of interface units and drives for reading, writing, displaying, and/or printing data or files. Memory 2121 may further store operating system software 2123 for controlling overall operation of the data processing device 2103, control logic 2125 for instructing data server 2103 to perform aspects described herein, and other application software 2127 providing secondary, support, and/or other functionality which may or might not be used in conjunction with aspects described herein. The control logic may also be referred to herein as the data server software 2125. Functionality of the data server software may refer to operations or decisions made automatically based on rules coded into the control logic, made manually by a user providing input into the system, and/or a combination of automatic processing based on user input (e.g., queries, data updates, etc.).

Memory 2121 may also store data used in performance of one or more aspects described herein, including a first database 2129 and a second database 2131. The first database may include the second database (e.g., as a separate table, report, etc.). That is, the information can be stored in a single database, or separated into different logical, virtual, or physical databases, depending on system design. Devices 2105, 2107, and 2109 may have similar or different architecture as described with respect to device 2103. Those of skill in the art will appreciate that the functionality of data processing device 2103 (or device 2105, 2107, or 2109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 22:
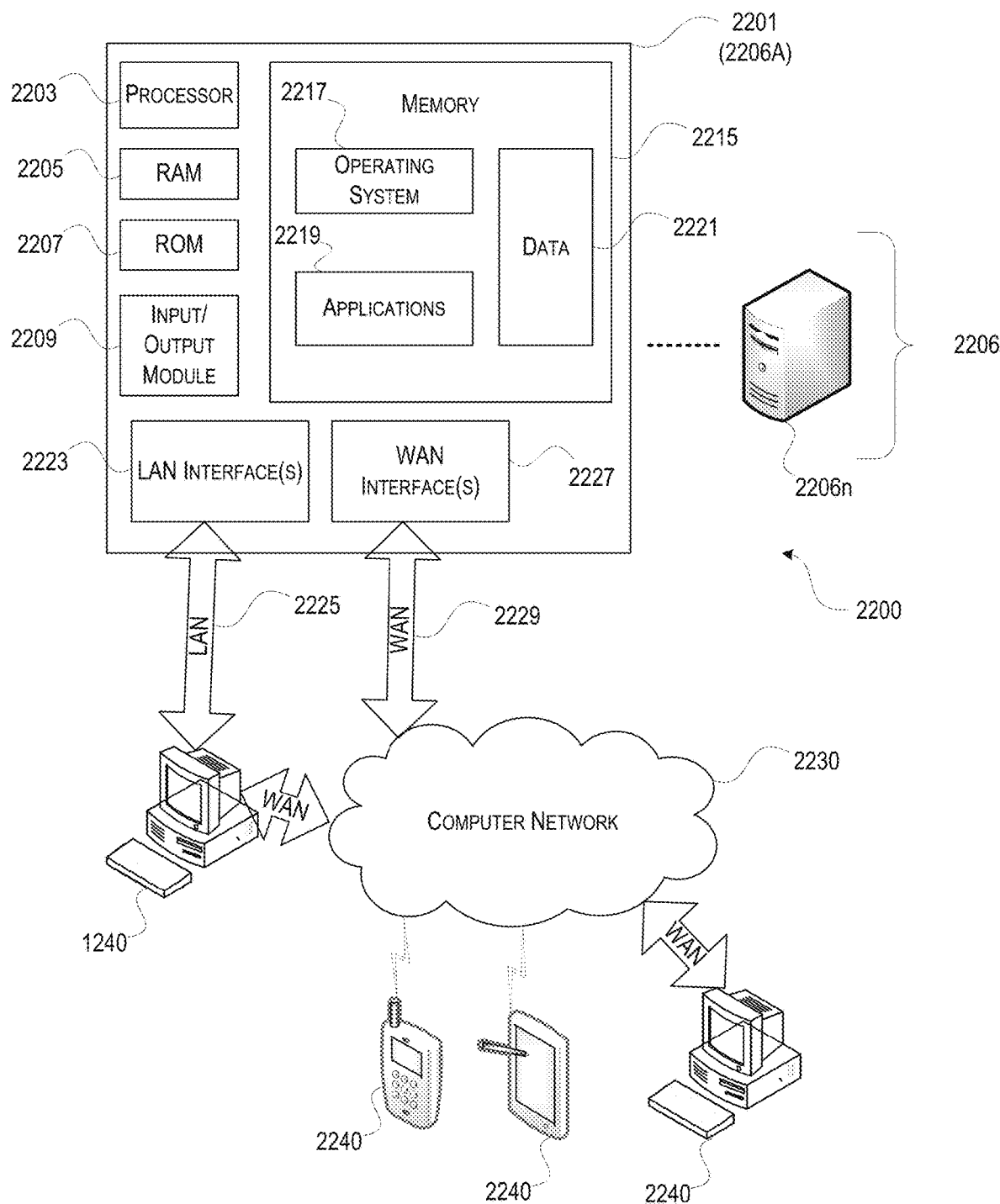
FIG. 22 depicts an illustrative network system architecture that may be used in accordance with one or more illustrative aspects described herein.

With further reference to FIG. 22, one or more aspects described herein may be implemented in a network or remote-access environment. FIG. 22 depicts an example network architecture including a computing device 2201 in an illustrative computing environment 2200 that may be used according to one or more illustrative aspects described herein. For example, the DNS Filter Manager (DFM) 160 may be implemented using features of the computing device 2201. Computing device 2201 may be used as a server 2206a in a single-server or multi-server desktop virtualization system (e.g., a remote access or cloud system) configured to provide virtual machines for client access devices. The computing device 2201 may have a processor 2203 for controlling overall operation of the server and its associated components, including RAM 2205, ROM 2207, Input/Output (I/O) module 2209, and memory 2215.

I/O module 2209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 2215 and/or other storage to provide instructions to processor 2203 for configuring computing device 2201 into a special purpose computing device in order to perform various functions as described herein. For example, memory 2215 may store software used by the computing device 2201, such as an operating system 2217, application programs 2219, and an associated database 2221.

Computing device 2201 may operate in a networked environment supporting connections to one or more remote computers, such as terminals 2240 (also referred to as client devices). The terminals 2240 may be personal computers, mobile devices, laptop computers, tablets, or servers that include many or all of the elements described above with respect to the computing device 2103 or 2201. The network connections depicted in FIG. 9 include a local area network (LAN) 2225 and a wide area network (WAN) 2229, but may also include other networks. When used in a LAN networking environment, computing device 2201 may be connected to the LAN 2225 through a network interface or adapter 2223. When used in a WAN networking environment, computing device 2201 may include a modem 2227 or other wide area network interface for establishing communications over the WAN 2229, such as computer network 2230 (e.g., the Internet). It will be appreciated that the network connections shown are illustrative and other means of establishing a communications link between the computers may be used. Computing device 2201 and/or terminals 2240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 22, one or more client devices 2240 may be in communication with one or more servers 2206a-1206n (generally referred to herein as "server(s) 2206"). In one embodiment, the computing environment 2200 may include a network appliance installed between the server(s) 2206 and client machine(s) 2240. The network appliance may manage client/server connections, and in some cases can load balance client connections amongst a plurality of backend servers 2206.

The client machine(s) 2240 may be referred to as a single client machine 2240 or a single group of client machines 2240, while server(s) 2206 may be referred to as a single server 2206 or a single group of servers 2206. In one embodiment a single client machine 2240 communicates with more than one server 2206, while in another embodiment a single server 2206 communicates with more than one client machine 2240. In yet another embodiment, a single client machine 2240 communicates with a single server 2206.

A client machine 2240 may be referenced by any one of the following non-exhaustive terms: client machine(s); client(s); client computer(s); client device(s); client computing device(s); local machine; remote machine; client node(s); endpoint(s); or endpoint node(s). The server 2206 may be referenced by any one of the following non-exhaustive terms: server(s), local machine; remote machine; server farm(s), or host computing device(s).

In one embodiment, the client machine 2240 may be a virtual machine. The virtual machine may be any virtual machine, while in some embodiments the virtual machine may be any virtual machine managed by a Type 1 or Type 2 hypervisor, for example, a hypervisor developed by Citrix, IBM, VMware, or any other hypervisor. In some aspects, the virtual machine may be managed by a hypervisor, while in other aspects the virtual machine may be managed by a hypervisor executing on a server 2206 or a hypervisor executing on a client 2240.

A client device 2240 may display application output generated by an application remotely executing on a server 2206 or other remotely located machine, and the client device 2240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 2206 may use a remote presentation protocol or other program to send data to a thin-client or remote-display application executing on the client to present display output generated by an application executing on the server 2206. The thin-client or remote-display protocol can be a protocol such as the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 2206a-1206n such that the servers 2206a-1206n are logically grouped together into a server farm 2206, for example, in a cloud computing environment. The server farm 2206 may include servers 2206 that are geographically dispersed while and logically grouped together, or servers 2206 that are located proximate to each other while logically grouped together. Geographically dispersed servers 2206a-1206n within a server farm 2206 may communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. The server farm 2206 may be administered as a single entity, or the server farm 2206 may include multiple server farms.

A server farm may include servers 2206 that execute a substantially similar type of operating system platform (e.g., WINDOWS, UNIX, LINUX, iOS, ANDROID, SYMBIAN, etc.) The server farm 2206 may include a first group of one or more servers that execute a first type of operating system platform, and a second group of one or more servers that execute a second type of operating system platform.

Server 2206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

A first server 2206a may receive requests from a client machine 2240, forwards the request to a second server 2206b (not shown), and responds to the request generated by the client machine 2240 with a response from the second server 2206b (not shown). First server 2206a may acquire an enumeration of applications available to the client machine 2240 and well as address information associated with an application server 2206 hosting an application identified within the enumeration of applications. First server 2206a can then present a response to the client's request using a web interface, and communicate directly with the client 2240 to provide the client 2240 with access to an identified application. One or more clients 2240 and/or one or more servers 2206 may transmit data over network 2230, e.g., network 2101.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
storing, by a gatekeeper, a probabilistic data structure representing a subset of a plurality of domain names in a Domain Name System (DNS), wherein the probabilistic data structure representing the subset of the plurality of domain names in the DNS is selected from a plurality of probabilistic data structures representing a plurality of subsets of the plurality of domain names in the DNS based on false positive rates associated with the plurality of probabilistic data structures;
receiving, by the gatekeeper, a plurality of packets;
determining, based on packet information, whether each respective packet of the plurality of packets comprises a domain name;
based on a determination that a first packet of the plurality of packets comprises a first domain name, testing, without querying the DNS, the probabilistic data structure to determine if the first domain name is registered in the DNS; and
based on a determination that the first domain name is not registered in the DNS:
determining, based on at least one criteria, a legitimacy of the first packet; and
based on the legitimacy, dropping the first packet.

2. The method of claim 1, further comprising:
based on the determination that the first domain name is not registered in the DNS, transmitting data regarding the first packet to a management server.

3. The method of claim 1, further comprising:
based on a determination that a second packet of the plurality of packets does not comprise a domain name, transmitting the second packet towards its intended destination.

4. The method of claim 1, further comprising:
testing, without querying the DNS, the probabilistic data structure to determine if a second domain name of a second packet is represented in the probabilistic data structure;
based on a determination that the second domain name is not represented in the probabilistic data structure, determining whether the second packet is legitimate; and
based on a determination that the second packet is legitimate, transmitting the second packet towards its intended destination.

5. The method of claim 4, further comprising:
monitoring network traffic for a response to the second packet;
based on the response to the second packet, inserting the second domain name into the probabilistic data structure; and
transmitting the second domain name to a management server.

6. The method of claim 1, wherein determining the legitimacy of the first packet comprises:
determining a rate of received invalid DNS query requests associated with the first domain name;
determining whether the rate of received invalid DNS query requests satisfies a threshold; and
based on a determination that the rate of received invalid DNS query requests satisfies the threshold, determining the legitimacy of the first packet.

7. The method of claim 1, wherein determining the legitimacy of the first packet comprises:
determining whether a country code is associated with the first domain name;
determining whether the country code indicates a lag; and
based on a determination that the country code does not indicate the lag, determining the legitimacy of the first packet.

8. The method of claim 1, wherein the probabilistic data structure is one of:
a Bloom filter; or
a Cuckoo filter.

9. The method of claim 1, wherein the at least one criteria comprises one or more of:
a rate of bad, bogus, or unregistered domain name DNS requests;
whether one or more portions of the first packet correlate with human language words;
one or more lengths of labels associated with the first packet;
a country code associated with the first packet;
a timing of updates received for the probabilistic data structure; or
syntactical characteristics of the first domain name.

10. A computing device comprising:
at least one processor; and
memory comprising instructions that, when executed by the at least one processor, cause the computing device to:
store a probabilistic data structure representing a subset of a plurality of domain names in a Domain Name System (DNS), wherein the probabilistic data structure representing the subset of the plurality of domain names in the DNS is selected from a plurality of probabilistic data structures representing a plurality of subsets of the plurality of domain names in the DNS based on false positive rates associated with the plurality of probabilistic data structures;
receive a plurality of packets;
determine, based on packet information, whether each respective packet of the plurality of packets comprises a domain name;
based on a determination that a first packet of the plurality of packets comprises a first domain name, test, without querying the DNS, the probabilistic data structure to determine if the first domain name is registered in the DNS; and
based on a determination that the first domain name is not registered in the DNS:
determine, based on at least one criteria, a legitimacy of the first packet; and
based on the legitimacy, drop the first packet.

11. The computing device of claim 10, wherein the memory further comprises instructions that cause the computing device to:
based on the determination that the first domain name is not registered in the DNS, transmit data regarding the first packet to a management server.

12. The computing device of claim 10, wherein the memory further comprises instructions that cause the computing device to:
based on a determination that a second packet of the plurality of packets does not comprise a domain name, transmit the second packet towards its intended destination.

13. The computing device of claim 10, wherein the memory further comprises instructions that cause the computing device to:

monitor network traffic for a response to a second packet;

based on the response to the second packet, insert a second domain name into the probabilistic data structure; and transmit the second domain name to a management server.

14. The computing device of claim 10, wherein the memory further comprises instructions that cause the computing device to:

determine a rate of received invalid DNS query requests associated with the first domain name;

determine whether the rate of received invalid DNS query requests satisfies a threshold; and based on a determination that the rate of received invalid DNS query requests satisfies the threshold, determine the legitimacy of the first packet.

15. The computing device of claim 10, wherein the memory further comprises instructions that cause the computing device to determine the legitimacy of the first packet by causing the computing device to:

determine whether a country code is associated with the first domain name;

determine whether the country code indicates a lag; and based on a determination that the country code does not indicate the lag, determine the legitimacy of the first packet.

16. One or more non-transitory computer-readable media comprising instructions that, when executed by one or more processors of a computing system, cause the computing system to:

store a probabilistic data structure representing a subset of a plurality of domain names in a Domain Name System (DNS), wherein the probabilistic data structure representing the subset of the plurality of domain names in the DNS is selected from a plurality of probabilistic data structures representing a plurality of subsets of the plurality of domain names in the DNS based on false positive rates associated with the plurality of probabilistic data structures;

receive a plurality of packets;

determine, based on packet information, whether each respective packet of the plurality of packets comprises a domain name;

based on a determination that a first packet of the plurality of packets comprises a first domain name, test, without querying the DNS, the probabilistic data structure to determine if the first domain name is registered in the DNS; and based on a determination that the first domain name is not registered in the DNS:

determine, based on at least one criteria, a legitimacy of the first packet; and based on the legitimacy, drop the first packet.

17. The one or more non-transitory computer-readable media of claim 16, further comprising instructions that cause the computing system to:

based on the determination that the first domain name is not registered in the DNS, transmit data regarding the first packet to a management server.

18. The one or more non-transitory computer-readable media of claim 16, further comprising instructions that cause the computing system to:

based on a determination that a second packet of the plurality of packets does not comprise a domain name, transmit the second packet towards its intended destination.

19. The one or more non-transitory computer-readable media of claim 16, further comprising instructions that cause the computing system to:

determine a rate of received invalid DNS query requests associated with the first domain name;

determine whether the rate of received invalid DNS query requests satisfies a threshold; and based on a determination that the rate of received invalid DNS query requests satisfies the threshold, determine the legitimacy of the first packet.

20. The one or more non-transitory computer-readable media of claim 16, further comprising instructions that cause the computing system to:

determine whether a country code is associated with the first domain name;

determine whether the country code indicates a lag; and based on a determination that the country code does not indicate the lag, determine the legitimacy of the first packet.

* * * * *